(12) United States Patent
Krouse et al.

(10) Patent No.: US 8,072,089 B2
(45) Date of Patent: Dec. 6, 2011

(54) FLUID ENERGY APPARATUS AND METHOD

(76) Inventors: Wayne F. Krouse, Houston, TX (US);
Frederick E. Becker, Reading, MA (US); Kerry N. Oliphant, Sandy, UT (US); Andrew R. Provo, West Fairies, VT (US)

(*) Notice: Subject to any disclaimer, the term of this patent is extended or adjusted under 35 U.S.C. 154(b) by 473 days.

(21) Appl. No.: 12/364,945

(22) Filed: Feb. 3, 2009

(65) Prior Publication Data

US 2009/0134623 A1    May 28, 2009

Related U.S. Application Data

(63) Continuation-in-part of application No. 11/446,497, filed on Jun. 2, 2006, which is a continuation-in-part of application No. 11/137,002, filed on May 25, 2005, now abandoned, which is a continuation of application No. 10/851,604, filed on May 21, 2004, now Pat. No. 6,955,049.

(60) Provisional application No. 60/474,051, filed on May 29, 2003.

(51) Int. Cl.
*F03B 13/00*    (2006.01)
(52) U.S. Cl. ........................................ 290/54; 290/43

(58) Field of Classification Search .............. 290/42–43, 290/53–54
See application file for complete search history.

(56) References Cited

U.S. PATENT DOCUMENTS

| | | | | |
|---|---|---|---|---|
| 4,367,413 A * | 1/1983 | Nair | ................................ | 290/52 |
| 4,720,640 A * | 1/1988 | Anderson et al. | ................. | 290/43 |
| 6,056,518 A * | 5/2000 | Allen et al. | ................... | 417/355 |
| 6,692,318 B2 * | 2/2004 | McBride | .......................... | 440/38 |
| 7,021,905 B2 * | 4/2006 | Torrey et al. | ................... | 417/356 |
| 7,235,894 B2 * | 6/2007 | Roos | ................................ | 290/54 |
| 7,338,255 B2 * | 3/2008 | Nabesaka et al. | ........... | 415/173.6 |
| 7,385,303 B2 * | 6/2008 | Roos | ................................ | 290/54 |
| 2006/0043738 A1 * | 3/2006 | Roos | ................................ | 290/54 |

* cited by examiner

*Primary Examiner* — Thanh Lam

(57) ABSTRACT

A preferred embodiment includes a system for power generation through movement of fluid having a variety of configurations and implementations. One preferred embodiment includes a system for power generation through movement of fluid includes a power generating cell with a generally cylindrical housing a ring for rotating disposed in said housing, one or more impellers fixedly coupled to said ring, and a generator operably coupled to said ring for receiving energy from the one or more impellers in which fluid is disposed about one or more impellers for creating energy.

20 Claims, 68 Drawing Sheets

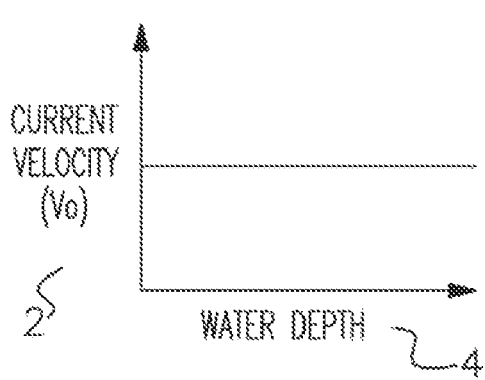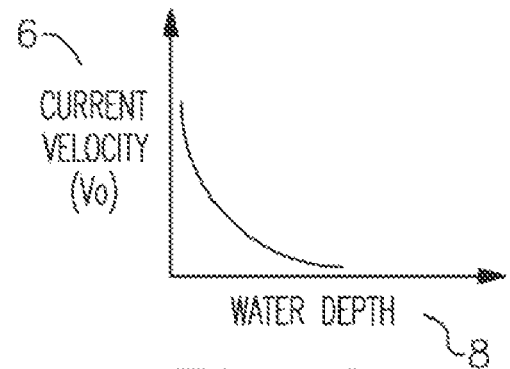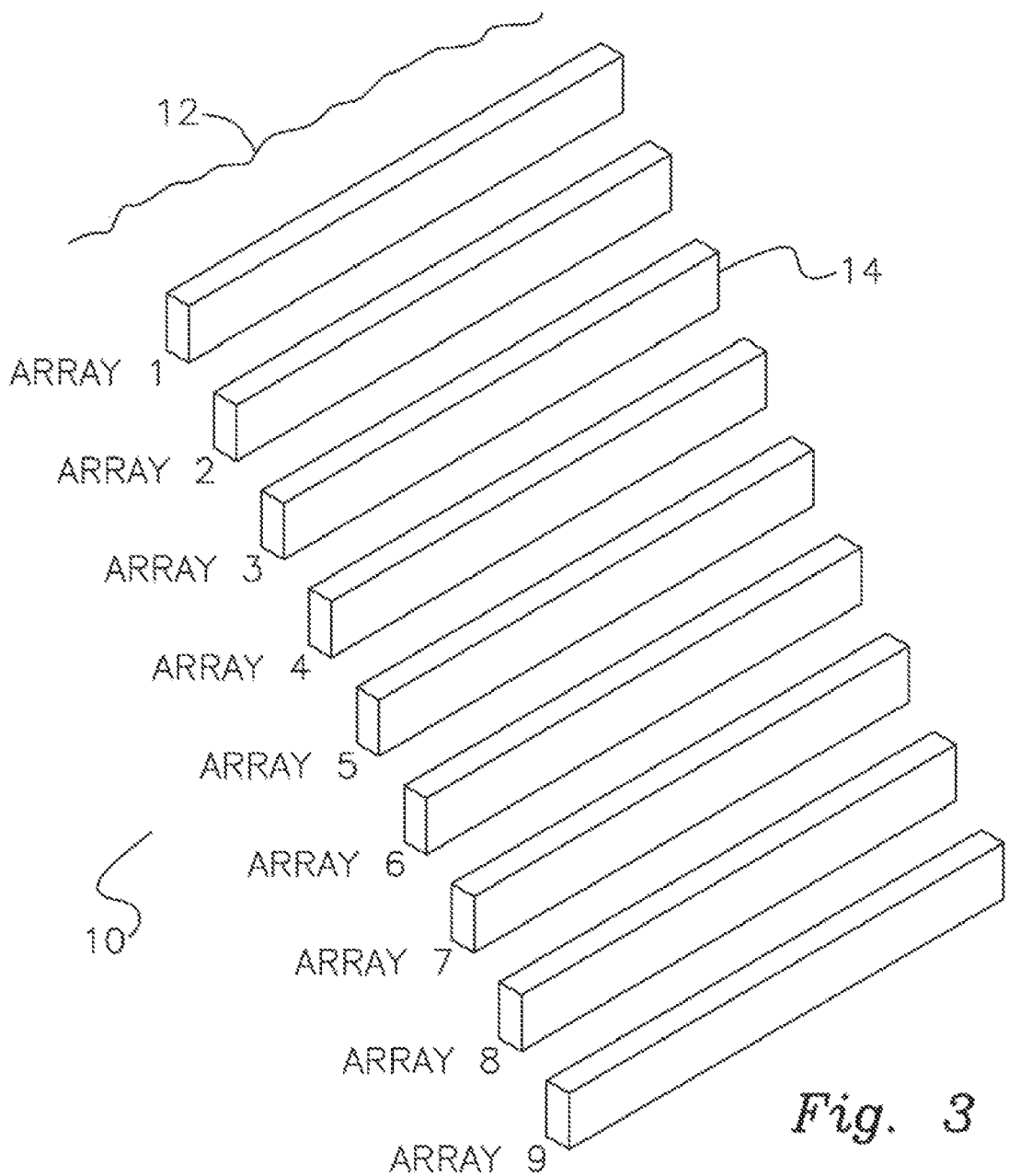

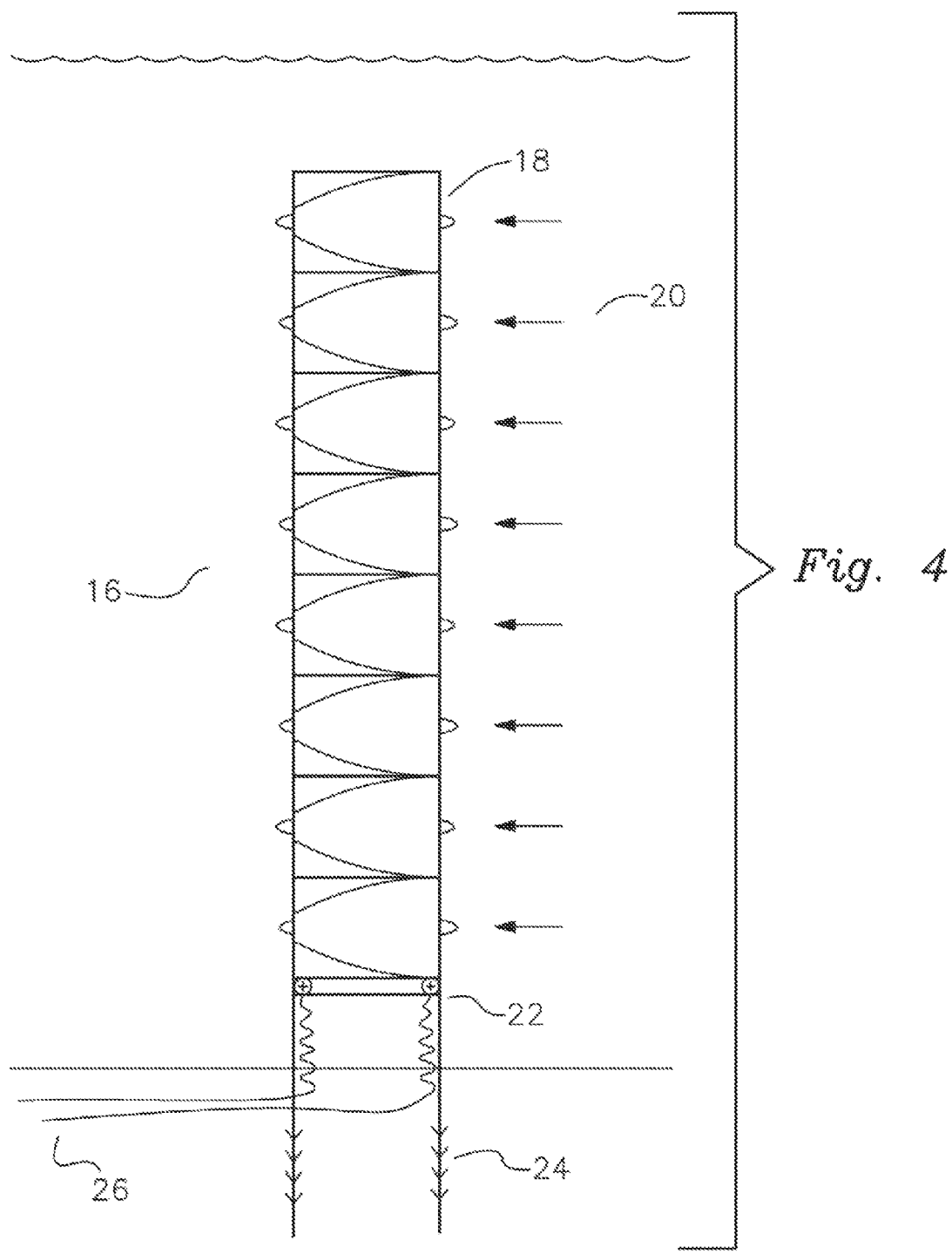

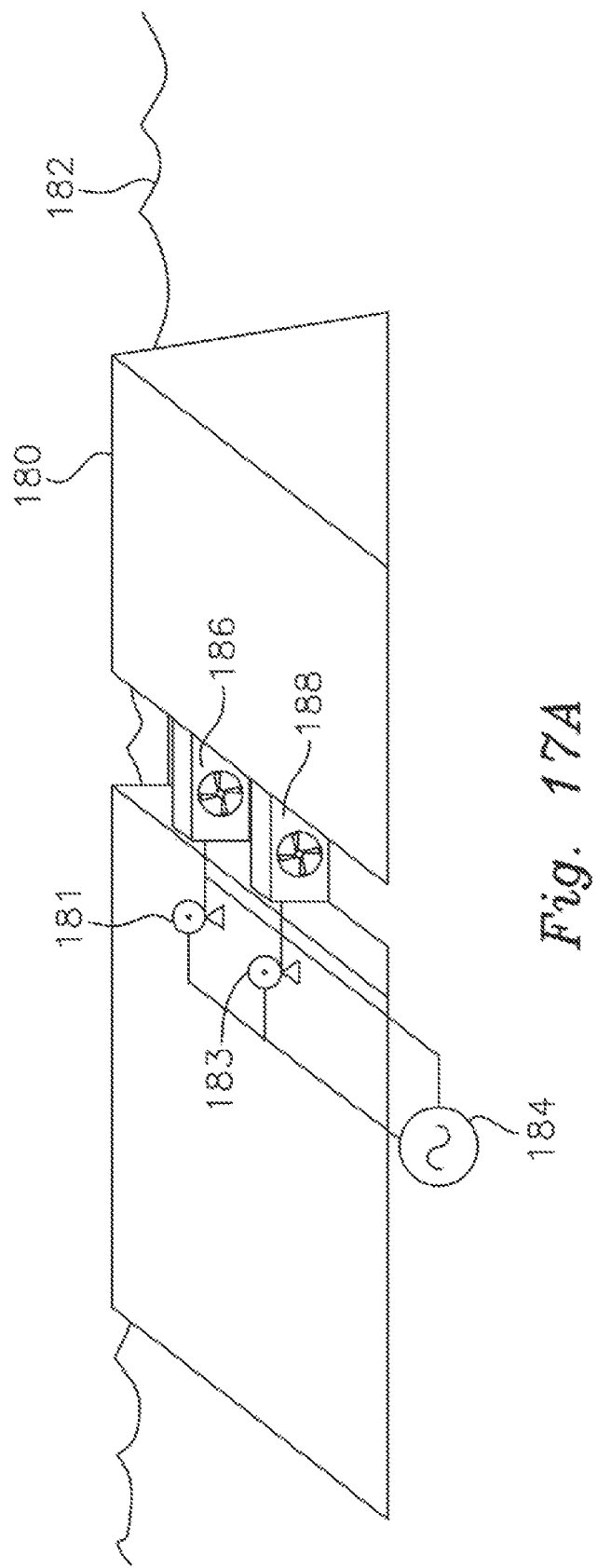

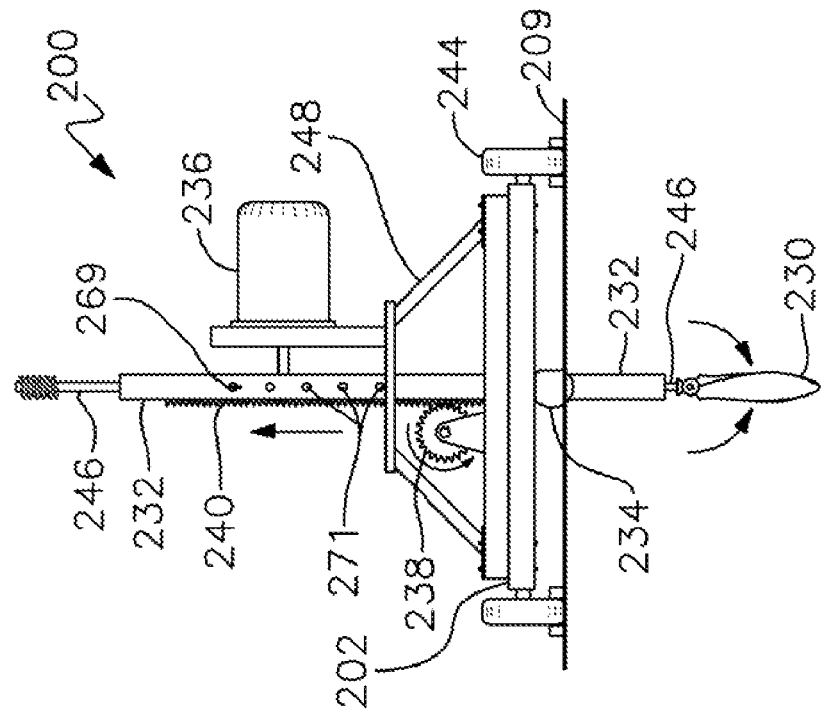
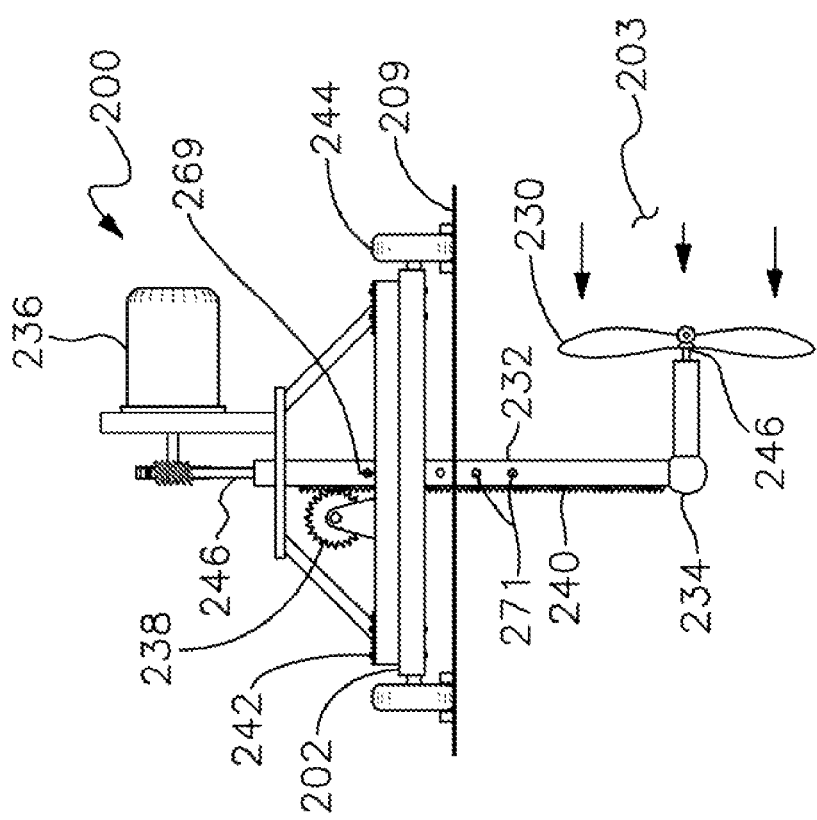
Fig. 21
Fig. 22

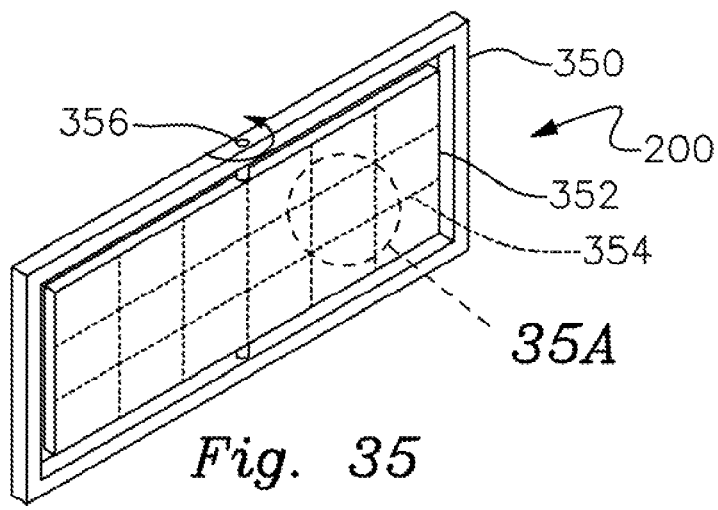
Fig. 35
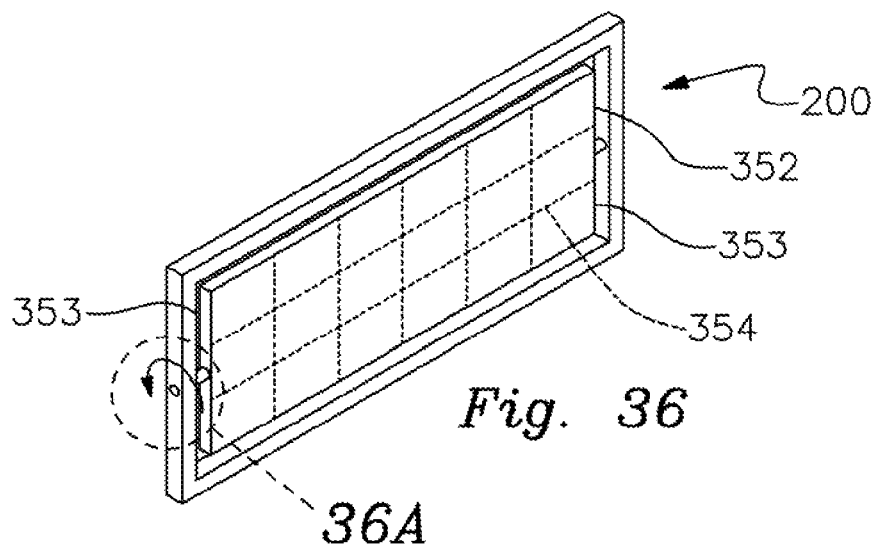
Fig. 36
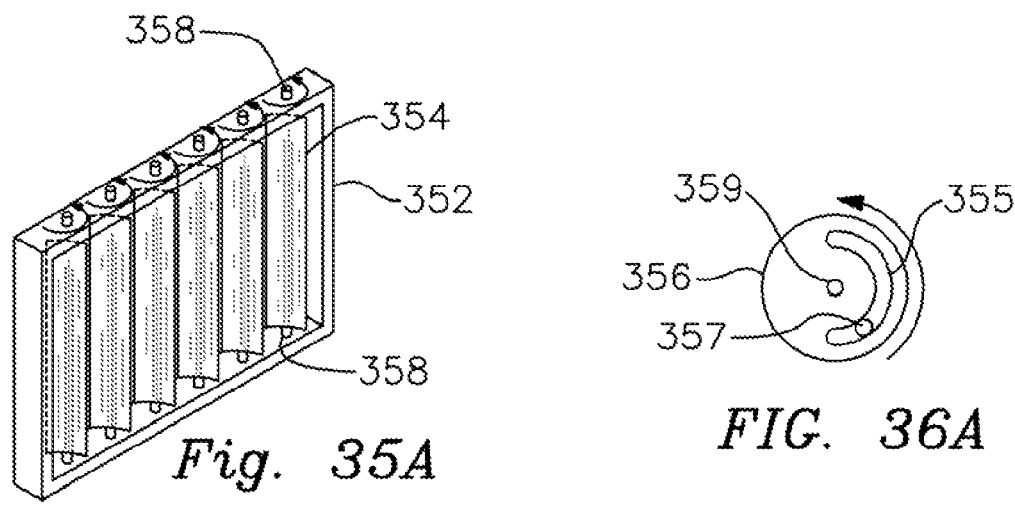
Fig. 35A
FIG. 36A

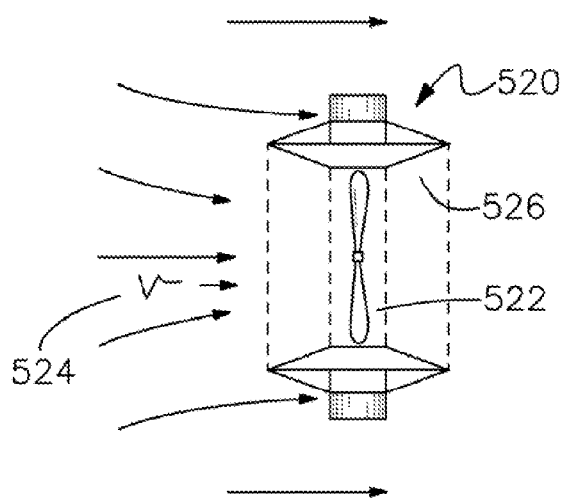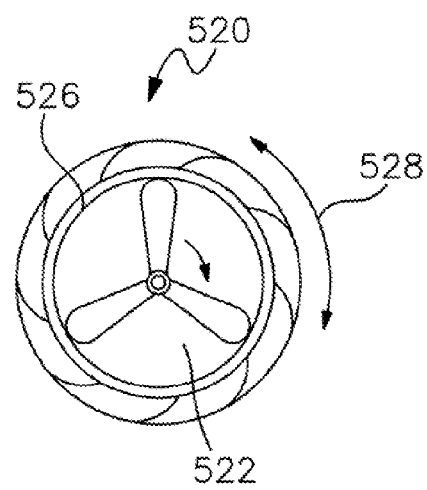
Fig. 70A                    Fig. 70B
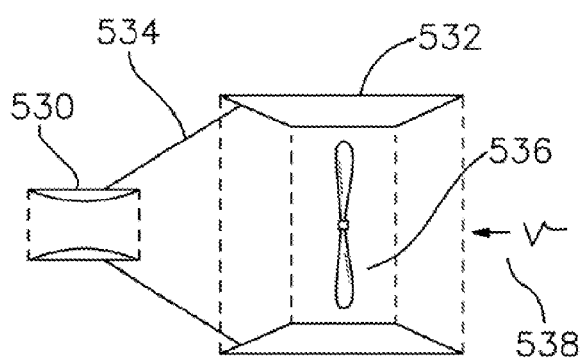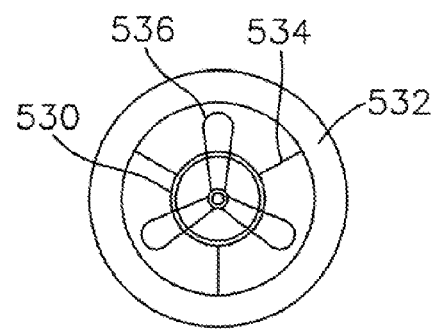
Fig. 71A                    Fig. 71B

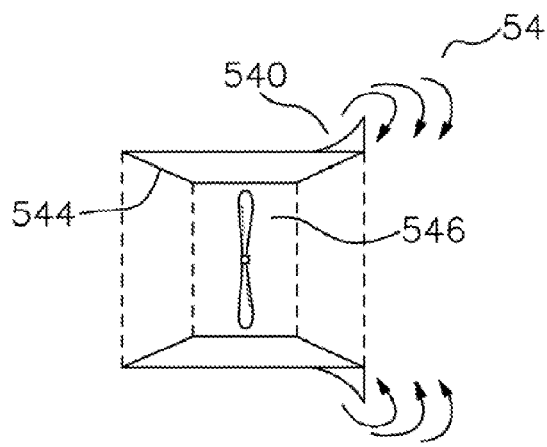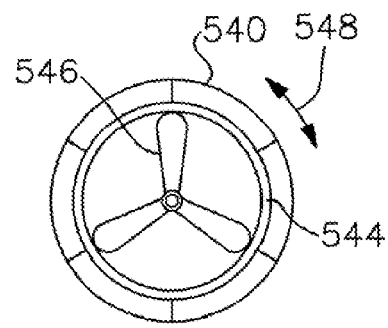
Fig. 72A    Fig. 72B
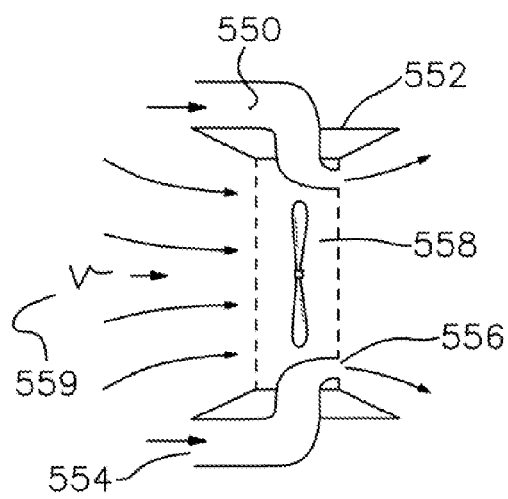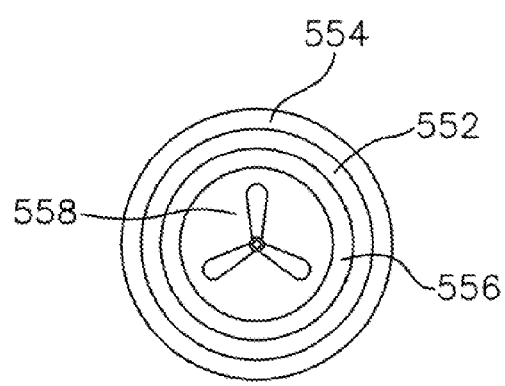
Fig. 73A    Fig. 73B

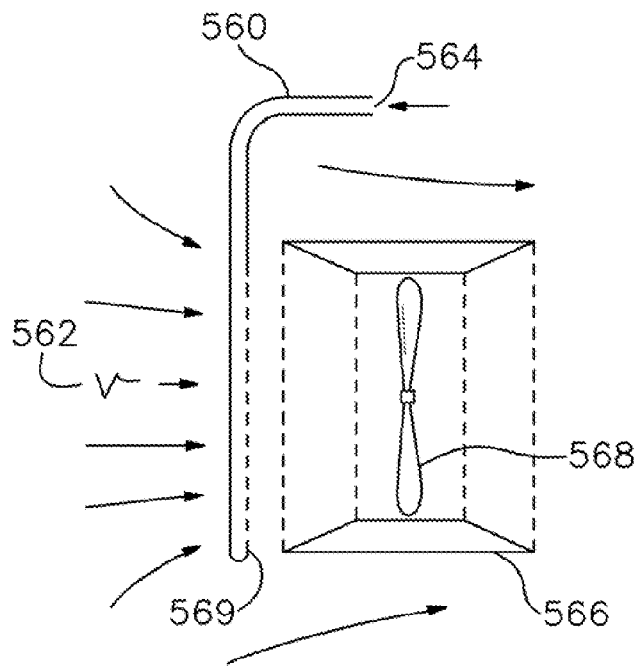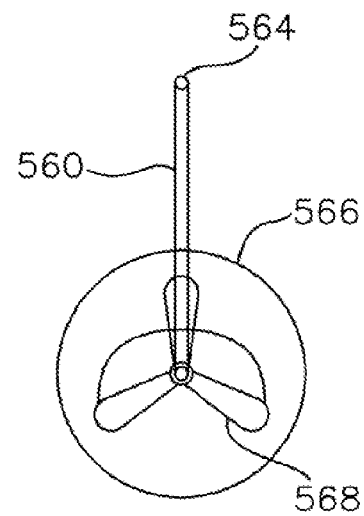
Fig. 74A          Fig. 74B
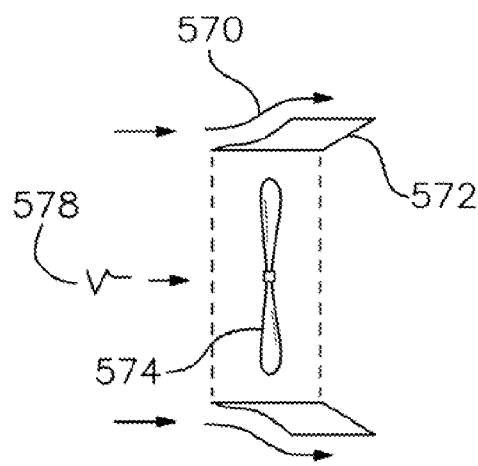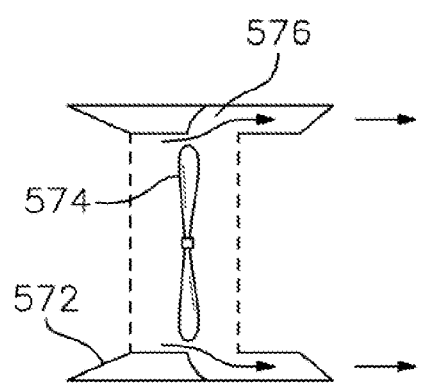
Fig. 75A          Fig. 75B

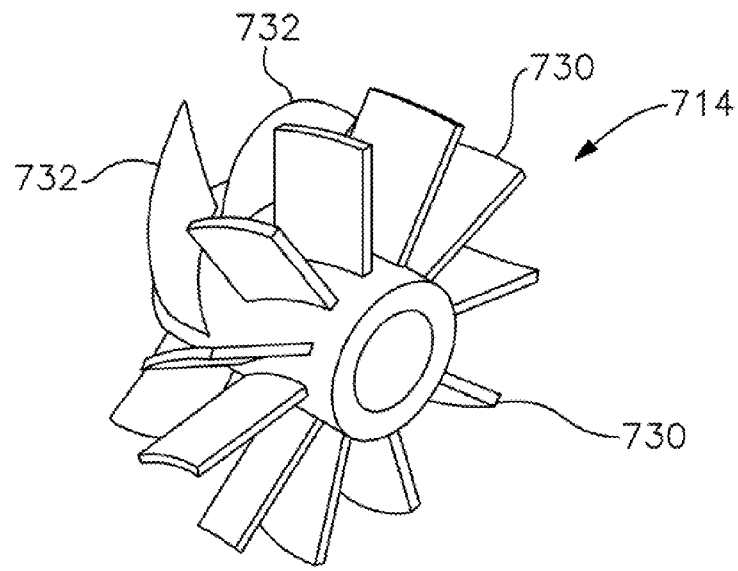
Fig. 91A
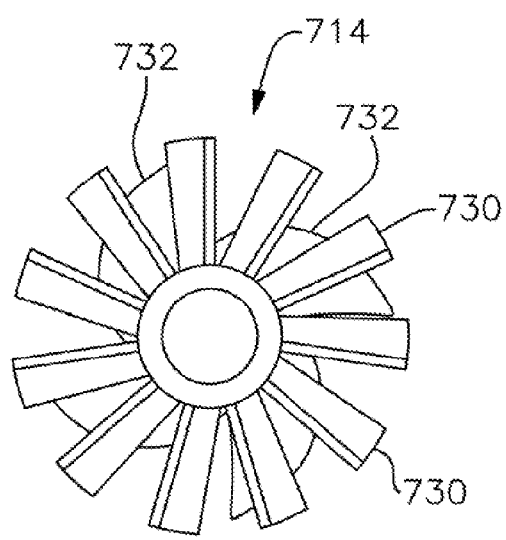 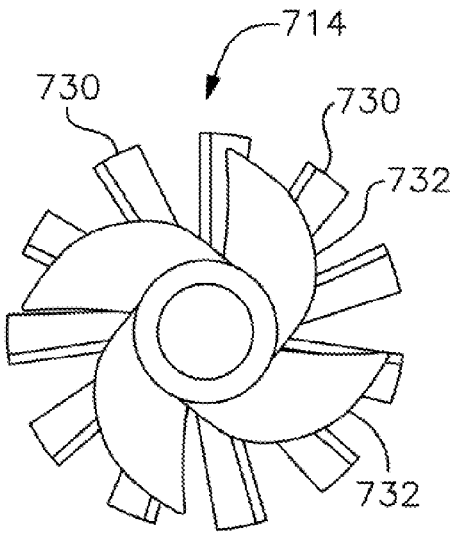
Fig. 91B        Fig. 91C

FLUID ENERGY APPARATUS AND METHOD

CROSS REFERENCE TO RELATED APPLICATIONS

This application is a continuation in part of U.S. application Ser. No. 11/446,497, filed 2 Jun. 2006, titled "A Machine and System for Power Generation Through Movement of Water," which is a continuation in part of U.S. application Ser. No. 11/137,002, filed 25 May 2005 now abandoned, titled "A Machine and System for Power Generation Through Movement of Water," which is a continuation of U.S. application Ser. No. 10/851,604 filed May 21, 2004, which issued on 18 Oct. 2005 under U.S. Pat. No. 6,955,049, which claims the benefit of U.S. Provisional Application No. 60/474,051, filed 29 May 2003, titled "Machine and System for Power Generation Through Movement of Water."

This application also claims Priority to: 1.) U.S. Provisional Application No. 60/920,255, filed 27 Mar. 2007, titled "Methods and Apparatus for Improved Turbine Pressure and Pressure Drop Control" pending as U.S. application Ser. No. 12/079,277 Filed 13 Nov. 2007; 2.) U.S. Provisional Application No. 60/859,789, filed 17 Nov. 2006, titled "Methods and Apparatus for Improved Hydropower System"; pending as U.S. application Ser. No. 11/983,989 Filed 13 Nov. 2007; 3.) U.S. Provisional Application No. 60/934,369, filed 13 Jun. 2007, titled "Methods and Apparatus for Improved Hydropower System Using Turbine Head Potential" pending as U.S. application Ser. No. 12/157,396 filed 10 Jun. 2008 4.) U.S. Provisional Application No. 60/995,774, filed 28 Sep. 2007, titled "A Machine For Increased Hydro Power Generation and Process for Optimal Control of Pressure Drop Across An In Situ Ducted Hydro Kinetic Turbine" pending as U.S. application Ser. No. 12/286,009; 5.) U.S. Provisional Application No. 61/063,555, filed 4 Feb. 2008, titled "Low Cost Semi Rigid Hydrokinetic Rotor and Unit;" 6.) U.S. Provisional Application No. 61/063,512, filed 4 Feb. 2008, titled "Current or Wave Based Multiple Generator System for Maximizing Energy Production;" 7.) U.S. Provisional Application No. 61/063,556, filed 4 Feb. 2008, titled, "Methods and Apparatus for Improved Hydropower System Using Hydrokinetic Upstream Flow;" 8.) U.S. Provisional Application No. 61/065,924, filed 18 Feb. 2008, titled "Pressurized Hydrokinetic Generator Housing;" 9.) U.S. Provisional Application No. 61/065,925, filed 18 Feb. 2008, titled, "Advanced Design For Shrouded Hydrokinetic Turbines;" 10.) U.S. Provisional Application No. 61/065,963, filed 18 Feb. 2008, titled, "Speed Increaser for Use in Hydrokinetic Applications;" 11.) U.S. Provisional Application No. 61/135,274 filed 18 Jul. 2008, titled "Application of Ducted Hydropower System at Cooling Water Discharge in Thermal Power Plants for Lost Energy Recovery and A System for Generating Power From a Non-Hydro Powered Lock and Dam" and 12.) U.S. Provisional Application No. 61/190,360 filed 28 Aug. 2008 titled "Mineshaft and Excavation Site Hydrokinetic and Head Based Energy Extraction Method and System."

FIELD OF THE INVENTION

The present invention relates to systems that generate power. In particular, the present invention relates to systems that generate power through movement of fluid.

DESCRIPTION OF RELATED ART

Conventional power generation systems have a wide variety of flaws. Most are positioned within or near a moving fluid, are statically affixed in an immovable direction, and require cost prohibitive maintenance. As time passes and various components of power generation systems are subjected to the elements, components break down and fail. Component failure is often problematic and can lead to catastrophic consequences, both in terms of cost of repair and lost power generation revenues. Most of the time, partial if not complete diversion of a fluid flow is required. Moving air streams, rivers, dams, and sometimes portions of seas are required to be shut down or temporarily diverted in order to safely and properly remove damaged or antiquated components.

Diversion is necessary because certain power generation systems often incorporate numerous immovable and non-interchangeable components such as turbines and rotors. More often than not, turbines and rotors are permanently affixed to rotate in a single location and confined to a limited orientation. Frequently, turbines, turbine vanes, rotors, impellers and associated components cannot be removed from service without destroying an entire power generation system or to access the component in need of repair requires unnecessarily removing a portion of a power generation system that does not require removal. Further, power generation system components are rarely designed with partial failure in mind so as to allow a component to keep functioning while a portion of it or another component begins to break down.

Also, most power generation systems are not designed to account for shifts or alteration of fluid flow currents independent of the cause of that alteration. This is problematic, because over time, as manmade and natural fluid flows shift, various power generation systems are incapable of adapting to alterations in various flow regimes. As seasons change and air streams and rivers streams and ocean currents like the gulfstream experiences natural path shifts the optimal efficiency of power generation change can no longer be attained. Thus, attaining maximum efficiency from a moving fluid is not easily attained by shifting or moving a turbine, a turbine vane, a rotor, ducting, associate component or diverting the direction of a flow altogether.

Some power generation systems which can be relocated, no longer comply with newly enacted regulations, because of their implementation prior to installation of the turbine. While retrofitting existing turbines can provide a work around to avoid costly replacement, unfortunately the environments in which turbines are located often do not easily accommodate retrofitting. Government standards, industry regulation, and the overall expense of relocating both power generation systems make most solutions virtually impractical. Thus, one is left to little or no recourse without updating or changing various components of various power generation systems. Unfortunately, the physical configurations of most power generation systems do not allow for simplistic modifications such as interchanging individual turbine vanes, altering turbine vane orientation, shifting fin direction, dynamic positioning and repositioning of the ducting and shrouding, as well as other modifications to the various components of power generation systems. In power generation systems which fluid flow is controllable and can be isolated, such as hydropower facilities on lock and dam systems, turbines are often fixed in locations which do not always attain maximum efficiency of a fluid flow.

For example, most are reluctant to retrofit any existing turbine system within a lock door. Damage to a lock door is costly and can shut down an entire canal or river navigation if damage occurs to a component of the door rather than to the lock itself. Thus, present hydropower generating systems are implemented into the sides of a canal or dam for river navigation, with auxiliary flow turbines and fluid diverters also installed in the canals or dam for river navigation in the event a turbine breaks down. Further, most are reluctant to implement existing turbine designs within or upon a lock door, since turbine breakdown often leaves no room for repair, and can potentially shut down entire canal or river navigation operations. Thus, there exists a need for a fluid generating system than can be retrofit into existing lock and dam systems.

Due to various fluid flow exposures, turbine vanes, sometimes referred to as turbine fan blades in certain applications, are subjected to various force and torque loads, including substantial amounts of torsion and shear. Though turbine vanes can be made of high strength materials they are often cost prohibitive. Instead, turbine vanes are often made of inexpensive metals. However, when various fluids and objects come into contact with turbine vanes, the vanes can become deformed or even break entirely. While turbine vanes may be made of a variety of materials including various high strength composites, the longer the vane, the more torque that is applied to the end of the turbine fan blade and the more likely it is to fail due to overloading, excessive torsion, or too great of exposure to shear load. Turbine vanes often fail to accommodate for failure that one portion of the vane may be subjected to greater stress and strain, depending on its length and distance from an axial location. When turbine vanes are damaged, they frequently deform and are either non functional or inefficiently produce power from moving fluid. Sufficient damage to turbine vanes can require the turbine be removed from service altogether.

Turbine vanes are often exposed to uncontrollable fluids which are difficult to prevent from flowing towards a turbine vane. Since turbine vanes are exposed to various flowing fluids, in the an absence of a braking system, turbines often are self propelled by the fluid they are immersed in and can be difficult to slow down or stop entirely when service is needed. Numerous options have been employed to including removing a vane from service while in operation and installing braking systems and other flow diverting or blocking mechanisms which prevent fluid from significant contact with a turbine vane. Yet because braking systems can fail, turbine vanes can potentially rotate uncontrollably.

Due to various fluid flow fluctuations, common power generation systems are not able to fully adapt or account for such changes. For example, when fluid velocity speed increases beyond fluid to power conversion design rates, components within power generation systems can only rotate at maximum rotor speed. When turbine vanes cannot exceed their designed rate, generated power from a fluid medium is nevertheless lost, and the rotor is subjected to unnecessary and unintended wear and tear. Further, components such as speed increasers, which are costly can optimally be configured at various gear ratios in some preferred embodiments at 20:1 and 60:1. While some speed increasers can be geared to greater ratios to attain slightly better results, overall, when speed increasers are employed in turbine type settings they are not employed to attain optimal efficiency but rather to get the generator speed to the nominal load point which has the highest efficiency.

Power generation systems are often subjected to variable climates and temperature changes. Power generation systems located in northern and Arctic locations are routinely subjected to ice laden water and air. When temperatures drop low enough and entire lakes, rivers, and streams can freeze entirely often preventing a power generation system from operation. Power generation systems immersed in such fluids and which experience cold temperatures can have components damaged or destroyed. Turbine vane expansion and contraction leads to physical material flaws, and losses in shear strength, while various seals often crack, expand, and contract beyond safety factor and design limitations. While cranes can be employed to remove hydropower units from water, this process is costly, inefficient and economically impractical. Once generators have been removed from a generation location in frozen waterways, repair and maintenance is costly, while unnecessary downtime is experienced.

Further, the physical composition of most power generation systems and their components fails to account for portability and the environmental concerns of the present day. To prevent damage to power generation systems, their components are often made of inflexible, rigid, and generally hard material for the purpose of withstanding collisions as well as various objects flowing through fluids such as air and water. As a result, most power generation systems include large turbine systems that are bulky, cannot be moved easily, and are incompatible when simultaneously subjected to multiple fluids such as water and air. Thus, turbines are rarely attached to movable vehicles, such as floating platforms, semi-submersible vehicles, fully submersible vehicles, hot air balloons, airplanes, and other readily movable apparatuses and other vehicles and devices that can be independently suspended in fluids such as water and air.

Thus a need exists for power generation systems, turbines, turbine vanes, rotors, ducting, diffusers, runners, speed increasers, along with various other components that are readily movable, interchangeable, modular and capable of being subjected to various fluid flow regimes allowable for selectively accommodating a wide variety of fluid flow conditions.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a graph illustrating average current velocity as a function of water depth in an ocean deepwater zone.

FIG. 2 is a graph illustrating water velocity as a function of water depth in an ocean breakwater zone.

FIG. 3 is a schematic diagram illustrating an array of power cells for a commercial scale generation site.

FIG. 4 is a schematic diagram illustrating a vertical stack of cells in a portion of an array oriented for uni-directional flow in a deepwater zone.

FIG. 17A showsa ersective schemaiic view of a dam, non-electrified dam, and spillway coupled with turbine driven hydraulic pumps for generation of electricity.

FIG. 21 shows a side cross sectional view of a translationally adjustable sled and a set of collapsible turbine vanes in a deployed state operatively coupled to translationally adjustable sled.

FIG. 22 shows a side cross sectional view of a translationally adjustable sled and a set of collapsible turbine vanes in collapsed state operatively coupled to translationally adjustable sled.

FIG. 35 shows a perspective view of a frame, a longitudinally extending pivotally mounted sub-frame, one or more cells pivotafly mounted to the sub-frame, and counterbalancing top and bottom pinions coupling the frame and the sub-frame.

FIG. 35A shows a perspective close up view of the one or more cells shown in FIG. 35 pivotally mounted to the sub-frame by pairs of pinions.

FIG. 36 shows a perspective view of an alternative frame, a longitudinally extending pivotally mounted sub-frame, one or more cells pivotally mounted to the sub-frame, and counterbalancing side pinions coupling the frame and the sub-frame.

FIG. 36A shows a plan close up view of a counterbalancing pinion shown in FIG. 36 to rotate between zero and one-hundred eighty degrees.

FIG. 46 is a side view of a power generating cell encompassing a plurality of speed increasers, a generator for producing electricity, a tubing for introducing incompressible fluid into the generator housing, a controller operably connected to at least one speed increaser, protected by a fluid tight seal, and a surface based compressor.

FIG. 70A is a side cross sectional view of a turbine having a rotating blade according to a preferred embodiment of the invention.

FIG. 70B is a cross sectional longitudinal view of a turbine having a blade as show in FIG. 7OA according to a preferred embochment of the invention.

FIG. 71A is a side cross sectional view of a turbine having a cantilevered water flow guide according to a preferred embodiment of the invention.

FIG. 71B is a longitudinal front view of a turbine having a cantilevered water flow guide as shown in FIG. 71A according to a preferred embodiment of the invention.

FIG. 72A is a side cross sectiona view of a urbine having circumferential flanges according to a preferred embodiment of the invention.

FIG. 72B is a cross sectional lonqitudinal view of the turbine shown in FIG. 72A according to a preferred embodiment of the invention.

FIG. 73A is a side cross sectional view of a radial eductor according to a preferred embodiment of the invention.

FIG. 73B is cross sectional longitudinal view of a radial eductor sown in FIG. 73A according to a preferred embodiment of the invention.

FIG. 74A is a side cross sectional view of a turbine having an air tube system according to a preferred embodiment of the invention.

FIG. 74B is a cross sectional longitudinal view of a turbine as shown in FIG. 74A according to a preferred embodiment of the invention.

FIG. 75A is a cross sectional view of a front elector according to a preferred embodiment of the invention.

FIG. 75B is a cross sectional view of a rear ejector according to a preferred embodiment of the invention.

FIG. 91A shows a perspective view of an impeller according to a preferred embodiment of the invention.

FIG. 91B shows a front elevation view of an impeller according to a preferred embodiment of the invention.

FIG. 91C shows a rear elevation view of an impeller according to a preferred embodiment of the invention.

DETAILED DESCRIPTION OF THE PREFERRED EMBODIMENTS

Figure 5:
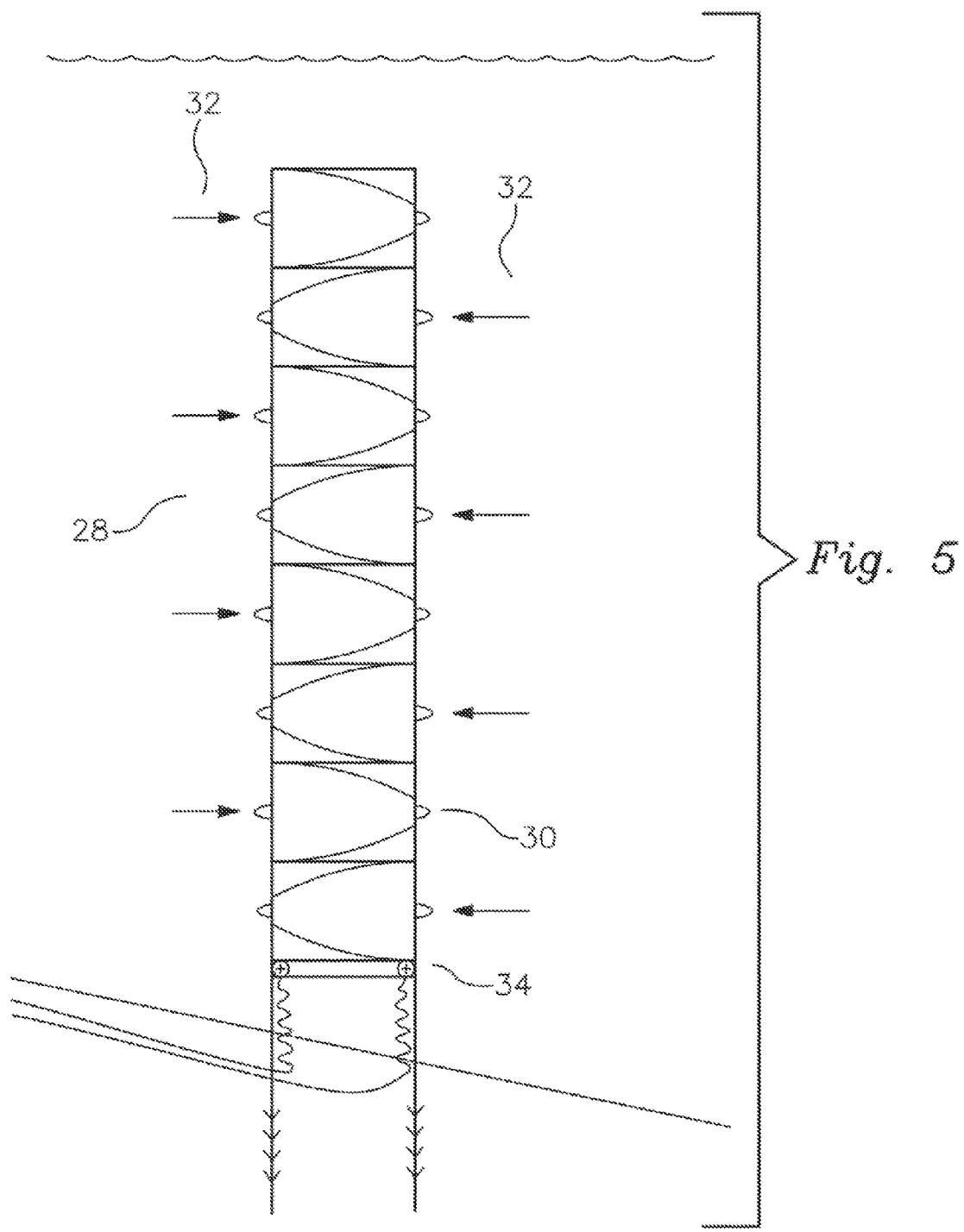
FIG. 5 is a schematic diagram illustrating a vertical stack of cells in a portion of an array oriented for bi-directional flow in a deepwater zone.

Detailed descriptions of the preferred embodiment are provided herein. It is to be understood, however, that the present invention may be embodied in various forms. Therefore, specific details disclosed herein are not to be interpreted as limiting, but rather as a representative basis for teaching one skilled in the art to employ the present invention in virtually any appropriately detailed system, structure or manner.

Turning now to FIG. 1, there is shown a graph depicting average or mean current velocity 2 as a function of water depth 4 in the ocean deepwater zone. It is observed that velocity is relatively constant in deepwater zones, between some upper and lower limits, and for certain purposes may be a source of water energy applicable to the present invention. The Gulf Stream in the Atlantic Ocean and Kuroshio Current in the Pacific Ocean provide examples of steady deepwater current that the present invention could utilize to drive a plurality of cells arrayed as further described herein. However, in a deepwater zone, it is difficult to harness the water power and maintain an array of power generating units. In contrast, the water movement in a breakwater zone, a non electrified reservoir, a river or aqueduct are more amenable to the advantages and benefits of the current invention.

FIG. 2 shows a graph depicting water velocity 6 as a function of water depth 8 in an ocean's breakwater zone. It is observed that as water depth decreases, i.e. as the wave approaches the shore, the velocity of the water increases to dissipate the energy contained in the wave. This provides a ready and renewable source of energy for an array of cells of the type described herein. As will be more fully appreciated below, the presence of shoreline energy capturing systems as shown herein, benefit from this phenomenon to create cheap and reliable energy. This method will work for any accessible moving body of water with fairly constant velocity for a given cross sectional area.

FIG. 3 shows an array set 10 that are aligned in a preferred embodiment of the present invention. Array set 10 is comprised of a series of individual arrays 14, which are deployed in the breakwater zone parallel to a beach 12 in an ocean's breakwater zone to receive the movement of tidal water. Such arrays could be aligned transverse to the flow of a river to take advantage of the prevailing current, in a deepwater zone that might benefit from a current movement or in other locations to take advantage of localized current. Each of individual arrays 14 is a series of stacked energy cells that are driven individually by the movement of water through energy cells that are stacked together in some fashion. The cells are interconnected through an electricity connection tray (see FIG. 8) so that each array set 10 generates a summing of electrical energy from the energy cells. The array set 10 is then eventually connected to the power grid.

FIG. 4 shows a side view of a single stack 16 of energy cells 18 in a larger array as depicted in FIG. 3. FIG. 4 shows a single stack 16 of energy cells 18 for reception of unidirectional water flow in a deepwater zone or river, or even a breakwater zone. As water flows across the energy cells shown by left pointing arrows 20, energy cells 18 receive kinetic energy which in turn generates power. The individual energy cells 18 are stacked and electrically interconnected at positive and negative poles 22 to generate power that is transmitted over lines 26 to an inverter or the power grid. Each individual energy cell 8 may produce a small amount of energy but single stack 16 of energy cells 18 connected in parallel produce substantial energy. Single stack 16 may be moored at anchor 24 in the ocean floor by conventional means well known in the art. The arrays thus arranged are flexible and float in the water while at the same time presenting themselves transverse to the water flow for maximum power generation.

A significant advantage of the modularization of the power array is the use of small power devices which in a preferred embodiment may have power outputs on the order of 0.001-5000 W. This permits the use of devices that may be significantly smaller than typical power generating turbines on the scale of 0.001 in 3 to 50,000 in 3.

By using such small devices, the creation of a large array is greatly facilitated and permits the ready exchange of non-functioning devices without affecting the power generation for any period of time. Such miniaturization of the power generating devices may be termed a micro-generator or micro-device. The combination of a multiple devices into an array has an output when summed that is equal to a much larger single generator.

FIG. 5 shows a single stack 28 of energy cells 30 for maximum reception of the bi-directional water flow in a breakwater zone. As water flows across the energy cells 30 shown by the left and right pointing arrows 32, energy cells 30 receive kinetic energy which in turn generates power. Water flow may be through tidal action having the ebb and flow in two directions thereby activating cells designed and positioned to benefit from both directions of water movement. FIG. 5 shows a side view of single stack 28 of energy cells 30 in a larger array as depicted in FIG. 3 with the cells electrically interconnected by positive and negative poles 34 in similar fashion as described in FIG. 4.

Figure 6:
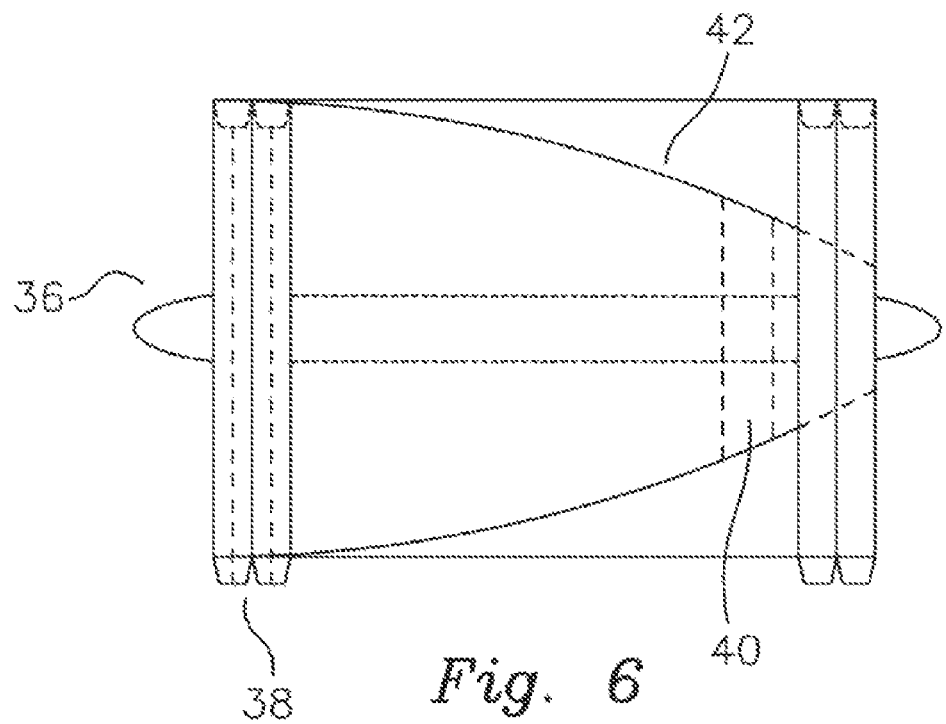
FIG. 6 is a side eleyational view of a conical impeller haying a plurality of fan blades in a single stage set in a housing for electrical connection in an array.

FIG. 6 shows a side view of a single cell impeller 36 having a plurality of fins (see FIG. 7) for converting kinetic energy into electrical energy. The individual cell is configured for electrical connections 38 to other cells in parallel fashion creating a cumulative power generation. The single cell impeller 36 (or turbine) is situated in a housing that is properly configured to generate electricity. The housing has a cross brace (depicted in FIG. 7) for added stability. The generator is created by having magnets or magnetic material positioned in the housing for the blades and positioning windings in the housing surrounding the single cell impeller 36. As the single cell impeller 36 is turned by the action of the water, an electromagnetic force is created imparting current on the windings and in turn generating electricity. By configuring the cells in parallel electrical connections, the small amounts of energy generated by an individual cell are added together to produce a larger amount of electrical energy.

In a preferred embodiment using conventional polymer fabrication means well known in the art, turbines and housings may be manufactured where magnetic polymers or magneto polymers are used to replace standard magnets and copper windings. The amount of magnetic polymer or magneto polymer used and its proper location are a function of the degree of magnetic attraction desired for the particular application. Magnetic forces and conductivity sufficient to generate the wattages desired herein are achievable using such materials and result in a generator that is lightweight and impermeable to the corrosive forces of water.

A single turbine may be fitted with independent blade rings 40 to allow extraction of maximum work along the longitudinal axis and the turbine may be tapered along its outer circumference 42 to increase velocity of flow due to the constricting of the nozzle in the turbine.

Figure 7:
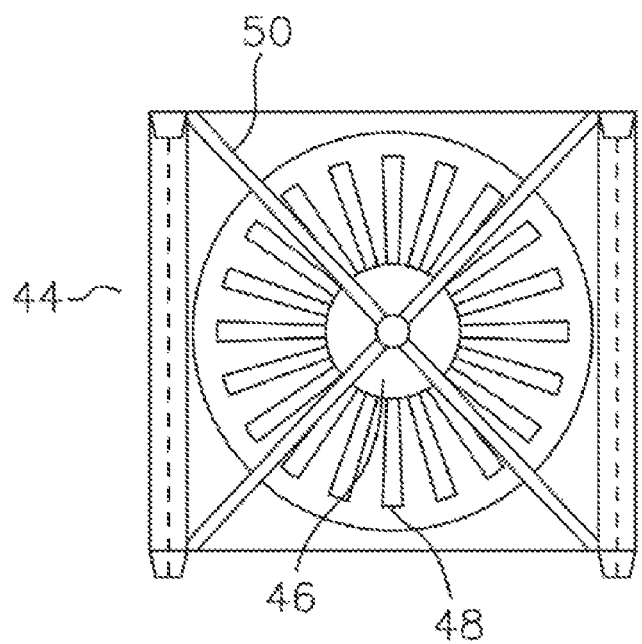
FIG. 7 is a front egd elevational viaw of an impeller with a plurality of blades.

FIG. 7 shows an end view of a single turbine housing 44 and impeller 46 with a plurality of fan blades 48, beneficial for capturing the maximum amount of energy from the movement of water. Cross brace 50 provides added stability.

Figure 8:
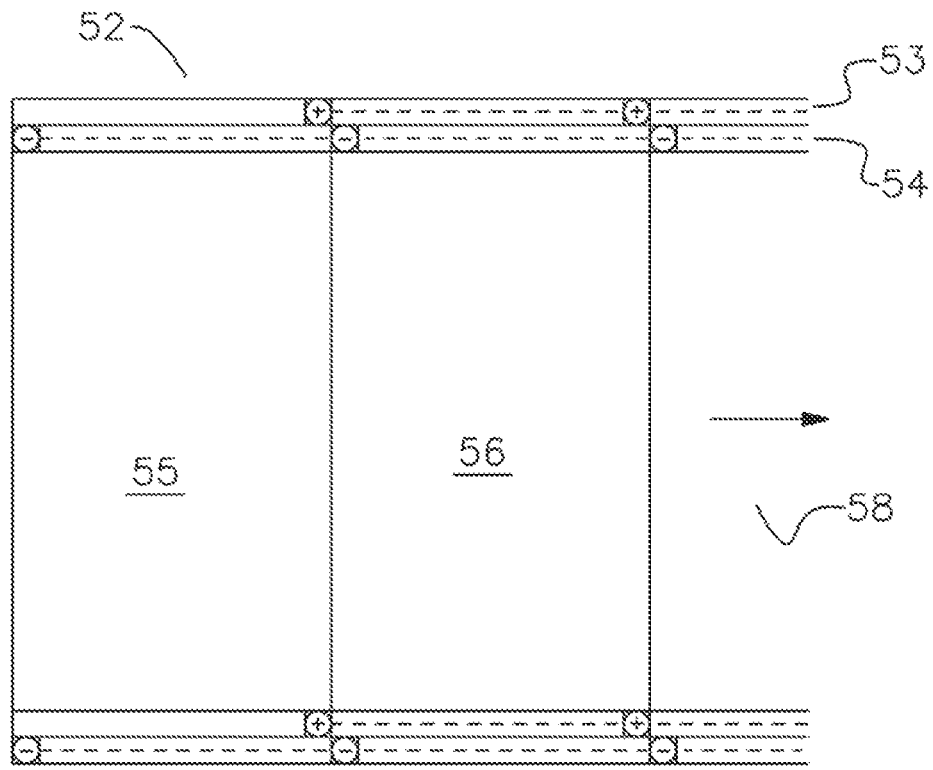
FIG. 8 is a schematic diagram illustrating an electricity connection tray for electrically mounting stacks of cells.

FIG. 8 shows an electricity connection tray 80 for affixing multiple cell stacks to create the larger arrays shown in FIG. 3. Tray 56 has electrical post channels positive 53 and negative 54 for making electrical connection to the stack of cells. Each group of vertically stacked cells is placed on a tray. First vertical stack 55, Second vertical stack 56 and N vertical stack 58 is placed one next to the other in electrical parallel connections 53 and 54 and in turn, the adjoining stacks of cells are electrically interconnected through the stacking base. As can readily be seen, tray 56 may accommodate a plurality of vertical stacks all electrically interconnected. Thus, any number of vertical stacks may be arrayed in this fashion and each stack may be of any of a number of cells as desired for the particular application. Such a polymer transfer plate may be mounted on the top of a plurality of cells for additional stacking, to provide electrical interconnection and thus permit transfer of power from an array to a rectifier/inverter and then to a grid. This arrangement permits ready installation and ease of repair.

Figure 9A:
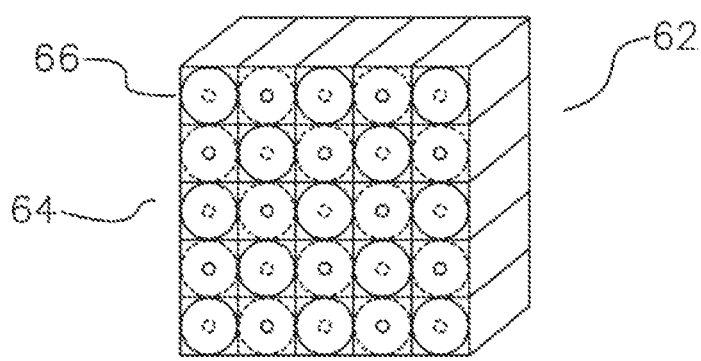
FIG. 9A is a schematic diagram illustrating an array of hi-directional cells oriented orthogonally to the flow of ocean water.

FIG. 9A shows a perspective view of cell array 62 having a plurality of cells aligned to either receive the flow of water from the ocean side 64 or to receive the flow of water from the beach side 66. By arranging the cells in this fashion, individual cells are positioned to maximally convert the kinetic energy from the ebb and flow of the water. In this embodiment a particular cell is aligned either in one direction or the other and its power generating turbine spins optimally when receiving the direction of flow for which it was designed.

Figure 9B:
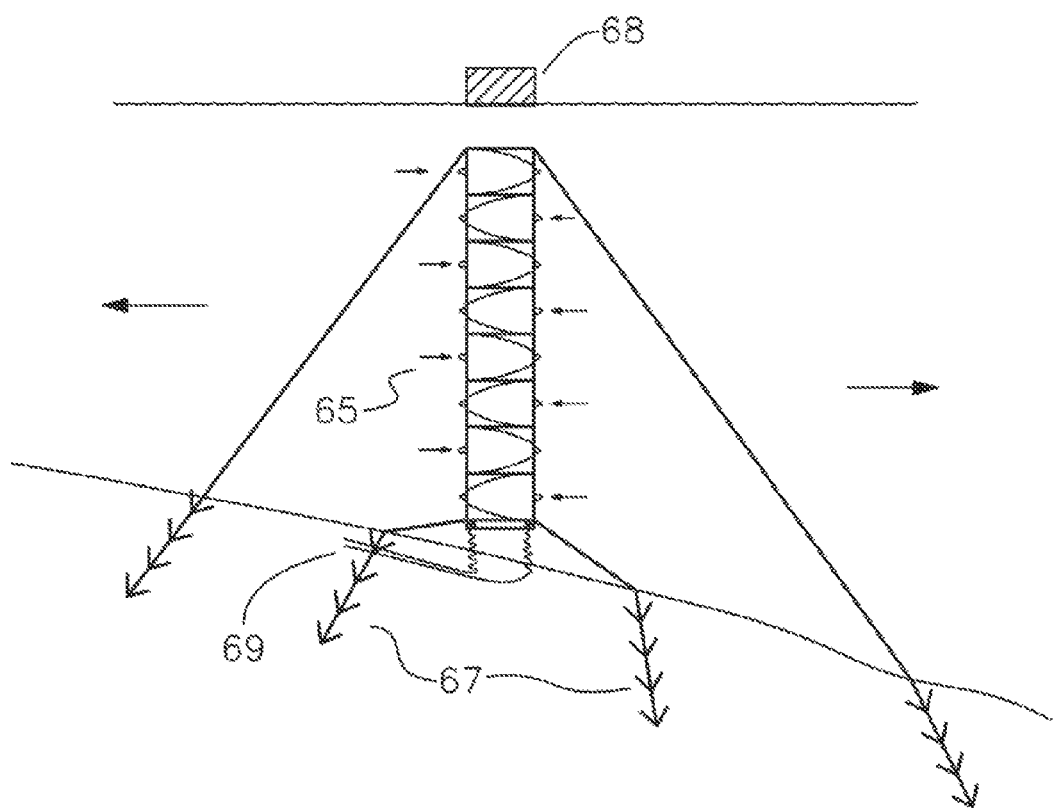
FIG. 9B is a schematic diagram illustrating an array of bi-directional cells with anchors and flotation marker and electrical connections.

FIG. 9B shows a side view of an overall arrangement of cells for receiving bi-directional flow in a stack of cells that are electrically interconnected as herein described. The stacks are preferably mounted on sturdy but lightweight housings 65 to resist the flow of ocean water and maintain stability in inclement weather. The array of cells may be affixed to the ocean floor by anchor 67 to provide greater stability. A floatation device 68 may be employed for orientation and location purposes. The cells are preferably mounted on stack trays to create an array and then are electrically summed through the operation of the electrical connection to generate power which is transmitted onward. The accumulated energy produced from the array of cells may be conveyed through conventional wire 69 means to a grid, through superconducting cable, or other electrical conveyance means well known in the art.

Figure 10A:
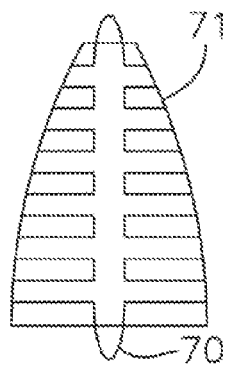
FIGS. 10A through 10D show several views of a conical turbine generator and an electricity collection tray for creating an array of cells.
Figure 10B:
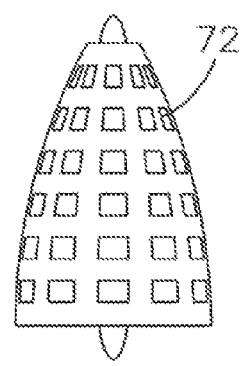
Figure 10C:
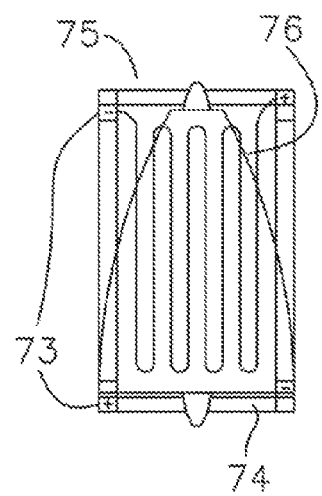
Figure 10D:
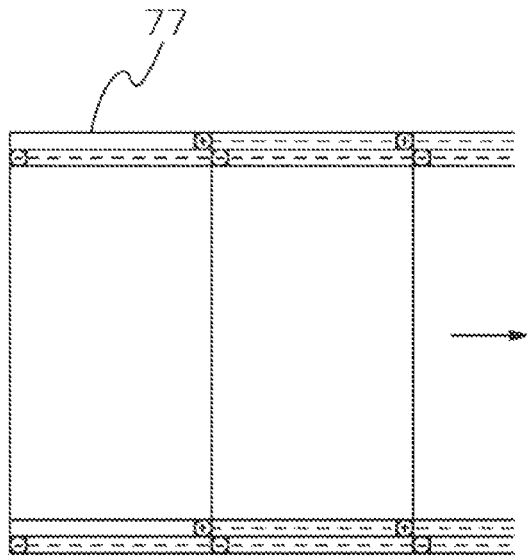

FIGS. 10A, 10B, 10C and 10D show views of a conical turbine generator having central shaft 70 and disposed about the shaft are a plurality of impeller blades in multiple stages such as stage 71. In certain embodiments, it may be preferable to have a single stage. The impeller housing has magnets 72 inserted therein or magnetic polymer imbedded in the housing. The exterior housing 75 of the turbine has terminal pass through electrical connectors 73 and a rigid support 74, which allows for stacking of individual units. FIG. 10D also shows an electricity collection tray 77 for creating an array of cells. The tray has electrical connections through copper wire or conductive polymer 76.

An innovative construction of the turbines is achieved by the use of polymers for use in polymer molds for mass production of each individual turbine. The magnetic elements of the turbine will have embedded in the turbine one of a variety of materials among them ferrous, ceramic, magnetic polymer (magneto polymer) or rare earth magnets (NdFeB) types. The use of electrically conductive polymer for cathode and anode within embedded transmission system in device and device array reduces weight and makes the manufacture of small turbines efficient and economical. Further, the use of such turbines will create zero production of $CO_2$, CO, NOx, SOx, or ozone precursors during power generation. The impeller design shown in FIG. 10 is engineered in polymer to extract maximum work in tandem use with a converging housing or nozzle.

Use of polymers for corrosion resistance, low cost manufacturing, mass production and use of polymers for impeller blades or for multiple but independent impellers may be used as well as the use of polymers for use in polymer molds for mass production and the use of the following magnet types in a polymer generator for use in generating power from the ocean: ferrous, ceramic, magnetic polymer (magneto polymer) or rare earth magnets (NdFeB) types. Further electrically conductive polymer for cathode and anode within embedded transmission system may be used in the device and device array.

Figure 11A:
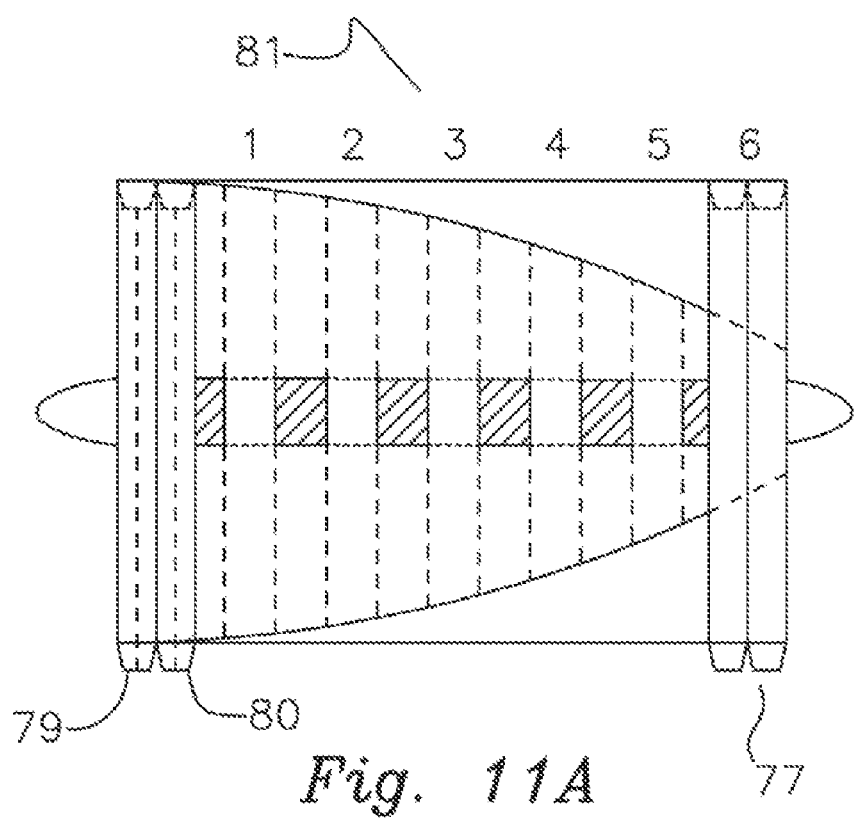
FIGS. 11A and 11B show a side and front/back view of a turbine generator having a plurality of impellers.
Figure 11B:
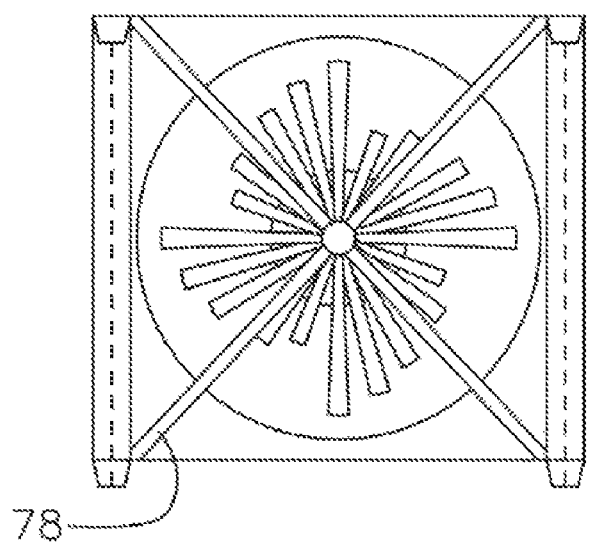

FIGS. 11A and 11B show a side and front/back view of a turbine generator having a plurality of impellers in several stages. In certain embodiments, it may be preferable to have a single stage to extract energy. The turbine is housed in an electrically interconnectable base 77 to allow for stacking of multiple cells in a vertical fashion and as part of a larger array. The cross brace 78 provides added support. Copper wire windings 79 and 80 or conductive polymer windings in alternative embodiments are configured about the impeller to produce current when magnets or magnetic material imbedded in the impeller housing spin with the turbine impeller producing magnetic flux.

Figure 12:
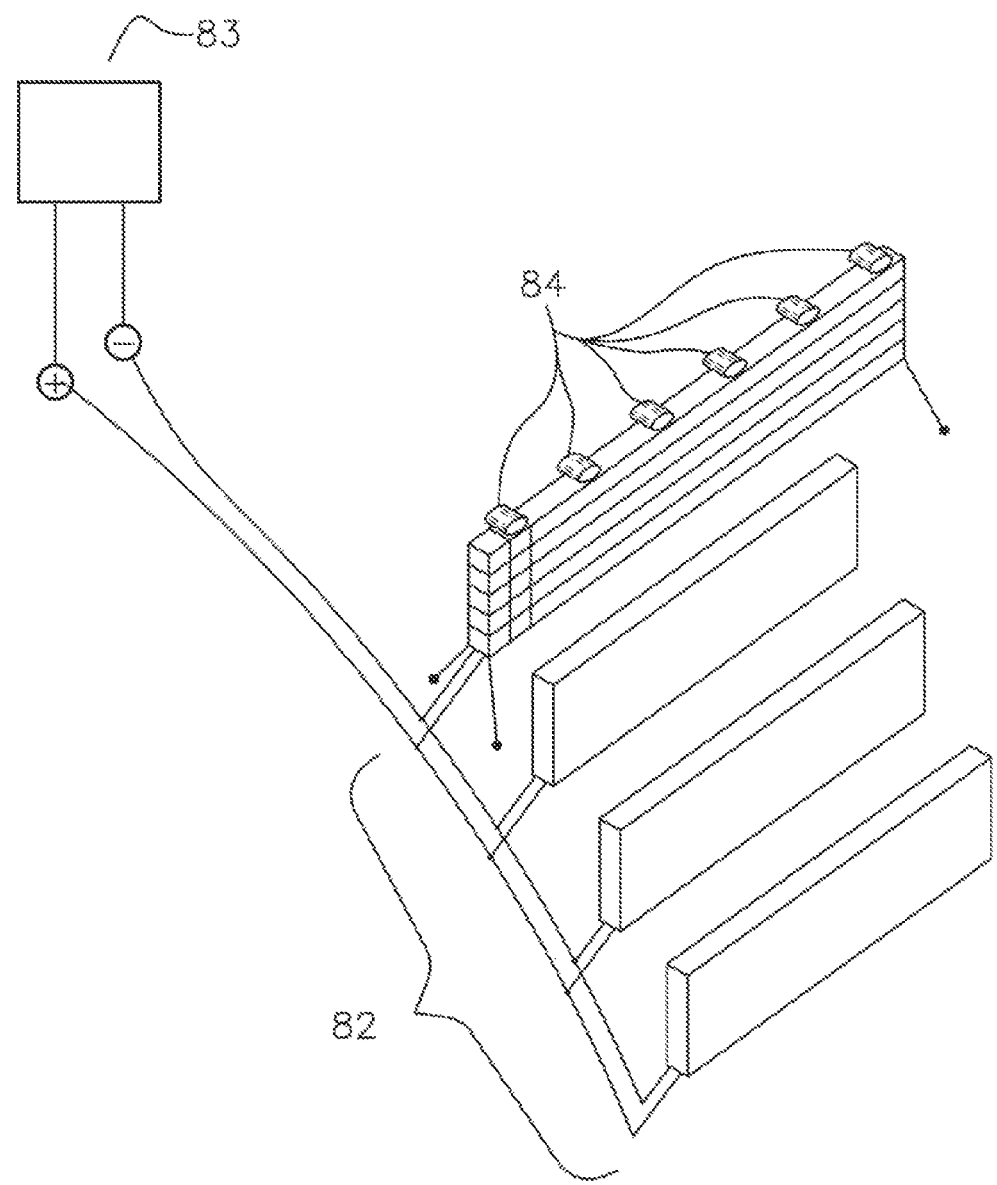
FIG. 12 shows a group of arrays of power generating cells electrically connected to the grid.

FIG. 12 show a group of arrays 82 of power generating cells electrically connected to the grid 83. The arrays are aligned at right angles to the flow of ocean tide and are electrically connected in parallel. Floats 84 are provided at the top of the arrays for alignment, location and tracking purposes. In a preferred embodiment the arrays are located near the breakwater point to capture the maximum amount of energy near the shore.

Figure 13:
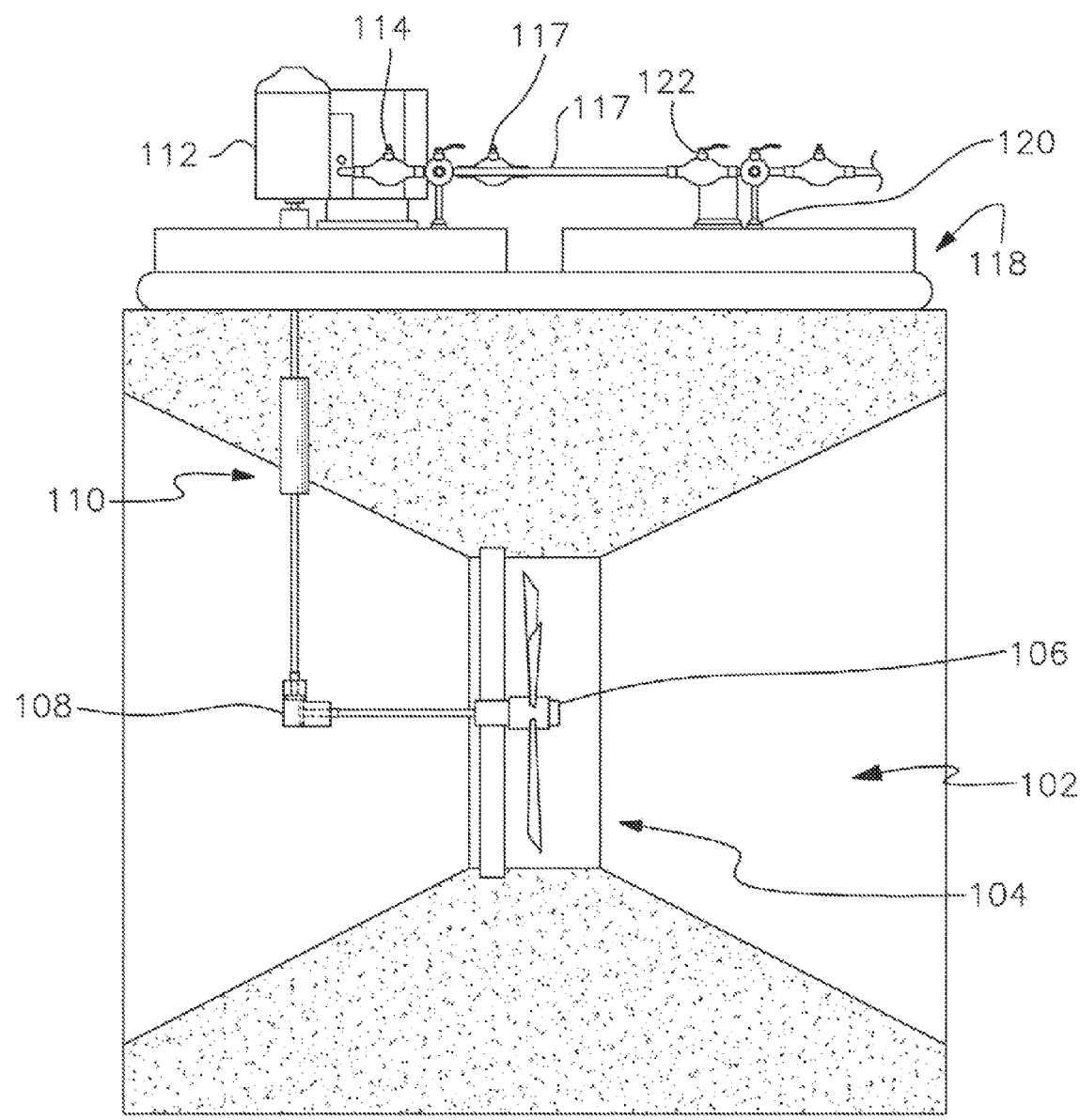
FIG. 13 shows a side view of a turbine with converging and diverging inlet and outlet nozzles respectively, connected to a hydrauflc pump combination according to a preferred embodiment of the invention.

FIG. 13 shows a perspective view of the hydraulic pump system according to a preferred embodiment of the invention. Water from a river, dam, spillway, or other source, be it kinetic or head based, flows into the turbine housing from direction 102 toward turbine section 104. As water moves through turbine section 104, it drives turbine blade 106 which generates rotational mechanical power to gearbox 108. Gearbox 108 (which may contain gear ratio to increase the rotational rate of the shaft) in turn drives shaft 110 connected to hydraulic pump 112 for the creation of high pressure hydraulic fluid. Valve 114 transfers high pressure hydraulic fluid through valves 114 and 117 which are connected via a high pressure hydraulic fluid manifold to a hydraulic motor (not shown) for further conversion of power from high pressure fluid to a generator to generate electricity. The hydraulic pump and valves are positioned on platform 118 (which may be a temporary platform including barges and boats) which floats on the surface of the body of water that provides the water power. In one embodiment, a single turbine and hydraulic pump could provide hydraulic power to the hydraulic motor and then to the generator. In another configuration, a series of interconnected turbines and pumps could be utilized.

In a preferred embodiment, platform 118 could be fixed by anchoring to the ground below the water or attaching to a structure already in place which is driven into the ground below the water (for example a piling of a dock). Valves are supported on platform 118 by stanchions 116 and 120 and are interconnected with other hydraulic pumps on separate platforms in parallel or series fashion depending on the desired performance of the overall system. In one embodiment, a group of pumps and turbines can be configured to work in conjunction with each other and depending on the valve arrangements, valve 122 can be temporarily or permanently configured to bypass hydraulic pump 112 for servicing or if it needs to be taken off line for repair while at the same time maintaining operation of the other pumps on the platform or other platforms. The turbines may be of any of a variety of well known configuration in the art such as a dual ducting venture design or non-ducted or single ducted depending on the application. The use of a series of interconnected turbine and hydraulic pumps allows for retrofit applications to flood control dams, recreational bodies of water created by dams, dam gates, spillways and other already pre-existing systems. In addition, an array of turbines and pumps could be used in tidal or ocean current settings, river current or in aqueducts and irrigation canals or effluent discharge from a man made orifice or pipe.

Figure 14:
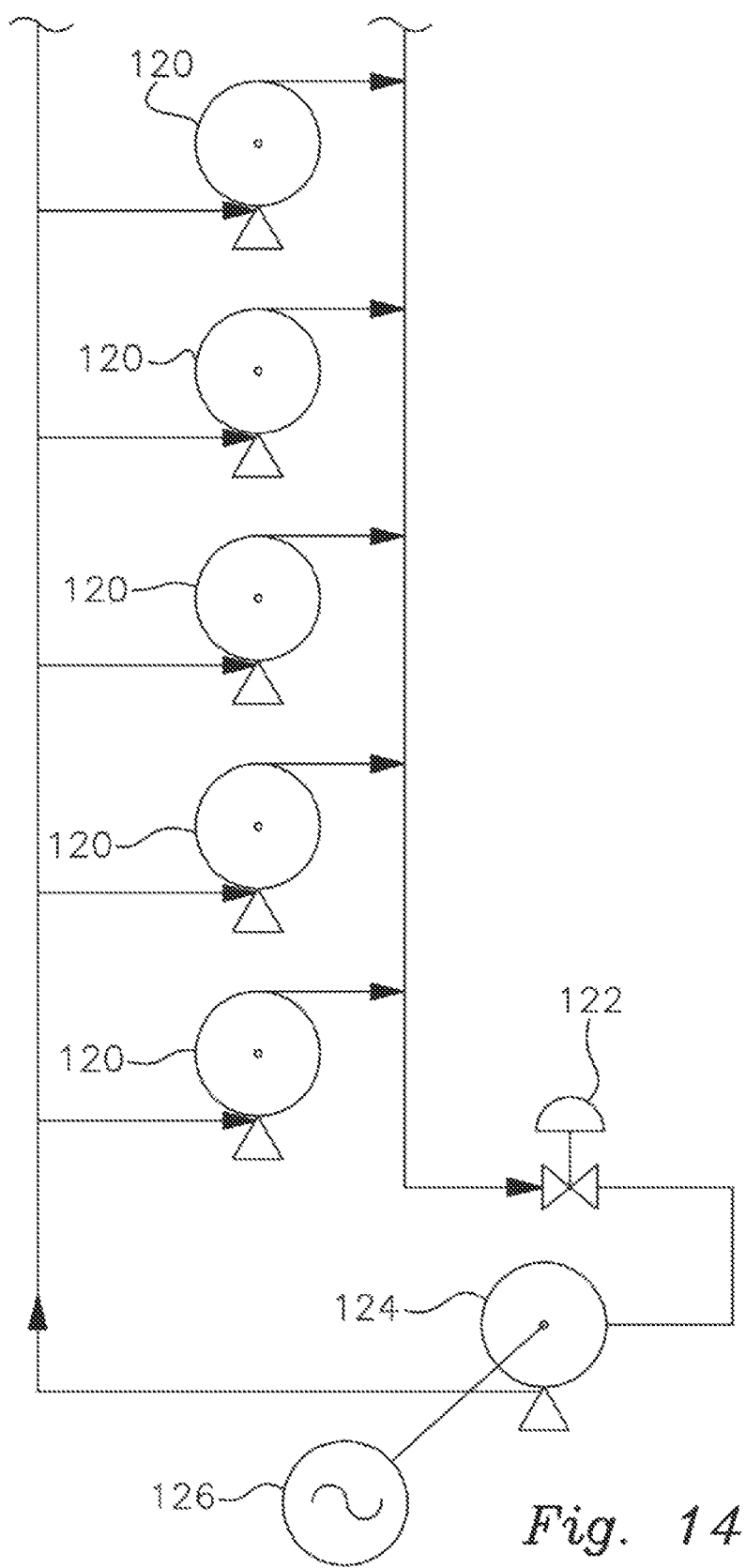
FIG. 14 shows a schematic diagram of a series of turbine driven pumps, generator and hydraulic motoraccordinato a preferred embodiment of the invention.

FIG. 14 shows a schematic diagram of a system of hydraulic pumps in parallel in a manner to transfer water generated energy from a series of turbines like that shown in FIG. 13. Hydraulic power in the form of pressurized fluid is transferred from the series of pumps 120 through a control governor 122 into a hydraulic motor 124. The output of the hydraulic motor is in turn applied to a generator 126 preferably an AC induction generator having high efficiency. The hydraulic pumps may be the only portion of the overall system that are suspended over the water deriving their power from water driven turbines. This helps in reduced maintenance, reduced operational costs, and aids in disengagement of individual hydraulic pumps for servicing and repair. It further reduces the servicing and repair needs since the pumps are not in the water itself. A series of pumps 120 can be configured in any of a variety of manners to best utilize the flow of the water and to fit any particularities of the terrain.

Figure 15:
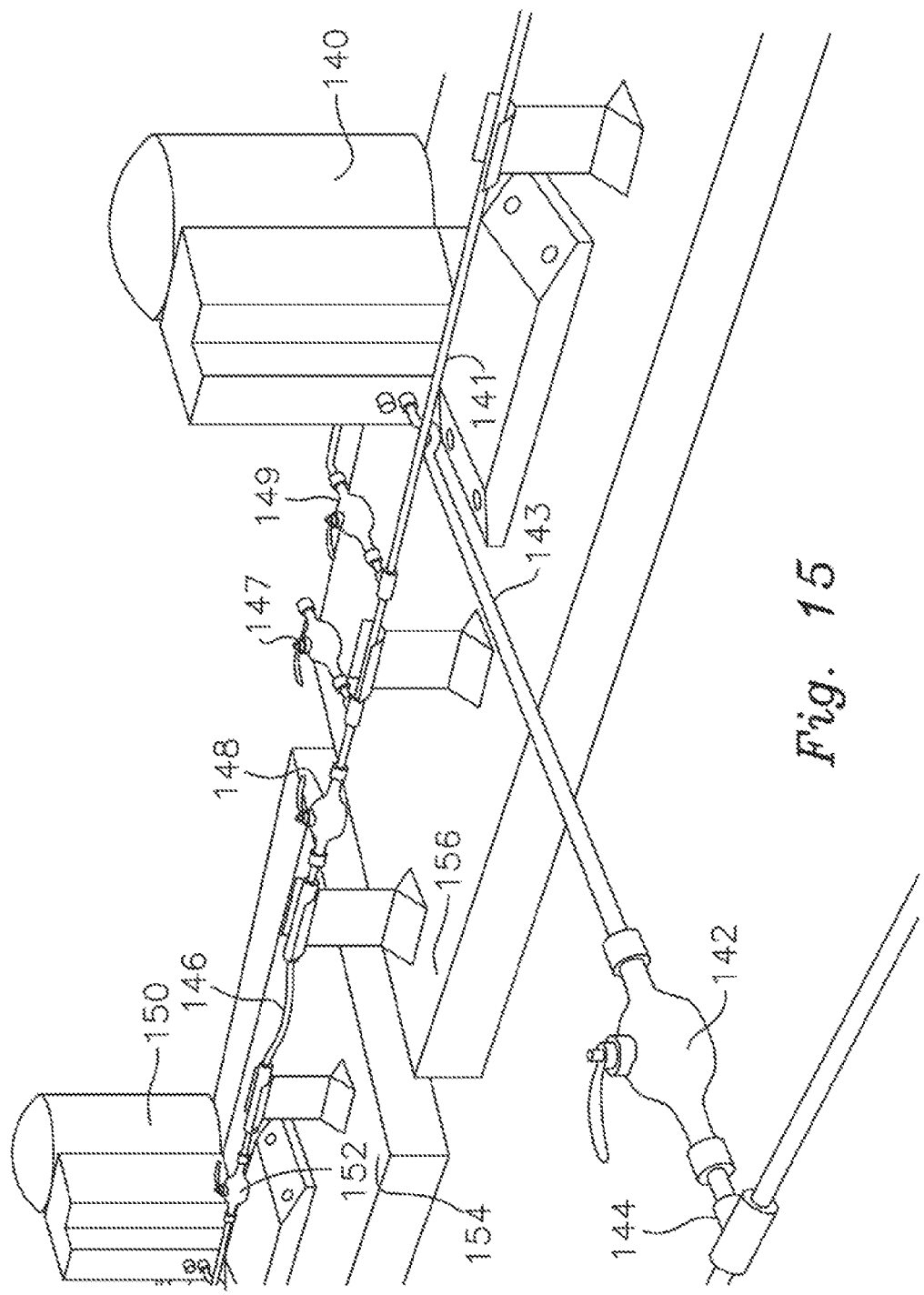
FIG. 15 shows a perspective view of platforms with hydraulic pumps according to a preferred embodiment of the invention.

FIG. 15 shows an enlarged view of the hydraulic system according to a preferred embodiment of the invention using an array of hydraulic pumps on floating platforms. Pump 140 is fed with low pressure hydraulic fluid through line 141 which is a common manifold that delivers hydraulic fluid to the pump from a reservoir (not shown). High pressure hydraulic fluid is in turn generated through line 143 and passes through governor valve (not shown) and is tied into other high pressure fluid from other pumps through a series of valves which are connected to the manifold that interconnects all of the hydraulic pumps. Governor valve (not shown) permits better synchronization of the generator with the grid by controlling the connected hydraulic motor between the pump and the hydraulic motor on the array. These may be computer controlled for better efficiency in a manner well known in the art. Valves 142 and 149 are positioned on low pressure inlet and high pressure outlet to isolate hydraulic pump 140 in the event it needs to be taken off line for servicing or repair. Bridge line 146 is preferably flexible (such as flexible high pressure hose) as it provides a connection between platform 154 and platform 156 which are hydraulically separable through the low pressure bypass valves 147 and high pressure bypass valve (not shown). It further provides a moveable and flexible hydraulic line to permit independent movement of the platforms 154 and 156 relative to each other while positioned in the water.

Figure 16:
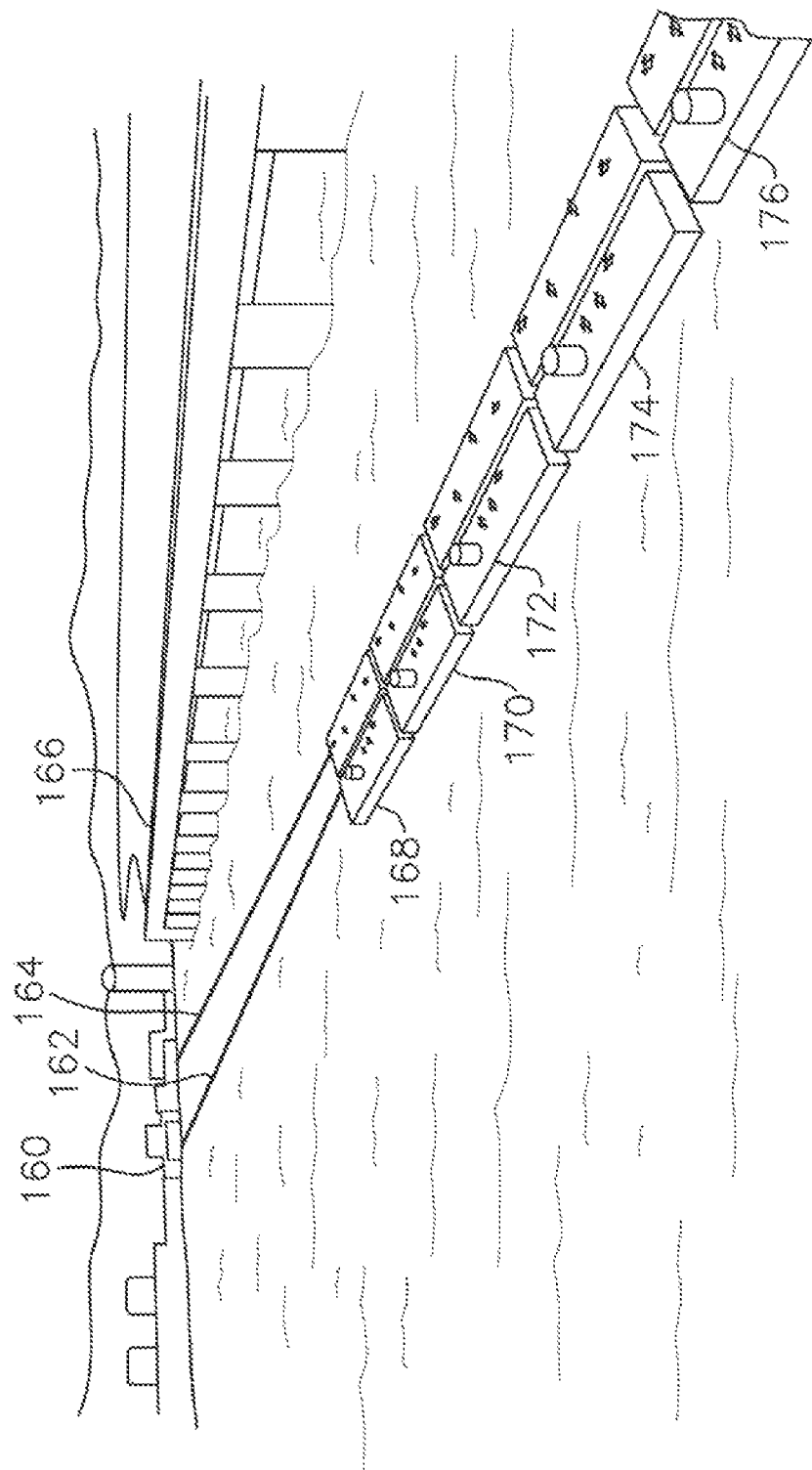
FIG. 16 shows a perspective view of a system of hydraulic pumps on a plurality of platforms positioned beside a darn to receive energy from water movement and an associated power station.

FIG. 16 shows an array of floating hydraulic pumps interconnected to each other and the generator and hydraulic motor on land via tether lines which also support the low pressure and high pressure hydraulic lines to and from the land and array. Platforms 168, 170 and 172 support hydraulic pumps configured as shown in FIG. 15. Low pressure line 162 which may be supported by a tether line or cable feeds hydraulic fluid at a low pressure to provide feed fluid for the hydraulic pumps. High pressure fluid is in turn generated from the pumps through high pressure line 164 supported by a tether line or cable, through the governor valve (on land, not shown) into a hydraulic motor which in turn is connected to an synchronous AC induction generator. The hydraulic pumps are driven by turbines that are suspended below the water from the platform (but could be anchored to the ground beneath the water).

The high efficiency synchronous AC induction generator (or other generator type) converts the mechanical energy of rotation into electricity based on electromagnetic induction. An electric voltage (electromotive force) is induced in a conducting loop (or coil) when there is a change in the number of magnetic field lines (or magnetic flux) passing through the loop. When the loop is closed by connecting the ends through an external load, the induced voltage will cause an electric current to flow through the loop and load. Thus rotational energy is converted into electrical energy. The induction generator produces AC voltage that is reasonably sinusoidal and can be rectified easily to produce a constant DC voltage. Additionally, the AC voltage can be stepped up or down using a transformer to provide multiple levels of voltages if required.

Figure 17B:
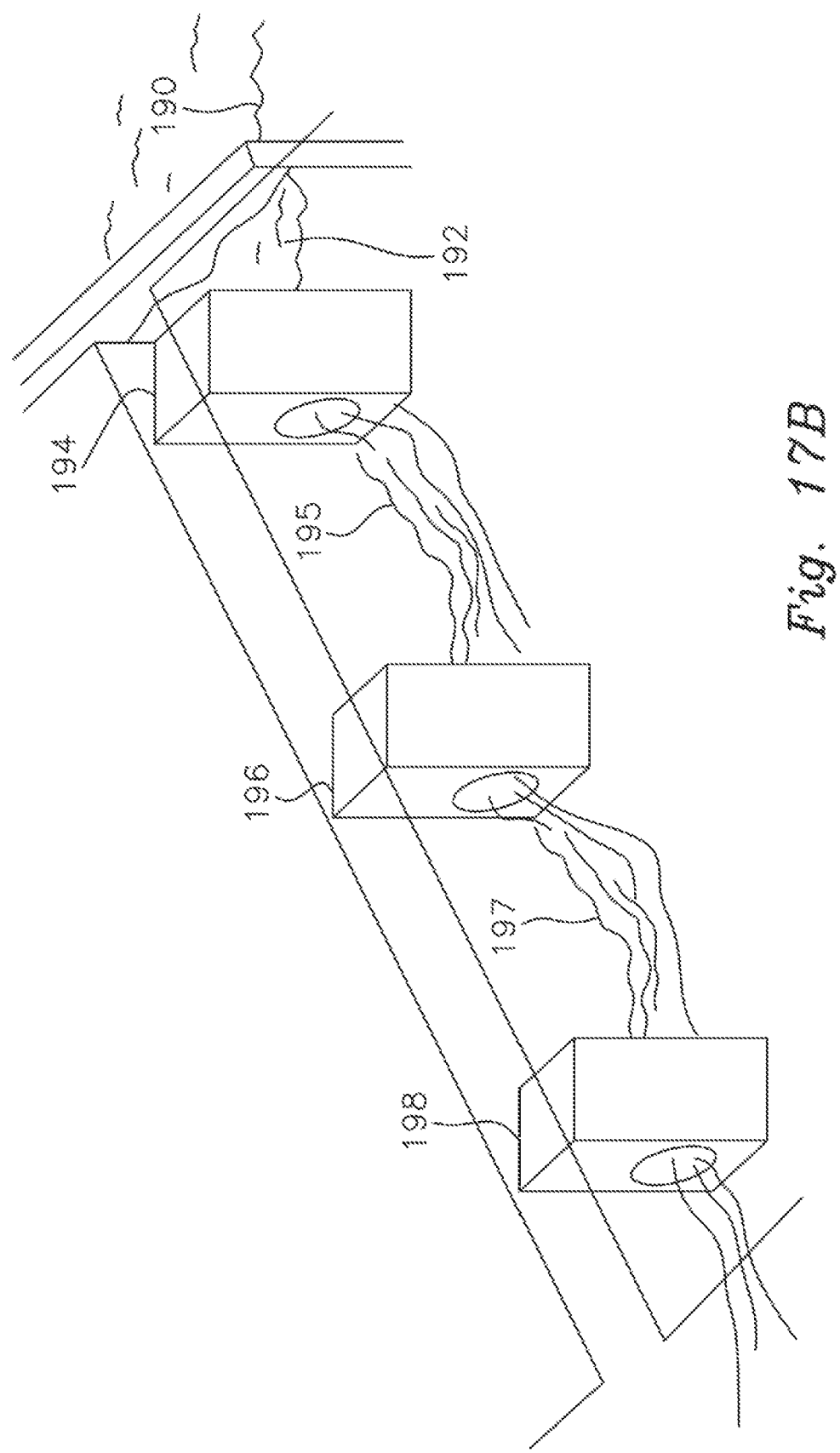
FIG. 17B shows a side view of an arrsy of turbines positioned in a spillway for genetion of electric power with turbine driven hxdraulic pump.

FIGS. 17A and 17B show placement of the system according to a preferred embodiment of the invention in a spillway or dam. FIG. 17A shows dam 180 in front of body of water 182. Spillway 184 permits the flow of water through, a channel to engage turbines 186 and 188. Although only two turbines are shown, there may be any of a number of turbines depending on the size of the spillway and they could be arrayed in a plurality of locations in the spillway with hydraulically interconnected pumps driven by turbines. Hydraulic pumps 181 and 183 are positioned on the dam to receive rotational energy from the turbines which in turn generate hydraulic power through a hydraulic motor (not shown) to a generator 184. The turbines and pumps may be arrayed in any number depending on the application or the configuration of the dam. The turbines and pumps may be arranged in parallel or serial fashion but are preferably interconnected to maximize power. Further, by placing the hydraulic pumps outside of the flow of water, they may be easily interchanged, serviced or repaired without taking the entire system down as shown by the hydraulic bypass system in FIG. 15. FIG. 17B shows a side view of turbines 194, 196 and 198 positioned in the channel 192 which receives head water power from water source 190 as the water traverses down channel 192, it passes through turbine 194. As water passes through turbine 194 it cascades down the channel as water 195 which builds up behind turbine 196 to generate water power. Water that has passed through turbine 196 cascades as water 197 which in turn builds up and provides water power for turbine 198. Each of the turbines 194, 196 and 198 are connected to hydraulic pumps which are connected to a common manifold for generation of high pressure hydraulic fluid which in turn passes through a governor valve then drives a hydraulic motor and induction electric generator for the generation of electric power.

Figure 18:
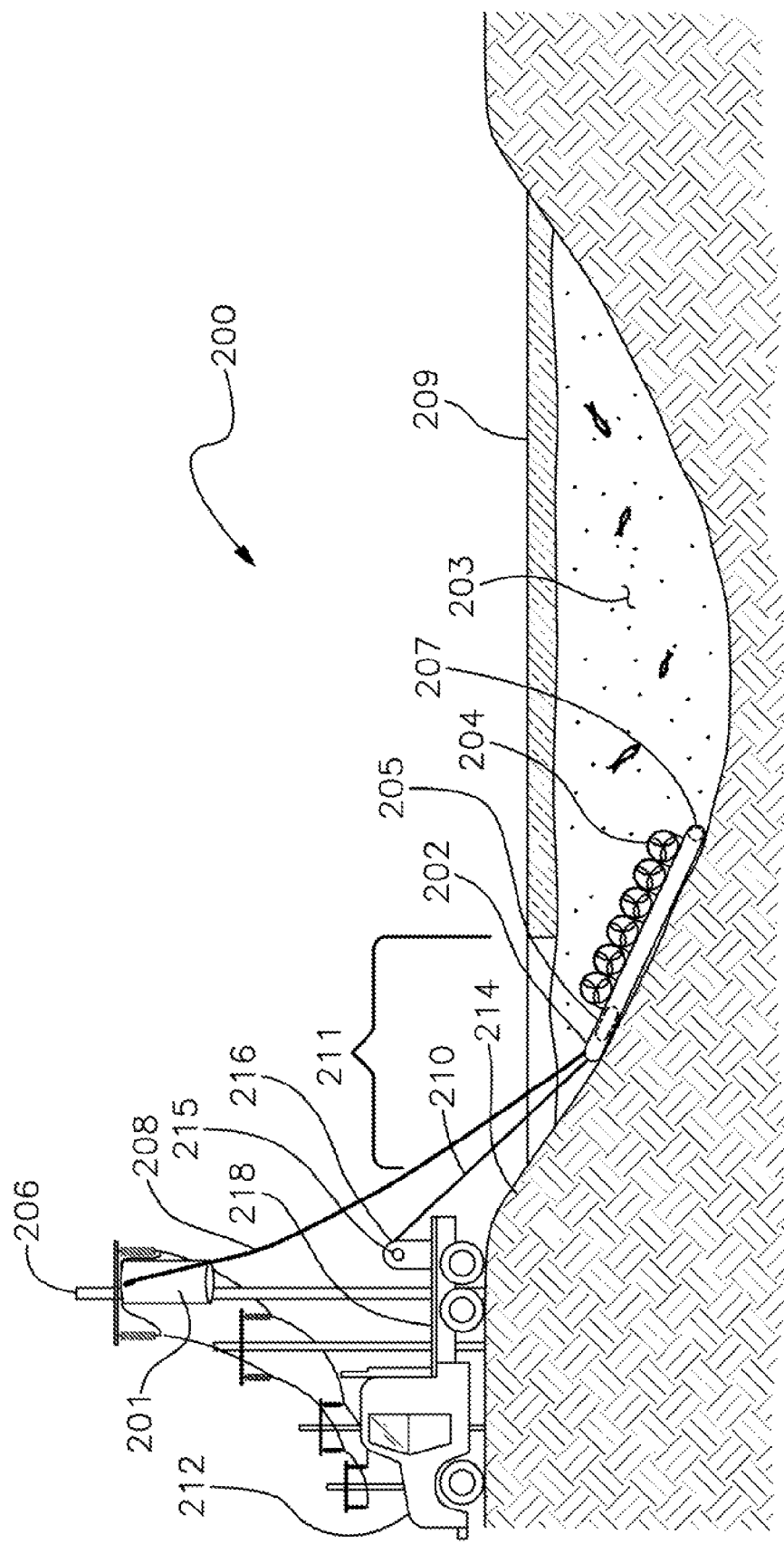
FIG. 18 shows a schematic view of a translationally adjustable sled and a power generating cell fixedly coupled to the translationally adjustable sled.

Referring now to FIG. 18, a system for power generation through movement of fluid 200, including a translationally adjustable sled 202, a power generating cell 204 fixedly coupled to the translationally adjustable sled 202, power grid distribution 206 electrically connected to transformer 201 and a transmission line 208 operationally connecting the power generating cell 204 and the power grid distribution through said transformer is illustrated according to a preferred embodiment of the present application. Power generating cell 204 receives fluid energy from a fluid medium 203 and transmits power to the power grid 206 via transmission line 208. In this particular embodiment, power generating cell 204 is a turbine. Tethering mechanism 210 operatively connects to translationally adjustable sled 202 for adjusting the location of translationally adjustable sled 202. A vehicle 212 (or a large winch in another preferred embodiment) connects to tethering mechanism 210 for adjusting the location of the translationally adjustable sled 202. In an embodiment of the present application, tethering mechanism 210 is a cable, fluid medium 203 is water, and vehicle 212 is a heavy duty truck or tractor type automobile.

Tethering mechanism 210 is employed to physically connect translationally adjustable sled 202 to a control member (not shown). Control could be achieved by human intervention or automated system well known in the art. Tethering mechanism 210 extends from an end of translationally adjustable sled 202 and connects to a fixed aperture disposed about vehicle 212 which allows for adjusting the location of translationally adjustable sled 202. In this particular embodiment tethering mechanism 210 is proximally disposed between an end of vehicle 212 and translationally adjustable sled 202. In an alternative embodiment, one or more tethering mechanisms 210 may be disposed about various locations of both vehicle 212 and translationally adjustable sled 202. For example, a tethering mechanism may be attached to an end of translationally adjustable sled 202, while another tethering mechanism may be attached to a side of translationally adjustable sled 202. Each of the tethering mechanisms may be adjusted individually or in combination to adjust the location of the translationally adjustable sled. In another example, a tethering mechanism may be connected to an end of translationally adjustable sled, while another tethering mechanism may be connected to a bottom or a top of translationally adjustable sled. Tethering mechanisms may be adjusted individually or in combination to adjust both the horizontal and vertical location of translationally adjustable sled. In certain preferred embodiments, translationally adjustable sled may be engaged to a conveyor belt, roller system, track or other land-based system to facilitate movement of the sled once removed from the water.

In other embodiments, tethering mechanisms may be connected to one or more vehicles. In certain embodiments tethering mechanisms may optionally include electrical or hydraulic communication between one or more sleds. In certain embodiments, tethering mechanisms may be rigid, semi-rigid, or non-rigid. Tethering mechanisms may be a single rigid body, such as an I-beam, or tethering mechanism may be of a non-rigid body, such as a rope. Tethering mechanisms may also be a semi-rigid body such as a cable. Tethering mechanisms may be permanently coupled or removably coupled to vehicle and to translationally adjustable sleds.

Tethering mechanism 210 remains partially disposed between land, shoreline or bank 214 and fluid medium 203. In certain embodiments, tethering mechanism 210 may remain permanently affixed to translationally adjustable sled 202 and surface 214 or alternatively, may be removably attached to translationally adjustable sled 202 and surface 214. Additionally, tethering mechanism 210 can be adapted to independently control translationally adjustable sled 202 located entirely offshore, i.e. a connection to a vehicle such as a boat or barge. Furthermore, internal C-Pumps, non-positive displacement pumps, or positive displacement pumps, may be used to control ballasting of translationally adjustable sled 202 to make movement and relocation easier. The sled would include ballast compartments that could be manually operated from the shore or automatically or though remote manual control with electromechanical actuators and indicator/controller systems.

In this particular embodiment vehicle 212 is a truck. Vehicle 212 includes a flat bed 218 which in certain embodiments may be used to remove and store translationally adjustable sled 202. Vehicle 214 employs an aperture 215 formed from a single tow member 216 which allows for coupling tethering mechanism 210. In certain embodiments, aperture 215 and single tow member 216 may be connected to a winch for adjusting the location translationally adjustable sled 202. In certain embodiments, the winch may be able to load and offload translationally adjustable sled 202 onto or off of vehicle 212. In other embodiments, vehicle 212 may be of another type of moving apparatus such as a train, a boat, a tank, a hot air balloon, helicopter or a blimp. In these embodiments, tethering mechanism 210 may be connected to vehicle 212 about one or more locations. In certain embodiments, vehicle 212 may be able to move freely, such as by automobile which has tires or a boat with a motor, while in other embodiments, vehicle 212 may be constrained to translating along a controlled axis, such as a train moving along rails.

Translationally adjustable sled 202 includes substantially hollow portions 205 and 207 capable of receiving and releasing ballast. Ballast may be used to both raise and lower translationally adjustable sled 202 in a fluid medium. Ballast may be used to adjust translationally adjustable sled 202 along X-Y, Y-Z, or X-Z planes or any combination thereof. Translationally adjustable sled 202, may be disposed in and surrounded by fluid medium 203 while disposed below rigid body 209. An opening 211 exists along rigid body 209 to allow for the release of translationally adjustable sled 202. Ice may form rigid body 209. Translationally adjustable sled 202 may move across the top of rigid body 209 and below rigid body 209. In an alternative embodiment, a tube may extend from one fluid medium to another fluid medium to allow ballast to be received and released from translationally adjustable sled.

In other embodiments, power generating cell 204 may be removably coupled to translationally adjustable sled 202. In alternative embodiments translationally adjustable sled 202 may be floating or partially submerged below, above or within fluid medium 203. When it is desirable to submerge translationally adjustable sled 202 to attain optimal generation, ballasting may be received by substantially hollow portions 205 and 207 to partially or fully submerge translationally adjustable sled 202. When desirable to raise translationally adjustable sled 202 to a higher or lower position in fluid medium 203, ballast may be released or filled to in turn allow translationally adjustable sled 202 to be raised or lowered in a fluid medium. Similarly, ballast may be released or received via substantially hollow portions 205 or 207 to move translationally adjustable sled 202 from one location to another location. Additionally, translationally adjustable sled 202 is capable of automatically releasing or receiving ballasting as water temperatures increase and decrease, in order to raise and lower translationally adjustable sled 202 in fluid medium 203 to attain optimal power generation for system for power generation through movement of fluid 200.

Figure 19:
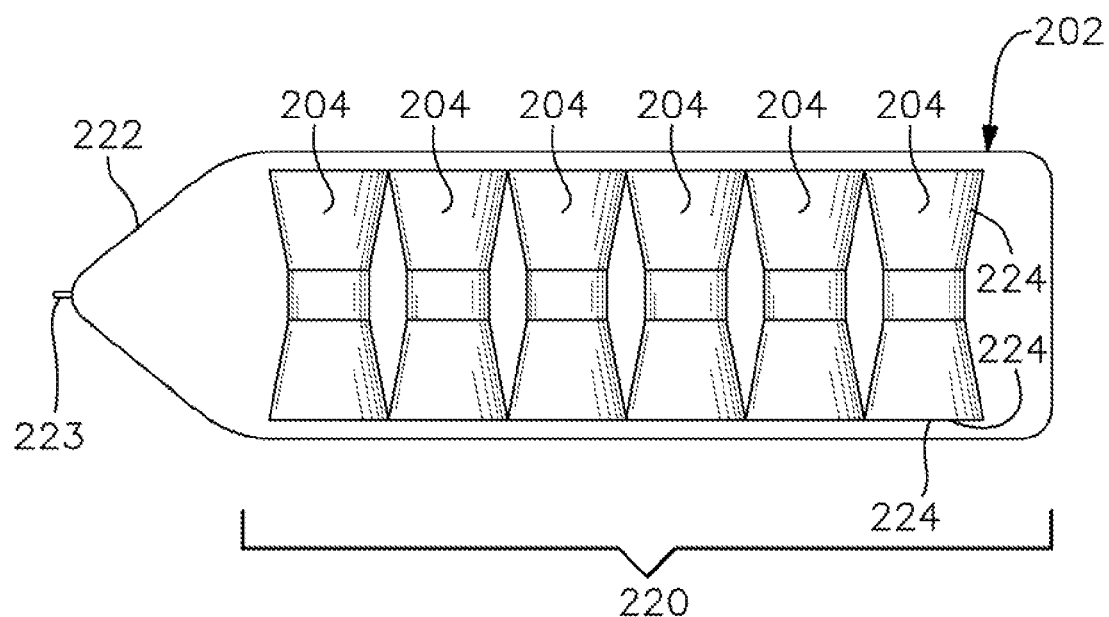
FIG. 19 shows a top view of power generation cells affixed to translationally adjustable sled as illustrated in FIG. 18.

Referring now to FIG. 19, a top view of power generation cells 204 affixed to translationally adjustable sled 202 as illustrated in FIG. 18 is illustrated. Translationally adjustable sled 202 has a substantially rectangular body 220 and a substantially triangular head 222 with a proximal tip 223. In other preferred embodiments, substantially triangular head 222 may be rectangular or other desirable shapes. Proximal tip 223 includes a coupling mechanism for attaching tethering mechanism 210 (shown in FIG. 18). Substantially triangular head with "V-shaped" keel in some embodiments 222 is shaped as such to allow for smoother translation in a fluid medium. When translationally adjustable sled 202 is disposed in a fluid medium, substantially triangular head 222 helps to decrease drag resistance of translationally adjustable sled 202.

Power generating cells 204 include ducting 224 which is oriented in converging and diverging orientations. Ducting 224 may have any of a variety of ducting configurations, including a diverging duct on the outlet or inlet, or both, a converging duct on the outlet, inlet or both, or a combination of diverging and converging ducts. Because fluid may be input into power generating cells 204 from a multitude of directions, ducting 224 may expand so that each of power generating cells 204 abuts an adjacent power generating cell 204 to attain a maximum amount of fluid flow. Ducting 224 of power generating cells 204 substantially curves to minimize drag exertion along the longitude of translationally adjustable sled 202. In an alternative embodiment, a power storage facility, such as a battery (not shown) may be operatively coupled to power generating cells 204.

Figure 20:
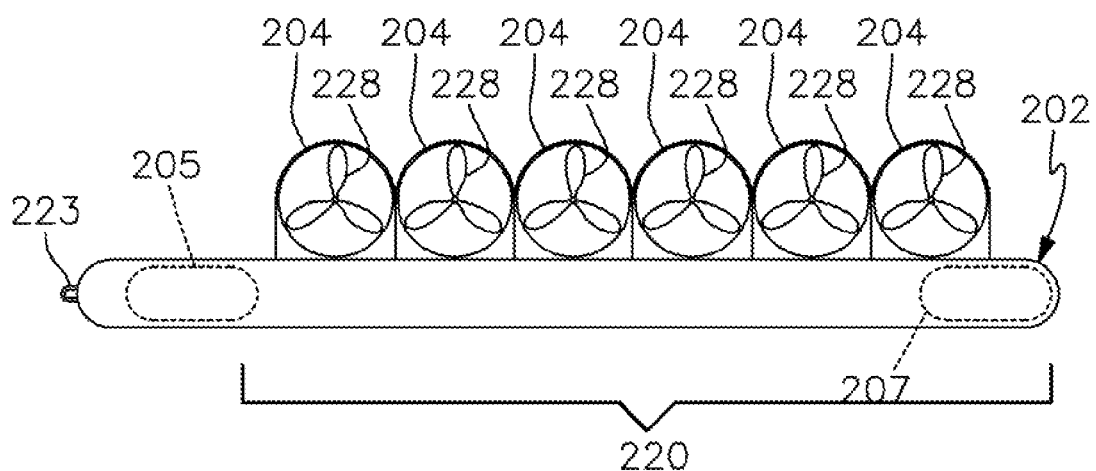
FIG. 20 shows a side view of power peneratin cells affixed to translationally adjustable sled as illustrated in FIGS. 18 and 19.

Referring now to FIG. 20, a side view of power generating cells 204 affixed to translationally adjustable sled 202 as illustrated in FIGS. 18 and 19 is illustrated. Impellers (turbine fans) 228 are disposed within power generating cells 204. Accordingly, substantially hollow portions 205 and 207 are disposed along sides of translationally adjustable sled 202. Substantially hollow portions 205 and 207 are employed for receiving and releasing ballast as necessary and serve as a ballast control system. In alternative embodiments, more than or less than two substantially hollow portions may be employed and located about various locations of translationally adjustable sled 202. For example, in an alternative embodiment, a single substantially hollow portion may be located along the longitudinal center of translationally adjustable sled 202 to equally disseminating ballast throughout substantially rectangular body 220 and substantially triangular head 222. Further, substantially hollow portions may be operatively associated with non-communicable ballast chambers. For example, substantially hollow portions may separate the ballast communicated at substantially hollow portion 205 and substantially hollow portion 207 into two or more non-communicable chambers. Ballast input into substantially hollow portion 205 can extend into only one end of translationally adjustable sled 202 which includes substantially triangular head 222, while ballast input into substantially hollow portion 207 may extend into the remaining portion of translationally adjustable sled 202 which extends throughout substantially rectangular body 220. In alternative embodiments, substantially hollow portions may vary in number and accommodate to various lengths of translationally adjustable sled 202. For example substantially hollow portions 205 and 207 may allow for ballast to be received and released from and to midpoints of translationally adjustable sled 202.

By including separable substantially hollow portions for ballast communication, the angle at which translationally adjustable sled 202 is situated can be controlled. For example, when translationally adjustable sled 202 free floats in a fluid medium, and the optimal angle for power generation changes due to fluid flow shifts, ballast can be received and released from substantially hollow portions as necessary. For example, if translationally adjustable sled 202 is disposed having top and bottom faces oriented parallel to the horizon and the fluid flow direction changes to thirty degrees offset from the horizon, ballast may be released from substantially hollow portions to rotate and orient translationally adjustable sled 202 at a similar angle, thus allowing power generation cells 204 to accrue optimal amounts of fluid flow.

Planar faces of translationally adjustable sled 202 to which power generating cells 204 are coupled provide for a smooth horizontal transition between substantially triangular head 222 and substantially rectangular body 224. Power generating cells 204 extend to a plane which is lying above substantially triangular head 222. In alternative embodiments, substantially triangular head 222 extends to the same plane which extends above triangular head 222 for decreasing the amount of drag exerted on power generating cells 204 when translationally adjustable sled 222 is moved within fluid medium 203.

Referring now to FIG. 21, a system for power generation through movement of fluid 200 including a translationally adjustable sled 202, a set of collapsible turbine vanes 230 operatively coupled to translationally adjustable sled 202, longitudinally extending shaft 232, and energy transforming member 234 for receiving power from the set of collapsible turbine vanes 230 is illustrated according to a preferred embodiment of the present invention Translationally adjustable sled 202 and longitudinally extending shaft 232 cooperate to dispose the set of collapsible turbine vanes in fluid medium 203. In alternative embodiments, sled 202 may also be surface mounted on barges or pontoons and suspended over water for deployment of said turbine blades. Further, said turbine blades may be deployed in a variety of configurations including a Kaplan, or Darrius type turbine, horizontal impact or horizontal shaft, vertical shaft or helical orientations. In one embodiment, sled 202 may be placed over an opening on a barge or pontoon so that the turbine blades may be deployed into water below without use of an articulating joint depending on the configuration of the blades.

Collapsible turbine vanes 230 are capable of collapsing to protrude through rigid member 209. In a preferred application, rigid member 209 may be a sheet of ice. Collapsible turbine vanes 230 connect to articulating joint 234. Articulating joint 234 extends from system for power generation through movement of fluid 200 via longitudinally extending shaft 232 which operably connects to generator 236 which extends and retracts longitudinally extending shaft 232 via gearing apparatus 238. Gearing apparatus 238 allows longitudinally extending shaft 232 to articulate substantially normal to translationally adjustable sled 202. Longitudinally extending shaft 232 includes gear teeth 240 which operatively communicate with gearing apparatus 238. In a preferred embodiment, gearing apparatus 238 rotates along gear teeth 240 which extend from longitudinally extending shaft 232 to raise and lower longitudinally extending shaft 232 through an aperture. In an alternative embodiment, gear teeth 240 may be recessed within longitudinally extending shaft 232 or formed a single groove to allow gearing apparatus to rotate longitudinally extending shaft 232 and in turn raise or lower longitudinally extending shaft 232. Shaft 232 may also be fitted with holes 271 for placement of a set pin 269 shown inserted into to relieve stress on gear 238 and gear teeth 240 once shaft 232 is deployed to fix positioning of shaft 232 at a preferred location. Translationally adjustable sled 202 includes a platform 242 for distributing weight away from insertion point of collapsible turbine vanes 230 and to support translationally adjustable sled 202. Substantially round members 244 are axially connected to translationally adjustable sled 202 to provide locomotion. In the preferred embodiment, substantially round members 244 are wheels which are track mounted. In alternative embodiments, fewer than four substantially round members 244 may be employed and adjusted to various heights relative to the rigid member 209.

Collapsible turbine vanes 230 hingedly connect to power transfer member 246 and are allowed to expand and collapse as necessary. Power transfer member 246 is disposed within longitudinally extending shaft 232 and acts to convey energy generated by collapsible turbine vanes 230 to generator 236. A hinging mechanism connects power transfer member 246 and collapsible turbine vanes 230 to allow articulation of collapsible turbine vanes 230. Power transfer member 246 is tangentially disposed within longitudinally extending shaft 232 to allow power transfer member 246 and longitudinally extending shaft 232 to articulate in tandem. In alternative embodiments, shaft 232 may be arranged in a vertical orientation without an articulating joint, wherein turbine vanes 230 are perpendicular to shaft 232.

Gearing apparatus 238 includes a sprocket having teeth which correspond to other gear teeth 240 of longitudinally extending shaft 232. In certain embodiments ridges are vertically formed along shaft 240 and extend perpendicular to teeth of gearing apparatus 238 to extend and retract collapsible turbine vanes 230 and articulating joint 234. Each of gear teeth 240 are evenly spaced to allow gearing apparatus 238 to uniformly extend and retract longitudinally extending shaft 232 about rigid body 209.

In operation, longitudinally extending shaft 232 raises and lowers collapsible turbine vanes 230. Articulating joint 234 positions collapsible turbine vanes 230 between zero and one-hundred eighty degrees relative to fluid flow 203. Collapsible turbine vanes 230 expand and collapse via hinged connections. Collapsible turbine vanes 230 are initially positioned above rigid body 209 and in a fully collapsed and retracted position aligned parallel to longitudinally extending shaft 232. As longitudinally extending shaft 232 is lowered towards fluid flow 203, turbine vanes 230 penetrate rigid member 209. In summer months, or when ice is not present, rigid member 209 may be a barge, pontoon or other floating device for placement of sled 202. Once longitudinally extending shaft 232 is fully lowered, articulating joint 234 may rotate and collapsible turbine vanes 230 may expand using hinged connections. To relocate system for power generation through movement of fluid 200 to another location, collapsible turbine vanes 230 collapse via hinged connections while articulating joint 234 positions collapsible turbine vanes 230 to extend parallel to longitudinally extending shaft 232. Longitudinally extending shaft 232 retracts via gearing apparatus 238. When collapsible turbine vanes 230 retract past rigid structure 209, substantially round members 244 allow for translation of system for power generation through movement of fluid 200.

Referring now to FIG. 22 a system for power generation through movement of fluid 200 is depicted with the longitudinally extending shaft 232 retracting from rigid member 209 is illustrated. Collapsible turbine vanes 230 are fully retracted and aligned in parallel to longitudinally extending shaft 232 and power transfer member 246. Articulating joint 234 aligns collapsible turbine vanes 230 and power transfer member 246 parallel to longitudinally extending shaft 232 as it retracts past rigid member 209. Gearing apparatus 238 rotates a sprocket in a counter clockwise direction to retract longitudinally extending shaft 232 from rigid member 209. As gearing apparatus 238 rotates, a sprocket interacts with gear teeth 240 of longitudinally extending shaft 232 to raise and lower collapsible turbine vanes 230 that are hingedly connected to power transfer member 246 and operatively connected to longitudinally extending shaft 232. Longitudinally extending shaft 232 is supported via bracing structure 248 which distributes the load imposed by the shaft towards substantially round members 244. In another preferred embodiment, sled 202 may be replaced with a mounting plate which can be affixed to ice on the surface of a river, wherein said generator 236, and associated shaft and turbine vanes are mounted to the plate and deployed through a hole in the ice below the plate.

Figure 23:
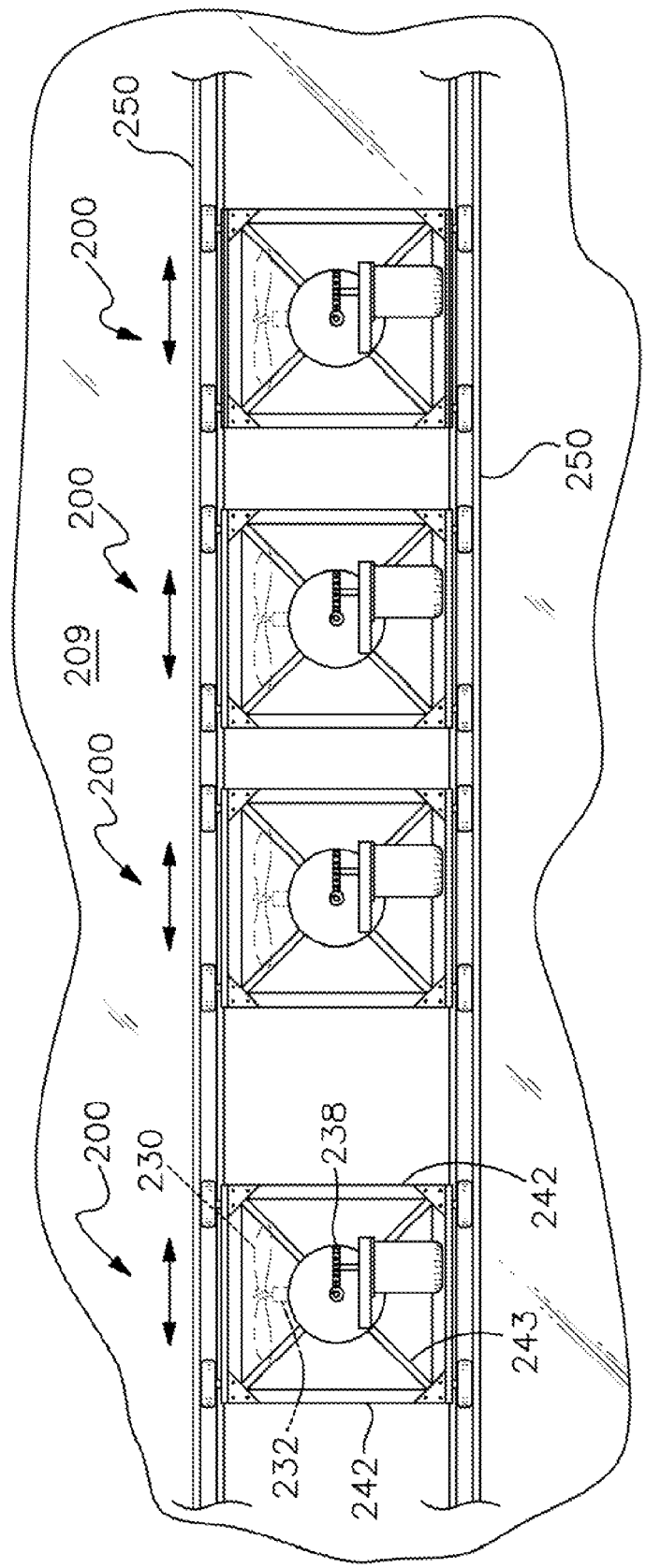
FIG. 23 shows a plan view of an array of platform mounted systems for generation of power through movement of fluid mounted along a track system.

Referring now to FIG. 23 an array of platform mounted systems for generation of power through movement of fluid 200 mounted along a track system 250 are illustrated in plan view according to a preferred embodiment of the present application. Accordingly, four platform mounted systems for generation of power through movement of fluid 200 are shown having collapsible turbine blades 230 expanded while located below a rigid member 209. Longitudinally extending shafts 232 are lowered via gearing apparatuses 238. Each platform 242 includes cross braces 243 to distribute the load of generator 236 away from the penetration point in rigid member 209 created by collapsible turbine blades 230. Each end of the cross braces 243 secures to an edge of platform 242 supporting system for generation through movement of fluid. In an alternative embodiment, other support members may be employed and platforms 242 may take other shapes. For example, in alternative embodiments, platforms 242 may be round, triangularly shaped, ovularly shaped, or take any other form that allows for a load to be distributed away from a penetration point.

Figure 24:
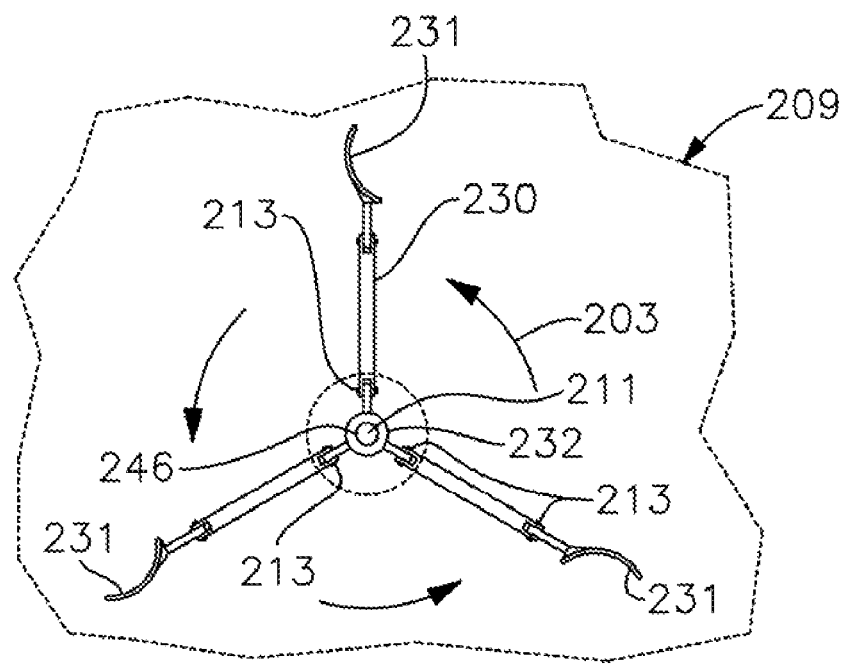
FIG. 24 shows a bottom view of an alternative embodiment of collapsible turbine vanes having hydrofoils rotating relative to longitudinaly extending shaft.

Referring now to FIG. 24 a bottom view of an alternative embodiment of collapsible turbine vanes 230 having hydrofoils 231 rotating relative to longitudinally extending shaft 232 and articulating mechanism (not shown) via power transfer member 246 while disposed below the rigid member 209 through a penetration point 211 as illustrated in FIGS. 21 and 22 is shown according to an embodiment of the present application. Accordingly, hydrofoils 231 are shown rotating in a generally counter-clockwise direction of fluid flow 203 and concavely shaped. Hinged connections 213 allow for temporary stabilization of collapsible turbine vanes 230. An articulating joint helps to vertically stabilize collapsible turbine vanes 230 while allowing for rotation and transfer of energy. In alternative embodiments collapsible turbine vanes 230 rotate in a counter-clockwise direction and may be convexly shaped or flat. In certain embodiments, damping mechanisms and spring damping mechanisms may be located between collapsible turbine vanes 230 and an articulating mechanism.

Figure 25:
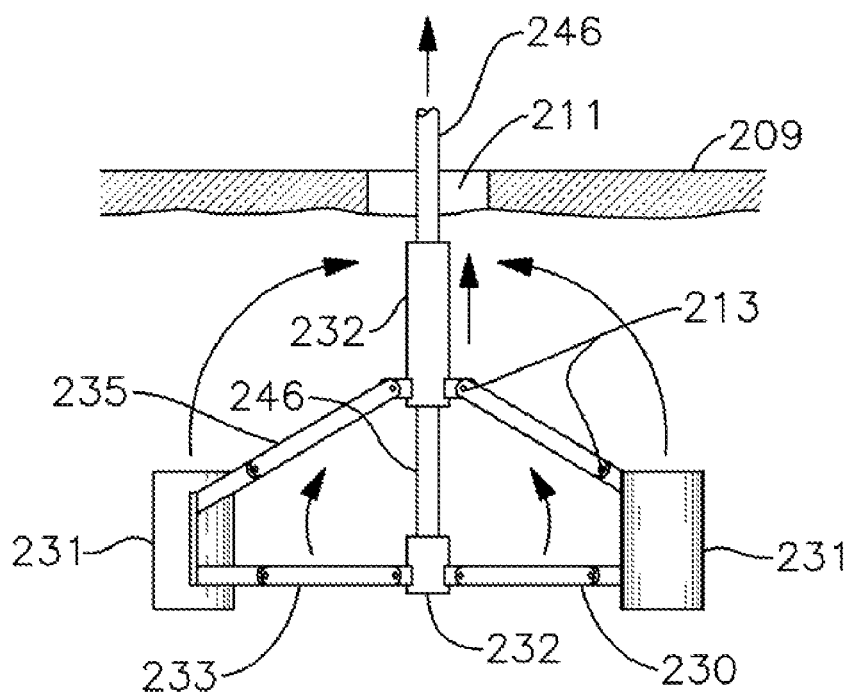
FIG. 25 shows a side view of the alternate embodiment of the longitudinally extending shaft and power transfer member and coflapsible turbine vanes shown in FIG. 24 and removable via a penetration point.

Referring now to FIG. 25 a side view of the alternate embodiment of the longitudinally extending shaft 232, power transfer member 246, and collapsible turbine vanes 230, shown in FIG. 24 is shown being removed from rigid member 209 via the penetration point 211. In this embodiment, collapsible turbine vanes 230 are capable of folding into portions via hinged connections 213 and for retracting hydrofoils 231. Hydrofoils 231 fold inwards during retraction of longitudinally extending shaft 232. Collapsible turbine vanes 230 form lower partitions 233 and upper partitions 235. Lower partitions 233 and upper partitions 235 work in unison when expanded via hinged connections 213. Hinged connections 213 cause upper partitions 235 and lower partitions 233 to be of unequal lengths. Both upper partitions 235 and lower partitions 233 fold inwards and towards longitudinally extending shaft 232. Collapsible turbine vanes 230 hingedly connect to longitudinally extending shaft 246 via hinged connections 213. Both lower portions 233 and upper portions 235 extend from longitudinally extending shaft 232 to act as a bracing mechanism for collapsible turbine vanes 230. Scoops 231 extend from collapsible turbine vanes 235 for absorbing fluid energy. In this particular embodiment, scoops 231 align about shaft 232.

Figure 26:
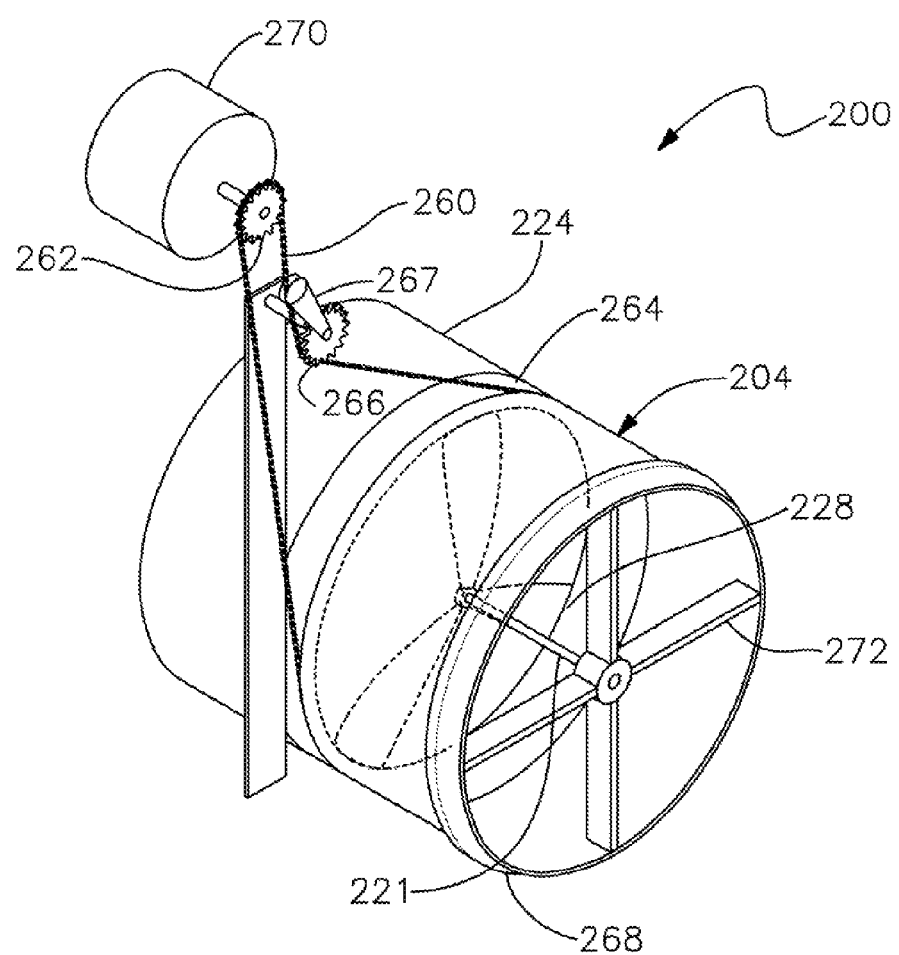
FIG. 26 shows a perspective view of a power generating cell having a rounded outer wall made of ducting, and one or more impellers fixedly coupled to a ring engaged to a turbine driven shaft and chain drive.

Referring now to FIG. 26, a system for power generation through movement of fluid 200, including a power generating cell 204 having a rounded outer wall made of ducting 224, and one or more impellers 228 fixedly coupled to ring 264 is illustrated according to a preferred embodiment of the present application. Ducting 224 may be of any of a variety of configurations including diverging and converging combinations in the outlet and input side of the impellers 228. Fluid is transmitted about the one or more impellers 228 to cause impellers 228 to rotate in response. Chain member 260 fixedly couples to ring 264 for transmitting energy caused by rotation of the one or more impellers 228. Ring 264 has a series of teeth or grooves for engagement to chain member 260. Chain member 260 couples to a first chain sprocket 262 and a second chain sprocket 266, which allows first chain sprocket 262 to rotate faster than ring 264. Ducting 224 is connected to ring 264 by energy transfer member 221 through impellers 228 which is connect to the inner wall of ring 264 by bolts or pins or is integrated into the manufacture of ring 264 and which ducting is stable during rotation of ring 264. Chain member 260 is engaged to first chain sprocket 262 and second chain sprocket 266 for transference of rotational energy from the operation of impellers 228 and ring 264. Second chain sprocket 266 is operably engaged to tensioner 267 for maintaining constant tension on the chain. The tensioner can be manually or automatically adjusted. A generator 270 connects to first chain sprocket 262 for receiving energy from chain member 260.

In certain embodiments impellers 228 may be slip mounted to axle 221, in order to transfer the energy via rotation by a fluid load. Additionally, axle 221 couples ducting 224 via cross bracing 272. Furthermore, in some embodiments, impellers 228 and axle 221 are formed as a single component. In certain embodiments a fluid tight housing may surround a portion of ring 264 for retaining a lubricant between chain member 260 and ducting 224.

Chain member 260 couples via a mounted sprocket to an outer circumference of ring 264 for transmitting energy to generator 270. As impellers 228, axle 221, and ring 264 rotate in unison, chain member 260 correspondingly rotates. In alternative embodiments, chain member 260 may be of another type of engaging member such as a belt, a wire member, hook and loop mechanism or combination of linked mechanisms such as a mechanical worm gear that may engage another member. Ring 264 preferably includes a mounted sprocket formed along its outer circumference, for engaging chain member 260. However, alternative coupling devices for attaching chain member 260 may be employed in alternative embodiments. For example, flat ridges, hooks, triangularly shaped tips; and other mechanisms may be engage chain member 260 that extend from ring 264. In other embodiments, ring 264 may be engaged to a drive gear that extends outside the water body and engages a generator or other drive mechanisms for power transference.

In operation, as impellers 228 rotate a moment is imposed on ring 264 which acts as part of a speed increasing gear. On first chain sprocket 262, the rate of rotation rate will be faster than on ring 264. The rotational rate is a function of the gear ratio of the two sprockets. In another embodiment additional gearing mechanisms may be operably coupled to ring 264 and disposed at various locations. For example, in another embodiment, additional gearing mechanisms may attach to ends of the ring 264 such as direct drive gear (not shown). Also, each gearing mechanism may have a different radius than another gearing mechanism. In another embodiment, a plurality of sprockets or gearing mechanisms may be employed to achieve differing gear ratios.

Figure 27:
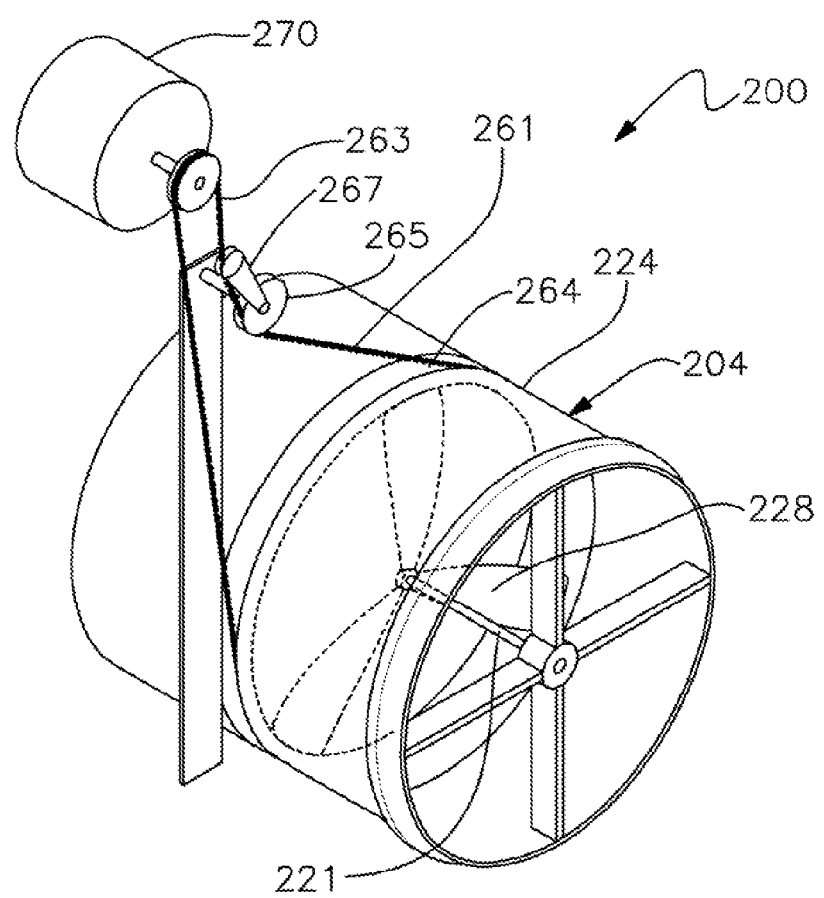
FIG. 27 shows a perspective view of an alternative system having a power generating cell having a rounded outer wall made of ducting, and one or more impellers fixedly coupled to a ring engaged to a turbine driven shaft and belt drive.

Referring now to FIG. 27, a system for power generation through movement of fluid 200, including a power generating cell 204 having axle 221 disposed within ducting 224, and one or more impellers 228 fixedly coupled to the axle 221, and a cross brace fixedly coupling the axle 221 to the ducting 224 is illustrated according to a preferred embodiment of the present application. Fluid is transmitted about the one or more impellers 228 to cause the ring 264 to rotate in response.

A belt member 261 removably couples to the ring 264. A first pulley 263 connects to the belt member 261 and connects to the generator 270 for receiving energy from the one or more impellers 228. The belt member 261 couples to the first pulley 263 to allow the first pulley 263 to rotate at a greater rate than the second pulley 265. A tensioner 267 coupled to second pulley 265 is disposed between first pulley 263 and second pulley 265 for transferring additional energy to first pulley 263 and for selectively adding tension to belt member 261. In another embodiment, several pulleys may be employed to achieve desired rotational speed of the generator shaft.

Figure 28:
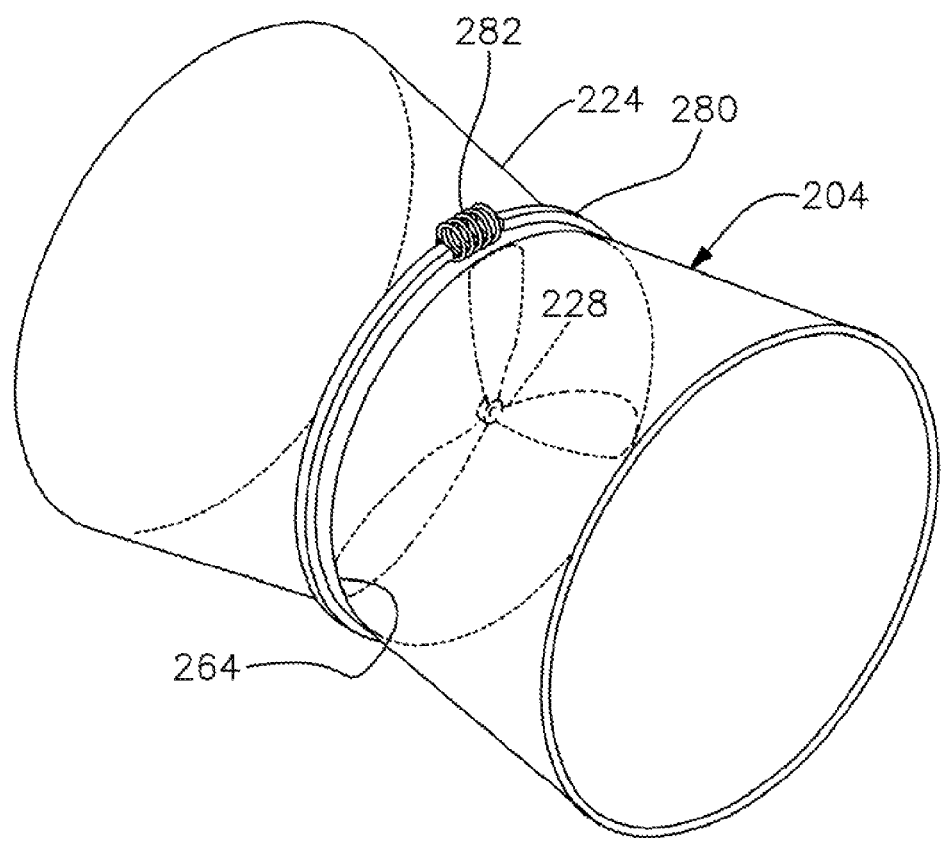
FIG. 28 shows a perspective view of a power generating cell having ducting, one or more impellers disposed within ducting, and a tension band coupled to the outer wall of the cell.

Referring now to FIG. 28, a system for power generation through movement of fluid 200 including a power generating cell 204 having ducting 224, one or more impellers 228 disposed within ducting 224, and a tension band 280 coupled to the outer wall is illustrated according to a preferred embodiment of the present application. The tension band 280 adjusts ducting 224 to impact the rotation of the one or more impellers 228. A groove 264 for disposing tension band 280 is formed about a longitudinal midpoint of ducting 224. A spring member 282 is coupled to tension band 280 for maintaining tension about ducting 224. In an alternative embodiment, an adjustable spring member couples to the tension band 280 for altering tension imposed on ducting 224.

In operation, as impeller rotates at various degrees, tension within tension band 280 may be altered to cause ducting 224 to physically prevent one or more impellers 228 from rotating at an intended rate. In turn the resulting flow increases fluid pressure within the turbine as well as the rotation of one or more impellers 228. In certain embodiments ducting 224 may be controlled by a human or other controlling member.

In certain embodiments tension band 280 may be rigid, while in other embodiments tension band 280 is flexible. In an embodiment of the present application tension band 280 may be fixably attached to ducting 224. Groove 264 can be located along both the inner and outer circumference of ducting 224 to provide for one or more tension bands 280 to exert and release tension. As it becomes necessary to exert or release tension, one or more tension bands 280 may be pulled away from or released towards ducting 224. As one or more tension bands 280 are pulled away from ducting 224, friction is exerted to cause ducting 224 to contract and slow one or more impellers 228. As one or more tension bands 280 are released from ducting 224, less friction is exerted in turn causing ducting 224 to allow one or more impellers 228 to spin and fluid to flow more freely within power generating cell 204.

In certain embodiments of the present application, one or more tension band 280 may be operatively coupled to a motor, pulley, disc brake or other device capable of exerting and releasing tension. In one embodiment of the present application one or more tension bands 280 may spin and be in a quasi-continuous or fully continuous contact with ring 264. As tension needs to be exerted on ring 264 a motor or pulley moves away from power generating cell 204. As tension needs to be released from ring 264 a motor or pulley may be moved towards power generating cell 204.

In certain embodiments of the present application, two or more tension bands 280 may be disposed around ring 264. One tension band 280 may be disposed about frontal edges of impellers 228 while another tension band 280 may be disposed about distal edges of impellers 228. When tension bands 280 are disposed in this manner, ring 264 can selectively allow impellers to increase or decrease in rotation as desired. Further, each of tension bands 280 may be optionally disposed in corresponding grooves 264 to provide a guide path.

In another embodiment of the present application, tension band 280 may optionally include clips or grooves. As tension needs to be exerted upon ducting 224, clips and or grooves may be pressed towards one another or pulled away from one another. It is intended that as clips or grooves are pushed towards one another tension is released from ducting 224. It is further intended that as clips or grooves are pulled away from one another tension is exerted upon ducting 224

In certain embodiments of the present application, tension band 280 may be made of a hard material such as metal and may be inelastic. In other embodiments of the present application, tension band 280 may be made of a soft material such as rubber or a high density polyethylene material and may be elastic.

Additionally, friction can be exerted through tension band 280 in a variety of manners to impede or stop rotation. For example tension band 280 may alter in material composition, such as through heating or cooling to allow for retraction of expansion of ducting 224. In an alternative embodiment a caliper based system can be employed. A disk brake may be attached directly to ducting 224 allowing physical contact to be exerted or released upon ducting 224 or ring 264 to speed up or slow down impellers 228 as desired. In another embodiment, the rotational speed of the turbine may be slowed down by diverting the flow around the unit, thereby decreasing the energy coming from the moving water source.

In certain embodiments power generating cell 204 may include certain safety features, including being having illumination technology coupled to various portions of flexible ducting 224 for warning of location of power generating cell 204 during the night time. Additionally, impellers 228 may be capable of operating at extremely low speeds so that aquatic life is not damaged during certain periods of operation. Further collision warning systems may be operatively associated with power generating cell 204 so that foreign objects, such as boats, barges, airplanes and other fluid operating vehicles are warned of the presence of power generating cell 204.

Figure 29:
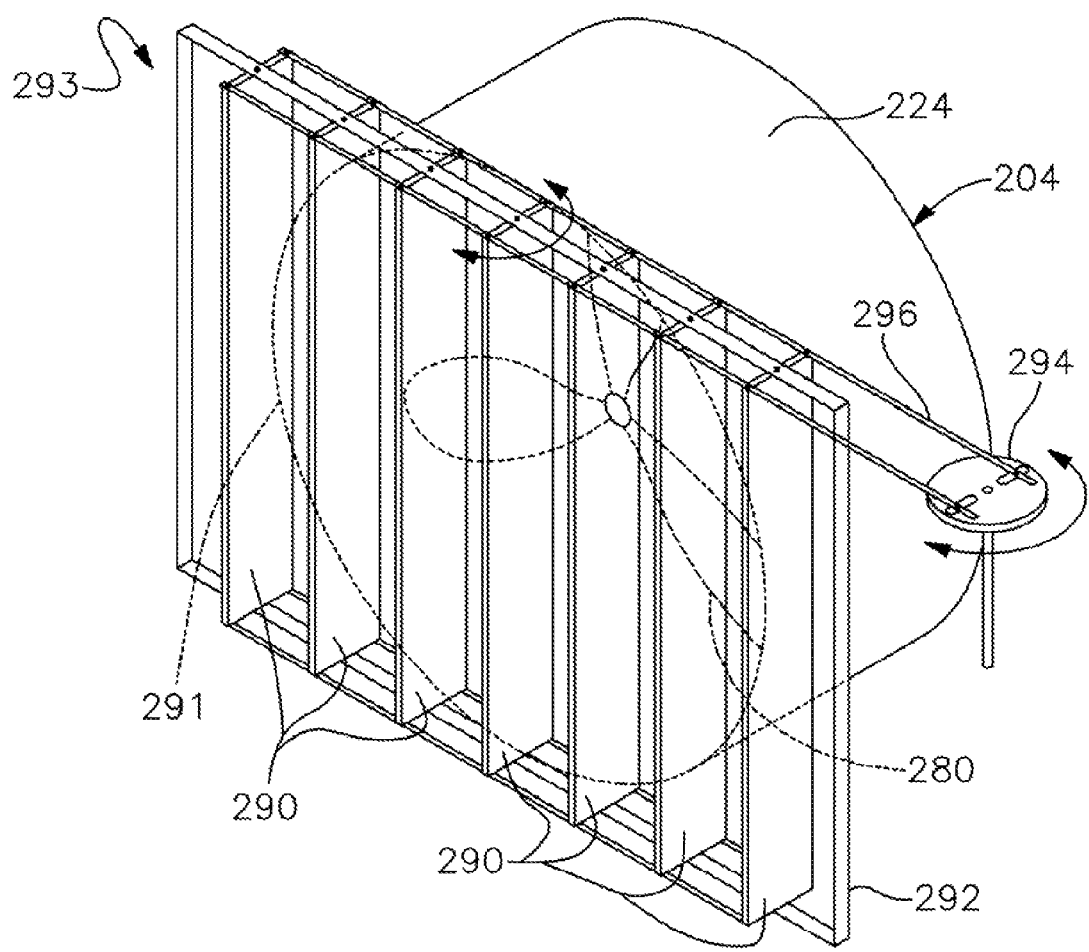
FIG. 29 shows a perspective view of a power generating cell with an inlet duct and a system for diverting flow mounted about the inlet duct of the power generating cell.

Referring now to FIG. 29, a system for power generation through movement of fluid 200, having a power generating cell 204 with an inlet duct 291 and a system for diverting flow 293 mounted about the inlet duct 291 of the power generating cell 204. Power generating cell 204 includes an inlet duct 291 which may be flexible or change shapes, a ducting 224 extending from the inlet duct 291, and one or more impellers 280 disposed about the inlet 291. System for diverting flow 293 mounted about the inlet duct 291 of the power generating cell 204 includes a bracket 292 and one or more adjustable louvers 290. One or more adjustable louvers 290 translate to affect fluid disposed about the inlet duct 291.

Uprights 296 connect to the one or more adjustable louvers 290 to translate one or more adjustable louvers 290 in unison. In this particular embodiment, one or more adjustable louvers 290 translate in unison via pivoting. A shifting mechanism 294 adapts to one or more adjustable louvers 290 to remotely adjust the one or more louvers 290. In an alternative embodiment one or more adjustable louvers 290 may pivot via a controller, which may either be automated or a human. As one or more adjustable louvers 290 translate, they tangentially align upon pivoting ninety degrees.

Figure 30:
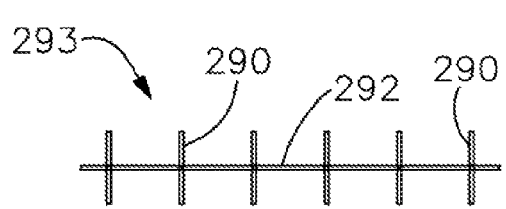
FIG. 30 shows a top view of a power generating cell with a system for diverting flow including one or more adjustable louvers mounted via a bracket as illustrated in FIG. 29.

Referring now to FIG. 30, a top view of system for diverting flow 293 including the one or more adjustable louvers 290 mounted via bracket 292 as illustrated in FIG. 29 is shown. Accordingly bracket 292 of system for diverting flow 293 abuts the inlet duct 291 by at least two points. Because system for diverting flow 293 abuts inlet duct 291 or is positioned some distance in front of inlet duct 291 and one or more adjustable louvers 290 may pivot ninety degrees, fluid flow can be entirely diverted from power generating cell 204 and impellers 280.

Each of one or more adjustable louvers 290 is moved towards and away from an inlet to create various flow amounts. As each of one or more adjustable louvers 290 needs to be moved, an operator can adjust each of one or more adjustable louvers 290 to an open position, closed position, or semi-open position. In certain embodiments each of one or more adjustable louvers 290 is connected to other adjustable louvers 290 through various means. One or more adjustable louvers 290 may be mechanically attached to one another, or in alternative embodiments, one or more adjustable louvers 290 may be in communication with one another through electrical means. In other embodiments each of one or more adjustable louvers 290 may be connected to one another through electro-mechanical means. Adjustable louvers 290 are oriented in a substantially vertical fashion and extend around an opening by abutting a face of an opening or are positioned some distance in front of an opening. In an alternative embodiment, each of adjustable louvers 290 may be oriented in a substantially horizontal fashion. In yet another embodiment, two sets of one or more adjustable louvers 290 may be employed with some oriented in a substantially horizontal fashion and the other oriented in a substantially vertical fashion.

One or more adjustable louvers 290 can be positioned in an open position, a closed position, and positions anywhere in between open and closed. In alternative embodiments, several of the one or more adjustable louvers 290 may remain permanently open, permanently closed, or permanently mounted in a position anywhere in between. In another embodiment, one or more adjustable louvers 290 may close through rotating. In an alternative embodiment a series of one or more adjustable louvers 290 may be located along an outlet. Also, the series of one or more adjustable louvers 290 may be oriented in various fashions. For example, in alternative embodiments of the present application one or more adjustable louvers 290 may be staggered or aligned in pairs, or in any other orientation or combination.

Each of one or more adjustable louvers 290 is movable along various orientations and through various means. For example, in an embodiment, one or more adjustable louvers 290 are connected in an electrically interconnected array and can be moved either individually or in combination through electromechanical means. Alternatively one or more adjustable louvers 290 can be moved via mechanical means. Also one or more adjustable louvers 290 can be proximally disposed past the inlet of the turbine or they can be located at an offset location. Additionally, one or more adjustable louvers 290 can be operated and communicate with an operator via wireless signals.

Also, one or more adjustable louvers 290 can be translated or rotated via computer signal and the rate of their insertion can be controlled to displace water in the most efficient way. One or more adjustable louvers 290 can be inserted from an outer circumferential position towards an inner circumferential position or optionally, one or more adjustable louvers 290 can be inserted from an inner circumferential position towards an outer circumferential position. One or more adjustable louvers 290 may be moved from a proximal position to a distal position and vice versa. Additionally, one or more adjustable louvers 290 can be of a type in which increase flow or they may be combined into a single component that positions in front of the turbine to prevent flow through.

Figure 31:
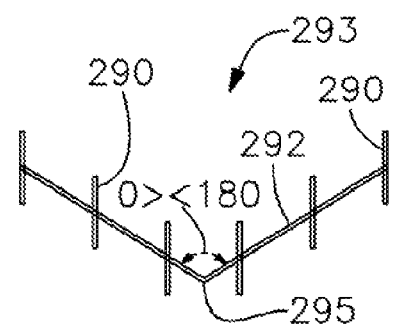
FIG. 31 shows a top down view of a power generating cell with an alternative system for diverting flow including one or more adjustale louvers mounted in a staggered position.

Referring now to FIG. 31, an alternative embodiment of the system for diverting flow 293 including one or more louvers 290 and bracket 292 as shown in FIGS. 29 and 30 is illustrated. Bracket 292 includes a midpoint 295 which is offset from the inlet to cause the system for diverting flow 293 to form an angle between zero and one-hundred eighty degrees. Accordingly, each of the one or more adjustable louvers 290 is fashioned in a staggered position so that when closed, they may divert fluid away from an individual power generating cell 204.

Figure 32:
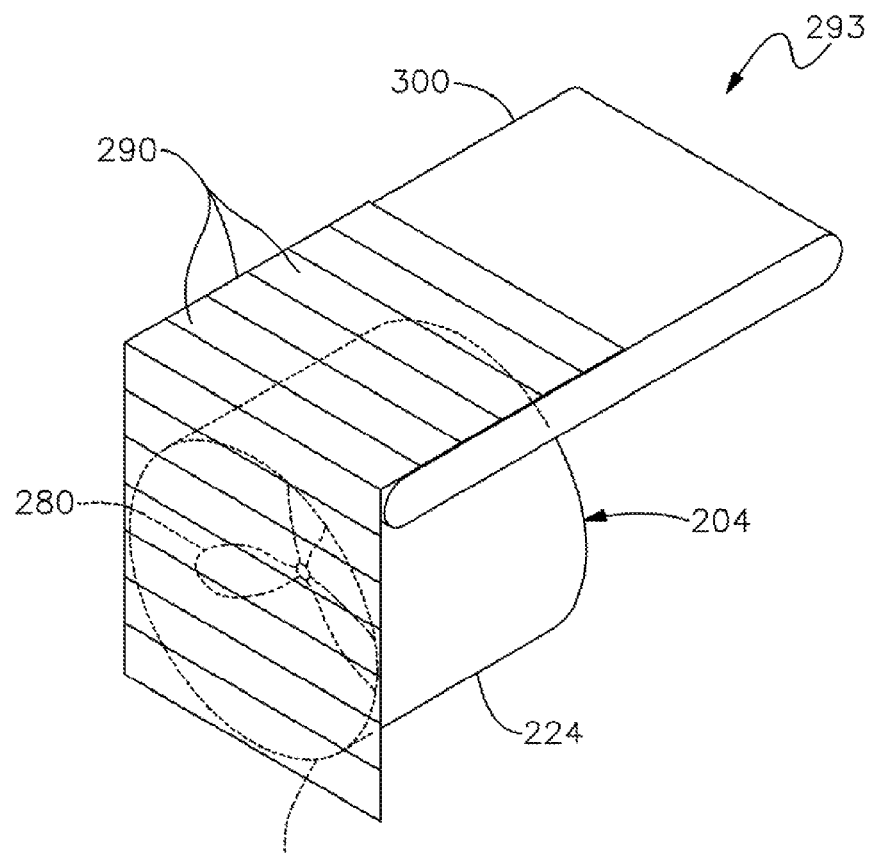
FIG. 32 shows a perspective view of a power gpnerating cell having an alternative conveying system for diverting flow mounted about an inlet of power generating cell.

Referring now to FIG. 32, a system for power generation through movement of fluid having a power generating cell 204 with an inlet duct 291 and a system for diverting flow 293 mounted about an inlet of power generating cell 204. Power generating cell 204 includes an inlet duct 291, ducting 224 extending from the inlet duct 291, and one or more impellers 280 disposed within ducting 224. System for diverting flow 293 includes a conveying mechanism 300 and one or more adjustable louvers 290 coupled to conveying mechanism 300. One or more adjustable louvers 290 translate about the inlet duct 291 via conveying mechanism 300.

Figure 33:
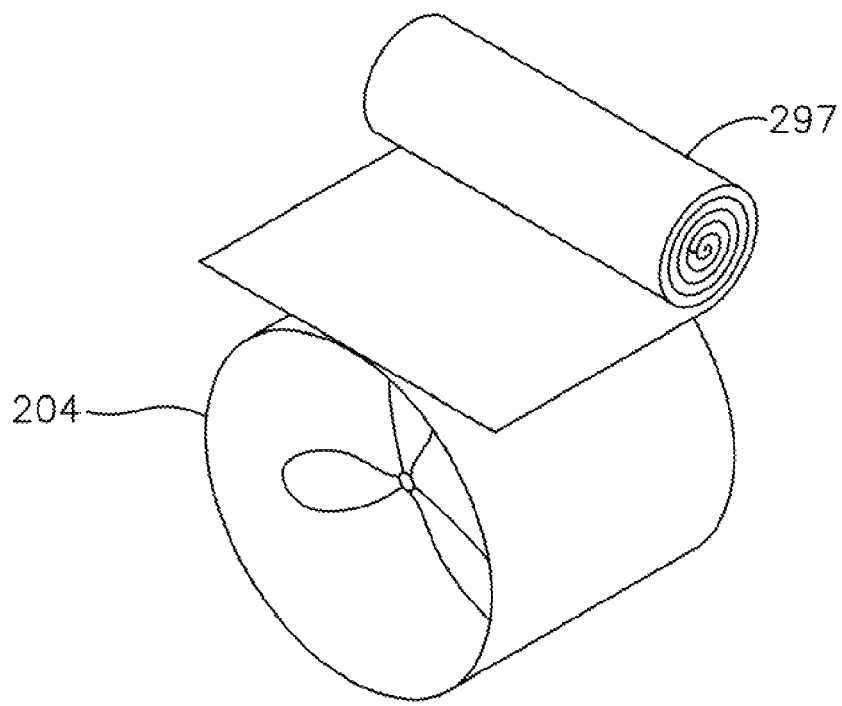
FIG. 33 shows a perspective view of a power generating cell having a roll up louver mechanism in a retracted manner disposed about the circumference of power generating cell.

Referring now to FIG. 33, a power generating cell 204 having a roll up louver mechanism 297 in a retracted manner disposed about the circumference of power generating cell 204 is illustrated according to a preferred embodiment of the present application.

Figure 34:
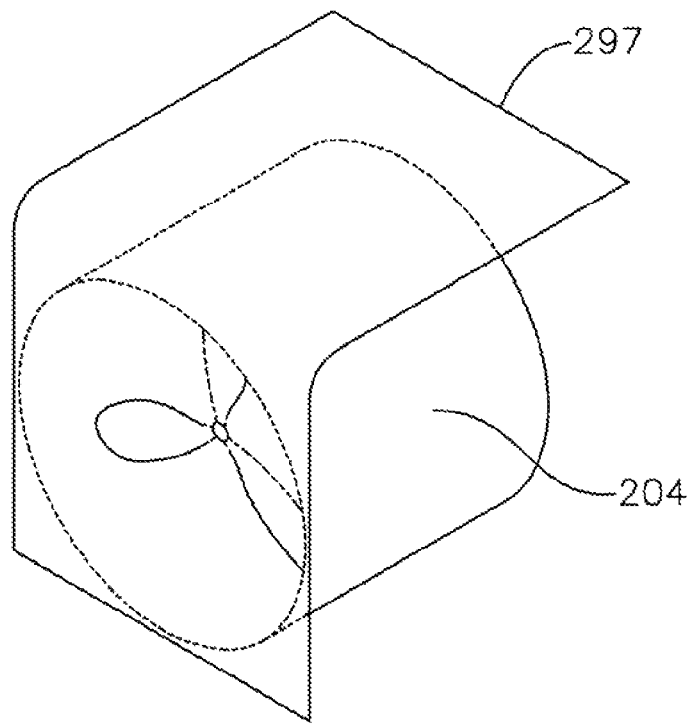
FIG. 34 shows a perspective view of a power generating cell having a roll up louver mechanism in an expanded manner disposed about the circumference of power generating cell.

Referring now to FIG. 34, a power generating cell 204 having a roll up louver mechanism 297 in an expanded manner disposed about the circumference of power generating cell 204 is illustrated according to preferred embodiment of the present application.

Referring now to FIG. 35, a system for power generation through movement of fluid 200 having, a frame 350, a longitudinally extending pivotally mounted sub-frame 352, one or more cells 354 pivotally mounted to the sub-frame 352, and counterbalancing pinions 356 coupling the frame 350 and the sub-frame 352 are illustrated according to a preferred embodiment of the present application. Fluid flow causes counterbalancing pinions 356 to resist rotation in order to optimize fluid movement in the direction of one or more cells 354. Two opposing counterbalancing pinions 356 couple frame 350 to the subframe 352 for axially rotating the subframe 352. The frame 350 remains in a substantially fixed position possibly attached to the bottom of a floating structure or barge. In an alternative embodiment, a set of two opposing locking pins extend from the frame 350 for engaging the sub-frame 352 in a fixed position. In another embodiment, the two opposing counterbalancing pinions 356 are spring loaded for removably coupling the sub-frame 352 to the longitudinally extending pivotally mounted frame 350. Frame 350 may alternatively be a portion of a barge or pontoon for deployment of the one or more cells 354 or an array of turbines.

Referring now to FIG. 35A, a close up view of the one or more cells 354 pivotally mounted to the sub-frame 352 by pairs of pinions 358 as shown in FIG. 35 is illustrated according to a preferred embodiment of the present application. This applies to both a vertical or horizontal rotation.

Referring now to FIG. 36 an alternative embodiment of the system for power generation through movement of fluid as shown in FIG. 35 is illustrated. Accordingly, the system for power generation through movement of fluid 200 includes a frame 350, a longitudinally extending pivotally mounted sub-frame 352 having longitudinal ends 353, one of more cells 354 pivotally mounted to the sub-frame 352 and counterbalancing pinions 356 coupling the frame 350 and the sub-frame 352 about the longitudinal ends 353. In certain embodiments the one or more cells 354 have variable resistances to rotation. In alternative embodiments counterbalancing pinion 356 may receive additional resistance to rotation, to allow one or more cells 354 to receive an optimal amount of flow via a motor coupled to the sub-frame 352. One or more cells 354 may be a turbine or a turbine and generator combination preferably electrically interconnected to produce power. In an alternative embodiment, one or more cells 354 may be of any of a variety of power generating cells including turbines, hydraulic pumps, or other cells that may not be interconnected.

Referring now to FIG. 36A, a close up view of a counterbalancing pinion 356 is shown. Accordingly the counterbalancing pinion allows a sub-frame 352 (shown in FIG. 36) to rotate between zero and one-hundred eighty degrees. Counterbalancing pinions 356 include a guide track 355 a locking pin 357 disposed inside the guide track 355 a centralized pin 359. As sub-frame 352 axially rotates due to fluid flow, counterbalancing pinion 356 provides resistance to rotation via centralized pin 359. Locking pin 357 travels the contours of guide track 355 to constrain the rotation is constrained of sub-frame 352. Rotation of the sub-frame 352 may also be moderated by a dampening mechanism of any of a variety such as oil dampener, spring dampener or other electrical or mechanical dampening mechanism well known in the art.

Figure 37:
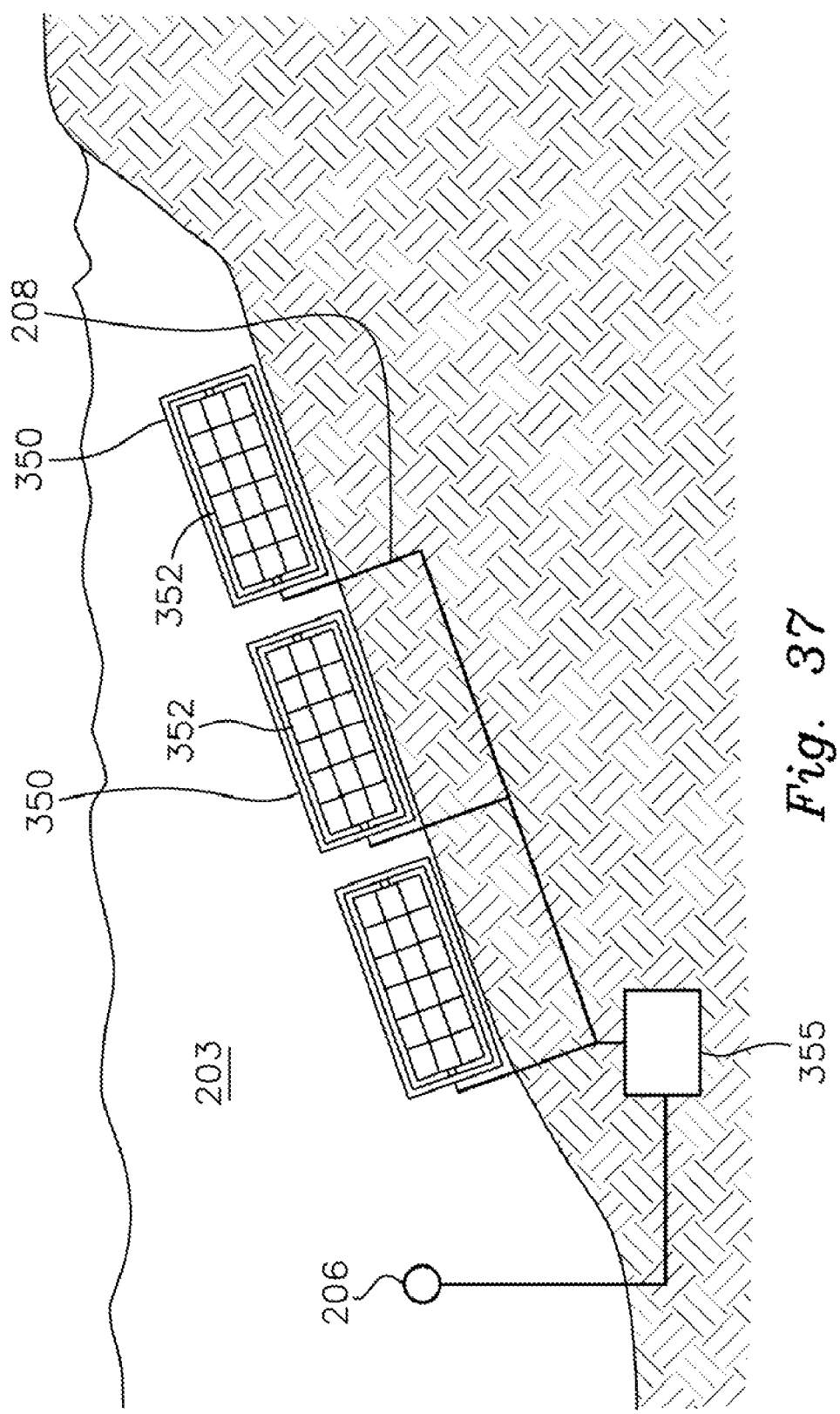
FIG. 37 shows a schematic view of an array of the frames and sub-frames operatively coupled to a power storage cell and power storage facility via transmission lines.

Referring now to FIG. 37, an array of the frames 350 and sub-frames 352 operatively coupled to a power storage cell 355 and power storage facility 206 via transmission lines 208, disposed in fluid medium 203 is illustrated according to a preferred embodiment of the present application.

Figure 38:
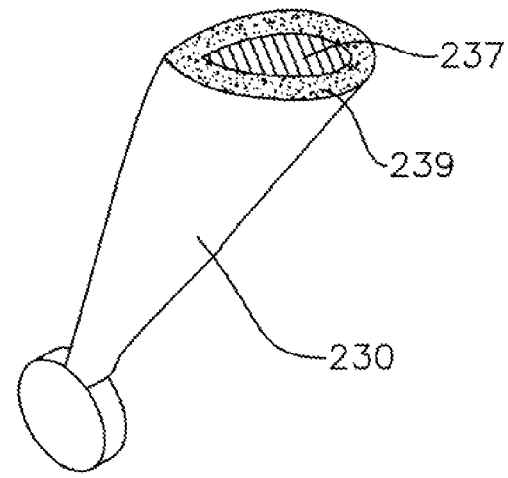
FIG. 38 shows a perspective view of a portion of a turbine vane.

Referring now to the FIG. 38, a perspective view of a portion of a turbine vane 230 is illustrated according to a preferred embodiment of the present application. Turbine vane 230 includes rigid core portion 237 and semi-rigid portion 239 that extends along the longitude of turbine vane 230. Rigid core portion 237 is elongated and includes a non-uniform cross section. Semi-rigid core portion 239 surrounds and extends from rigid core portion 237.

Semi-rigid portion 239 encompasses and longitudinally extends further than rigid core portion 237. Rigid core portion 237 and semi-rigid portion 239 extend from a shaft portion at angles ranging from zero to one hundred eighty degrees. Semi-rigid portion 239 includes at least two side portions.

Figure 39:
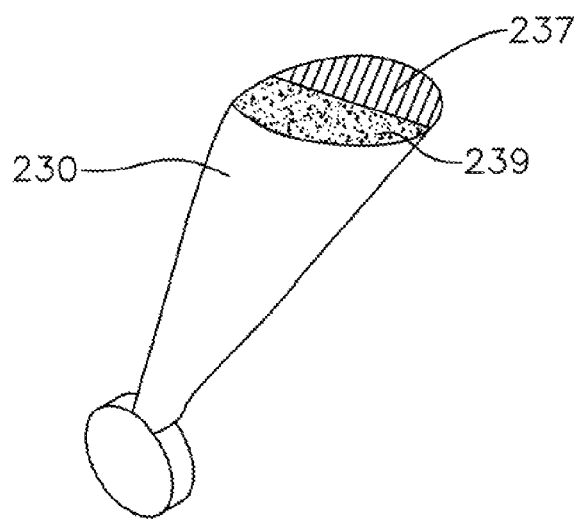
FIG. 39 is a perspective view of an alternate embodiment of a portion of a turbine vane.

Referring now to FIG. 39 an alternate embodiment of the portion of turbine vane 230 shown in FIG. 38 is illustrated according to a preferred embodiment of the present application. FIG. 39 illustrates a turbine vane 230 having a rigid core portion 237 and a semi-rigid portion 239 arranged such that semi-rigid portion 239 forms a leading edge with rigid core portion 237 arcuately along the longitude of turbine vane 230. Semi-rigid portion 239 arcuately extends from rigid core portion 237 to form a leading edge. In operation as objects collide with turbine vane 230, semi-rigid portion 239 flexes to prevent overloading of turbine vane 230.

In one embodiment of the present application, turbine vane 230 may be made entirely of a semi-rigid portion 239 that extends along the longitude. Semi-rigid portion 239 may be made of an elastomeric material changes shifts in shape according to pressure and temperature variants in a fluid flow. As water pressure shifts, semi-rigid portion 239 becomes more rigid or less rigid according to the desired application. As water pressure increases, semi-rigid portion may become more rigid such so that turbine vane 230 my rotate at a higher speed. As water pressure decreases, semi-rigid portion may become less rigid such.

In certain embodiments, semi-rigid portion 239 may be made of a material that becomes less rigid as fluid pressure and temperature increase. For example in the event that debris is disposed in fluid and increasing pressure would cause more debris to be shifted towards turbine vane 230, it would be advantageous to allow semi-rigid portion 239 to deform to a greater degree to prevent failure of turbine vane 230.

In other embodiments, semi-rigid portion 239 may be made of a material that alters in shape according to pressure and temperature differentials. For example in the event that pressure increases, semi-rigid portion 239 may shift to a position that is substantially perpendicular to the direction of flowing fluid. In the event that pressure decreases, semi-rigid portion 239 may shift to a position that is less perpendicular to the direction of flowing fluid.

In alternative embodiments of the present application turbine vane 230 includes rigid core portions, semi-rigid portions, and non-rigid portions arranged in various combinations. For example, in one embodiment of the present application, turbine vane 230 includes a rigid core portion disposed along the exterior most edge and a semi-rigid portion or non-rigid portion disposed along the interior most portion. In this embodiment, a rigid core portion 237 provides structural support for semi-rigid portion 239. Also, semi-rigid portion 239 is able to withstand various shearing and torsion forces that rigid core portion 239 is not. In another embodiment, semi-rigid portions and rigid core portions cascade in material strength to supply variably increasing flexibility and strength and increased durability. For example, semi-rigid portions are arranged with outermost portions having the greatest resistance to shear and torsion, while the innermost portions are arranged having the least resistance to shear and torsion. In this particular embodiment, in the event of failure, inner most portions would fail before outermost portions to allow turbine vane 230 to maintain functionality through retaining structural integrity.

In another embodiment of the present application, semi-rigid portion 239 and rigid core portion 237 of turbine vane 230 may be disposed in a fluid such as air. In such an environment, turbine vane 230 is allowed sufficiently flex through semi-rigid portion 239 such that an object disposed in air fluid can collide with turbine vane 230, and turbine vane 230 will not shear or overload due to excessive torsion exerted on the entire vane. Examples of objects that may collide with the vane are birds, flying debris, and a various dust particles.

In alternative embodiments, turbine vane 230 may have rigid core portions 237, semi-rigid portions 239, and non-rigid portions coupled to turbine vane 230 in numerous manners. For example in one embodiment rigid core portion 237, semi-rigid portion 239 and a non-rigid portion may be formed along with longitudinally extending shaft 232 as a single component. In alternative embodiments, rigid core portions 237, semi-rigid portions 239, and non-rigid core portions may be attached to longitudinally extending shaft 232 though welding, sintering, molding, injection molding, stamping, thermosetting, cutting, prefabrication, or other attachment mechanisms including, but not limited to hooks, zippers, hook and loop material, hook and pile material, snaps, buttons, and other coupling mechanisms. In certain embodiments, rigid core portion 237 and semi-rigid portion 239 may be optionally made of fiberglass reinforced synthetics, laminates, elastomeric variants such as plastic, wood, glass, and other composite variations of the like.

In operation, rigid core portion 237 and semi-rigid portion 239 allow for flexibility in various situations. Depending on the situational environment in which at least one semi-rigid portion 239 and at least one non-rigid portion of turbine vane 230 are disposed in, optional but designed for flexing may occur. For example, turbine vane 230 may be disposed in a fluid such as water and at least one semi-rigid portion 239 and at least one non-rigid portion may flex when water currents of a specified velocity collide with the turbine. A typical example of this situation would be a semi-rigid portion 239 included as part of turbine vanes 230 being disposed within a flowing river and allowed to flex when ice, components of a tree, and other materials, both natural and non-natural collide with the various portions of turbine vane 230. It is intended that semi-rigid portions 239 and non-rigid portions will be sufficiently flexible to prevent shearing, overexertion, and failure of turbine vanes 230.

In a preferred embodiment of the present application, the fluid medium is water. In yet another embodiment, fluid medium is air. In one alternative embodiment, plurality of turbine vanes 230 may include a non-rigid vane extension. In yet another alternative embodiment, turbine vanes 230 may include a rigid leading edge, a semi-rigid leading edge, or a non-rigid leading edge, along with a semi-rigid portion or non-rigid portion. In an embodiment of the present application, at least one rigid core portion 237 and at least one semi-rigid portion 239 may be operatively associated with one or more ducts. In yet another embodiment of the present application at least one rigid core portion 237 and at least one semi-rigid core portion 239 may be operatively associated with multiple housings. In yet another embodiment of the present application, at least one rigid core portion 237 and at least one semi-rigid portion 239 may be operatively associated with multiple turbines.

In alternative embodiments, turbine vane 230 may include rigid core portions 237, non-rigid portions, and semi-rigid portions 239 disposed in various combinations and coupled to one another through various means. In certain alternative embodiments, single rigid core portions or multiple rigid core portions may be located between single semi-rigid portions or multiple semi-rigid portions and single non-rigid portions or multiple non-rigid portions. Similarly, in some embodiments, single semi-rigid portions or multiple semi-rigid portions may be disposed between single rigid core portions or multiple rigid core portions and single or multiple non-rigid portions. In yet other embodiments, single non-rigid portions or multiple non-rigid portions may be disposed between single rigid core portions or multiple rigid core portions and single semi-rigid portions or multiple semi-rigid portions.

Additionally, the shape and orientation of turbine vane 230, rigid core portion 237, semi-rigid portion 239, and non-rigid portion, may differ in alternative embodiments. In the present application turbine vane 230 is considered as being substantially triangular. However in alternative embodiments, turbine vane 230 may be substantially circular, square, pyramidal, ovular, or take any other form and shape. Further, in alternative embodiments rigid core portions, semi-rigid portions and non-rigid portions may be made of various materials including ethylene propylene diene monomer, along with various composites such as elastomers, metal alloys, and combinations of rubber natural or synthetic.

Figure 40:
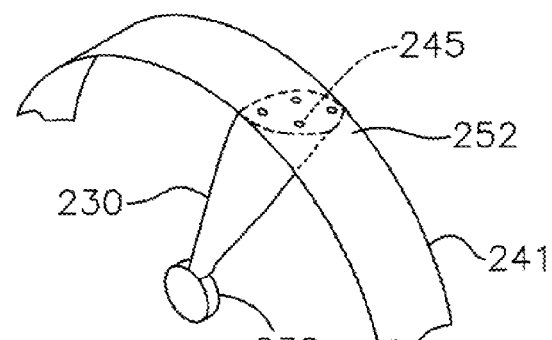
FIG. 40 is a perspective view of a portion of a turbine fixedly coupled to an outer circumferential support and coupled to an end portion via bolts, pins or rivets.

Referring now to FIG. 40 a portion of a turbine vane 230 extending from a portion of a longitudinally extending shaft 232 and fixedly coupled to an outer circumferential support 241 and coupled to a end portion 245 via bolts, pins or rivets 252. Outer circumferential support 241 relieves a vast majority of the load from the edge of turbine vane 230. End portion 245 attaches to circumferential support 241 which may also be used as a shroud or runner in a turbine system.

Outer circumferential support 241 is fixedly attached to turbine vane 230 to add strength, functionality and to transfer loads from the turbine vane 230. In embodiments in which outer circumferential support 241 connects to multiple turbine vanes 230, outer circumferential support 241 connects to turbine vanes 230 at approximately the same peripheral end.

In alternative embodiments, outer circumferential support 241 couples to an inner portion of the turbine vanes 230. In yet another embodiment of the present application, one or more outer circumferential supports 241 may couple additional portions of one or more turbine vanes 230. Outer circumferential supports 241 may selectively couple to one or more turbine vanes 230, but need not necessarily couple to every turbine vane. One or more outer circumferential supports 241 may be defined as any device or shape that can couple to one or more turbine vanes 230. For example, in an alternative embodiment, a turbine which includes three turbine vanes may include a triangularly shaped support that extends between the direct most paths of each turbine vane.

In yet another embodiment of the present application, one or more turbine vanes 230 may be attached to one another at various points. Though one or more outer circumferential supports 241 may surround and attach to the outermost portions of one or more turbine vanes 230, in alternative embodiments, one or more outer circumferential support 241 may attach to each of one or more turbine vanes 230 at dissimilar locations. For example in a turbine which includes three or more vanes, one portion of a support may extend between outermost edges of at least two vanes, while another portion of a support extends between portions which are radially disposed closer to one another.

Figure 41:
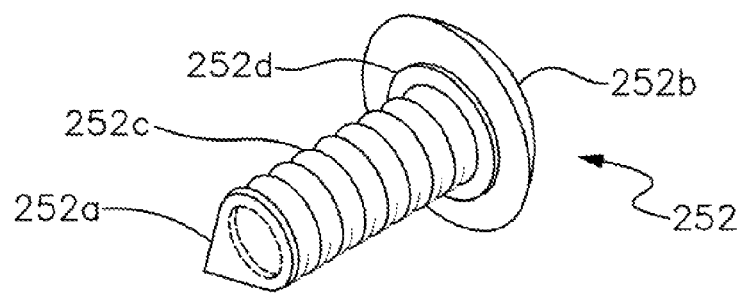
FIG. 41 is a rivet shown in FIG. 40.
Figure 42:
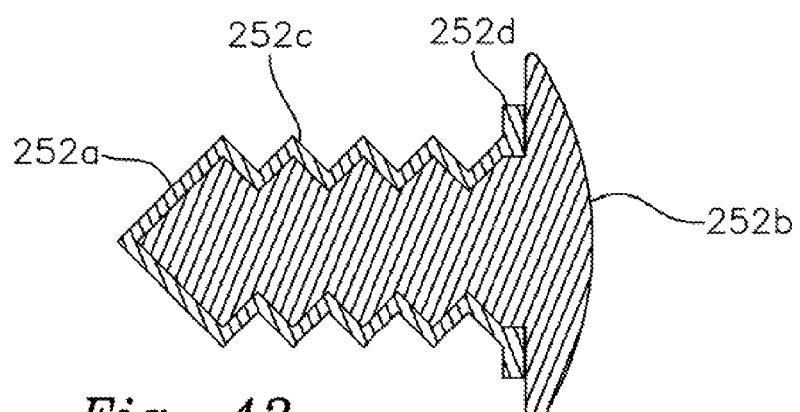
FIG. 42 is a cross sectional view of a rivet as depicted in FIG. 41.

Referring now to FIGS. 41 and 42, a perspective and cross sectional side views of rivet 252 are illustrated. Accordingly rivet 252 includes a pointed tip 252a, a rounded head 252b, a shaft 252c with at least three valleys, and a washer member 252d for distributing the load placed on the outer circumferential support 241 during insertion of rivet 252. The rounded head 252b has a larger diameter than shaft 252c to prevent rivets from over insertion into end portion 245.

Figure 43:
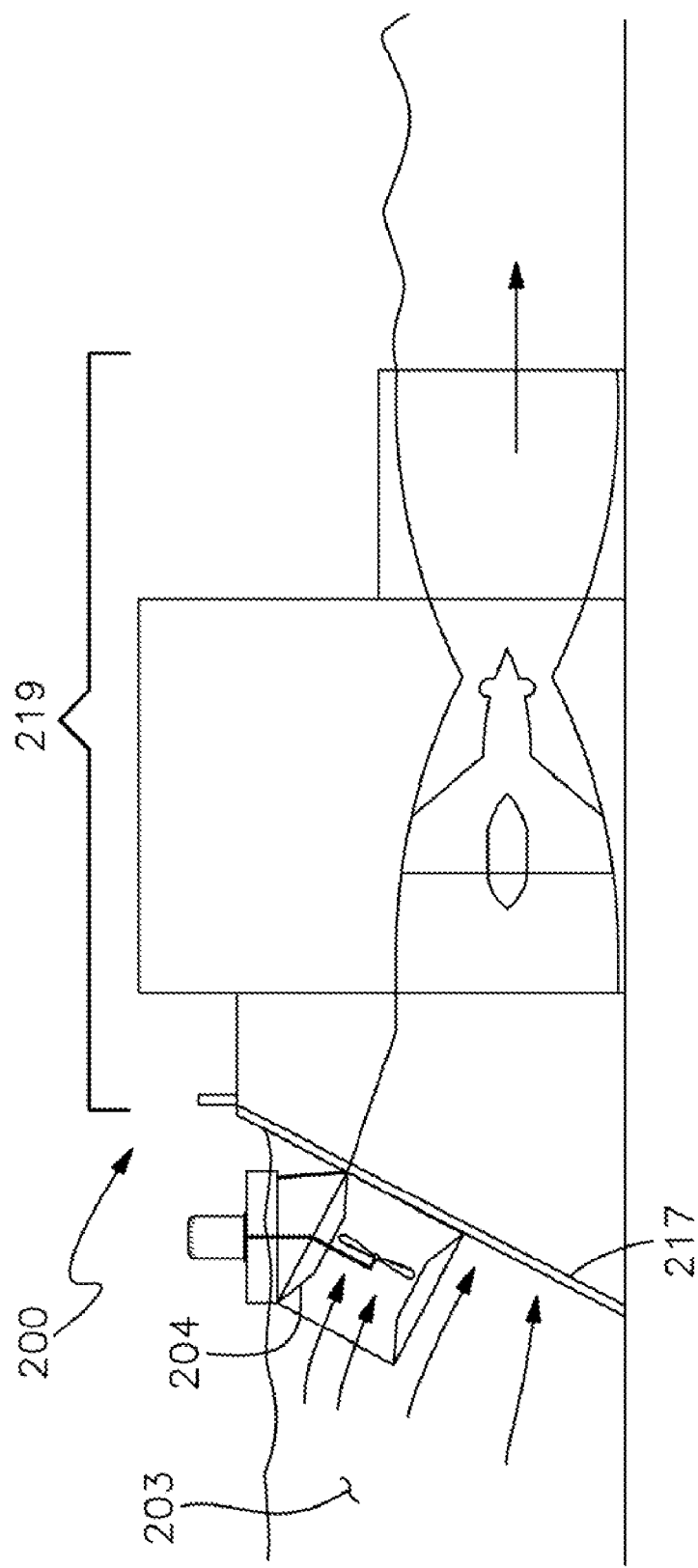
FIG. 43 is a side view of a power generating cell disposed in a fluid medium with filtering member and an energy producing cell positioned in front.

Referring now to FIG. 43, a system for power generation through movement of fluid 200 including a power generating cell 204 disposed in a fluid medium 203, filtering member 217 commonly referred to as a trash rack, and an energy producing cell 219 fed through filtering member 217 is illustrated according to a preferred embodiment of the present application. Power generating cell 204 is proximally disposed in front of filtering member 217 for creating head potential and to streamline a turbulent flow. Power generating cell 204 is positioned at tangent to a member for increasing head potential 217 and is offset from the horizon for subjecting fluid flow to indirect disposal into system for power generation through movement of fluid 200. Energy producing cell 219 is positioned downstream from power generating cell 204 to receive energy from the filtering member 217 disposed in fluid medium 203. Power generating cell 204 may have any of a variety of duct configurations, including converging and diverging ducts.

Figure 44:
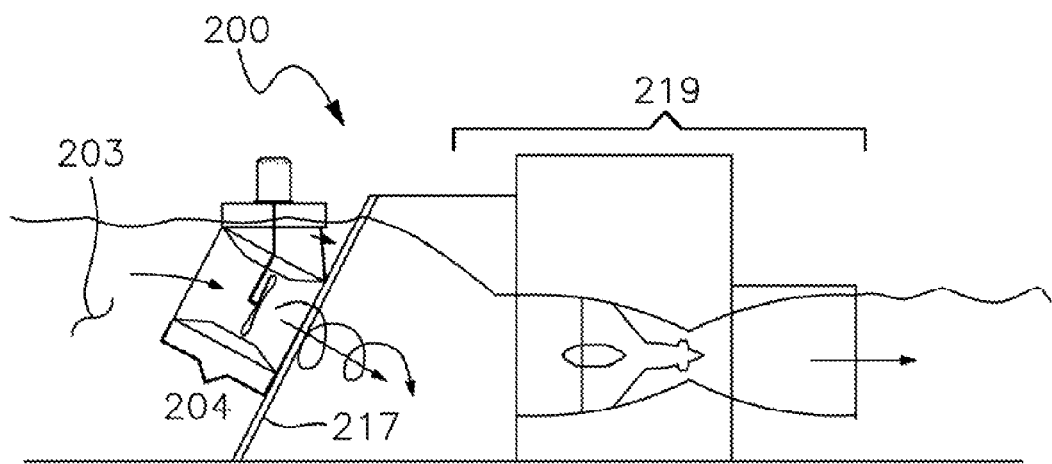
FIG. 44 is a side view of an alternative embodiment of FIG. 43 depicting a power generating cell disposed in a fluid medium to advance head potential by inducing swirl.

Referring now to FIG. 44 an alternative embodiment of FIG. 43 depicting a system for power generation through movement of fluid 200 which includes a power generating cell 204 disposed in a fluid medium 203 to advance head potential by inducing swirl in fluid medium 203 to supply flow towards energy producing cell 219. Energy producing cell 219 is disposed sufficiently near power generating cell 204 to receive increased head potential generated by the induced swirl while obviating turbulent flow in fluid medium 203.

In a preferred embodiment of the present application, filtering member 217 is a trash rack. In another embodiment of the present application, filtering member 217 is a metal grate. In yet another embodiment of the present application, filtering member 217 may be a blocking fitting. In alternative embodiments of the present application, filtering member 217 may be a combination of one or more blocking fittings to induce all flow through power generating cell 204, one or more blocking attachments, or one or more trash racks.

In an alternative embodiment of the present application system for power generation through movement of fluid 200 may include two or more power generating cells 204. Each of power generating cells 204 may be operatively associated with one power generating cell 219 via various means.

In one embodiment, power generating cells 204 may be operatively associated with one another via mechanical attachments. For example, a power generating cell 204 can be mechanically connected to another power generating cell 204 for altering direction in the event of fluid flow direction shifts. In another embodiment, power generating cell 204 can operatively associate with one another via electrical means. In yet another embodiment, the one or more power generating cells 204 may be operatively associated with one another via pneumatic means. In still another embodiment, the one or more power generating cells 204 may be operatively associated with one another via hydraulic means. In still other embodiments, one or more power generating cells 204 may be operatively associated with one another via a combination of electrical, mechanical, electromechanical, pneumatic, and hydraulic means.

In an alternative embodiment of the present application, power generating cell 204 is mounted in locations both below and above a water table. For example, in an embodiment of the present application power generating cell 204 may be disposed above sea level. In another embodiment of the present application, power generating cell 204 may be disposed below the surface of the water. In yet another embodiment of the present application in which one or more power generating cell 204 are included, system for power generation through movement of fluid 200, may include a power generating cell 204 disposed above water level while another power generating cell 204 is disposed below water level.

Figure 45:
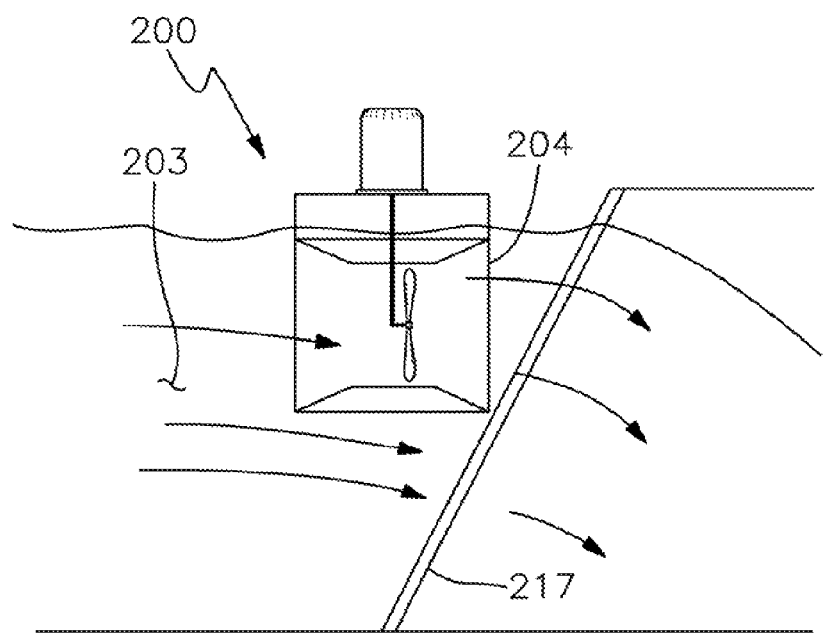
FIG. 45 is a side schematic view of a streamllned fluid flow extending through power generating cell disposed offset from the direction of a fluid flow passing throuh a filtering member.

Referring now to FIG. 45, a system for power generation through movement of fluid 200 having a streamlined fluid flow 203 extending through power generating cell 204 disposed offset from the direction of a fluid flow 203 passing through a member for filtering member 217 is illustrated. In an alternative embodiment, one or more power generating cells 204 may be positioned in a variety of locations relative to filtering member 217. For example in one embodiment, one or more power generating cells 204 may be disposed substantially normal to the orientation of a fluid flow 203 or a member for filtering member 217. In another embodiment, a power generating cell 204 is disposed substantially parallel to the direction of a fluid flow 203 or filtering member 217, while another power generating cell 204 is disposed substantially perpendicular to the direction of a fluid flow 203 or member for filtering member 217. In still other embodiments, any number of power generating cells 204 are disposed at any angle between zero and one hundred eighty degrees relative to fluid flow 203 or member for taking advantage of streamlined flow. Power generating cell 204 may also be disposed relative to a fluid flow 203 such that they indirectly influence the amount of fluid flow disseminated through filtering member 217. For example, in alternative embodiments, power generating cells 204 may be disposed about the perimeter of filtering member 217, so that their location alone influences the dissemination of fluid flow towards filtering member 217. In one embodiment, power generating cells 204 may be positioned to block fluid flow into filtering member 217 to in effect create a Venturi effect. In another embodiment, power generating cells 204 may be positioned to allow fluid flow 203 directly through filtering member 217, such that fluid flow is not increased by the positioning and location of the power generating cells 204.

Figure 46:
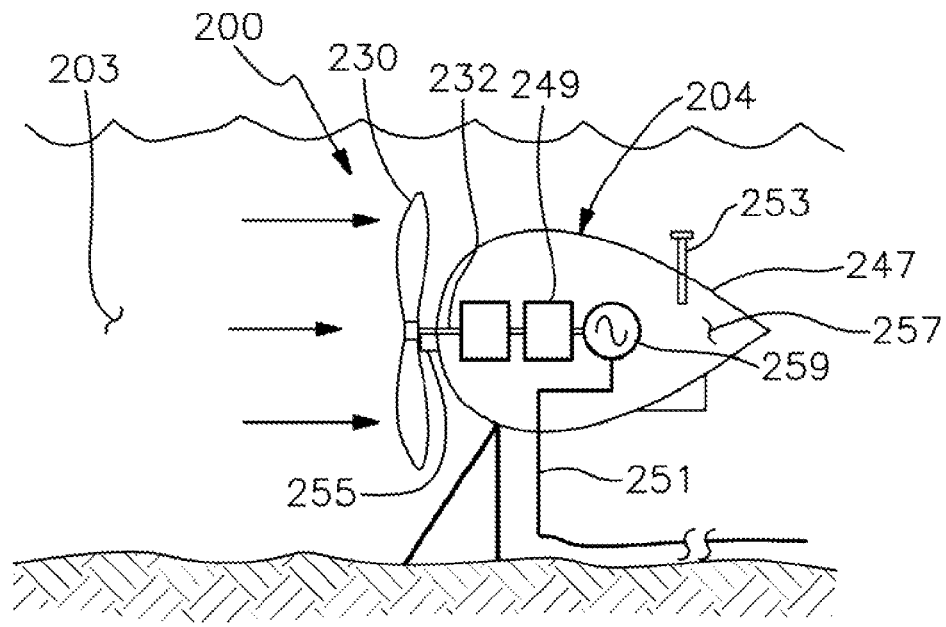
FIG. 46 is a side view of a power generating cell having speed increasers, transmission line and compressed fluid system for disposing fluid pressure.

Referring now to FIG. 46, a system for power generation through movement of fluid 200 is illustrated having a power generating cell 204 disposed in a fluid flow 203, along with a longitudinally extending shaft 232, and a generator housing 247 holding generator 259. Fluid flow 203 may alternatively be from the opposite direction than shown. Speed increasers 249, a transmission line 251, and compressed fluid system for disposing fluid pressure are encompassed within generator housing 247. Longitudinally extending shaft 232 enters generator-housing 247 via one or more fluid tight seals 255 and is attached to collapsible turbine vanes 230. Compressed fluid system and generator housing 247 are in constant communication with one another via incompressible fluid 257.

In an embodiment of the present application, incompressible fluid 257 is introduced into generator housing 247 via a positive fluid pressure system. In an alternative embodiment, incompressible fluid 257 is introduced into generator housing 247 via a non-positive displacement fluid pressure system. In a preferred embodiment, a sufficient amount of fluid is introduced into generator housing 247, to oppose forces exerted on fluid tight seals 255, without conveying an overabundance or insufficient amount of pressure also known as a hydraulic thrust bearing or seal. Incompressible fluid 257 introduced into generator housing 247, may have pressure differential that is greater than, equal to, or less than the pressure differential a fluid 203 located outside of generator housing 247. A relief valve 253 attaches to generator housing 247 to prevent over pressurizing generator housing 247 and fluid tight seals 255.

Figure 47:
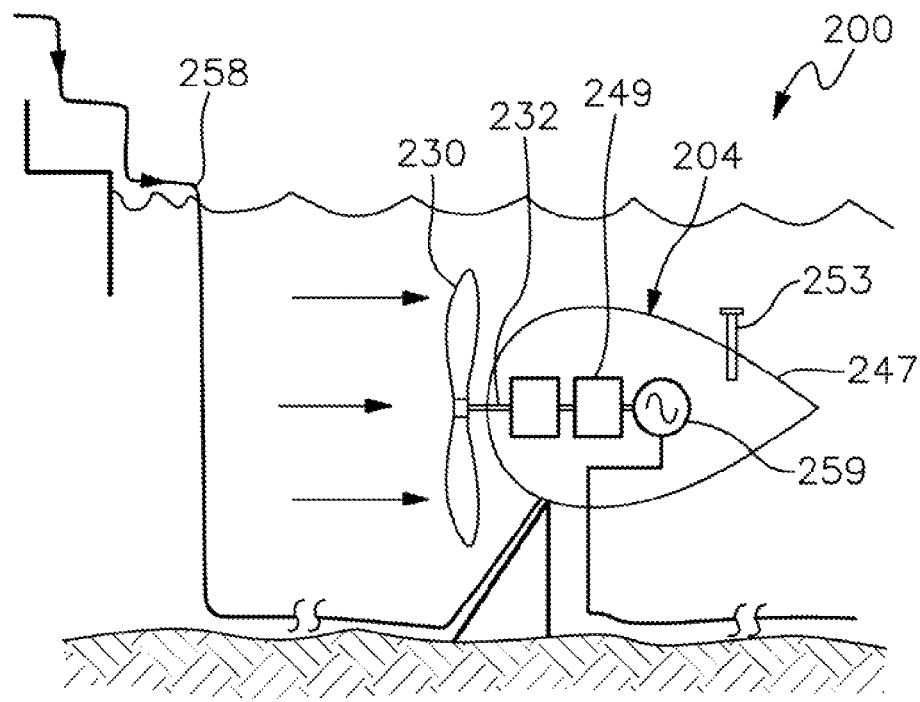
FIG. 47 is a side view of an alternafive power generating cell as shown in FIG. 46 having a power generating cell in fluid communication with a compressor or compressed gas via tubing.

Referring now to FIG. 47, a system for power generation through movement of fluid 200 is illustrated having a power generating cell 204 in fluid communication with a compressor or compressed gas or air tank (not shown) via tubing 258, is illustrated. In a preferred embodiment, tubing 258 is rigid for purposes of stabilizing pressure within tubing 258. In alternative embodiments tubing 259 is semi-rigid or non-rigid. Additionally tubing has a substantially circular cross section, but in alternative embodiments tubing 258 may have a square, triangular, ovular, or even rectangular cross-section. In embodiments in which tubing 258 is either semi-rigid or non-rigid, fluid pressure exerted on the inside of tubing 258 along with fluid pressure on the outside of tubing 258, assists in preventing tubing 258 from imploding or exploding due to pressure differential.

Tubing 258 assists in keeping generator housing stabilized so that collapsible turbine vanes 230 may rotate via longitudinally extending shaft 232. Longitudinally extending shaft 232 transmits energy to speed increasers 249. In the event that tubing 258 allows for too much fluid pressure into generator housing 247, relief valve 253 opens to allow fluid to release from housing 247.

Fluid delivery to generator housing 247 is accomplished in through various means. In one embodiment tubing 258 attaches to power generating cell 204 and a compressor or compressed gas or air tank via an elongated connection. In another embodiment, a compressor or compressed gas or air tank locally attaches to generator housing 247. In other embodiments tubing 259 can attach between power generating cell 204 and the compressor or compressed gas or air tank in various ways. For example, in one embodiment, ends of tubing 258 may be permanently attached between power generating cell 204 and the compressor or compressed gas or air tank via a coupling means such as welding. In other embodiments, tubing 258 may be removably attached between power generating cell 204 and the compressor via coupling means such as snaps, zippers, buttons, fasteners, or other temporary coupling means.

The compressor or compressed gas or air tank is preferably situated on a surface having a different pressure than that surrounding power generating cell 204. In alternative embodiments, the compressor or compressed gas or air tank may float or be located along a similar or same pressure than that of power generating cell 204. In one embodiment of the present application, the compressor or compressed gas or air tank may be located at sea level and subjected to ambient air, while power generating cell 204 is located below sea level and submersed in water. In another embodiment, the compressor or compressed gas or air tank may be located at sea level and subjected to ambient air, while power generating cell 204 is located above sea level and surrounded by air at an altitude greater than the compressor or compressed gas or air tank. In one embodiment of the present application, a pressure relief valve may be optionally incorporated into or attached to tubing 258 for releasing excessive pressure. The pressure relief valve may be mechanically, electrically, electromechanically pneumatically, or hydraulically operated including by wireless commands through tubing 258.

Figure 48:
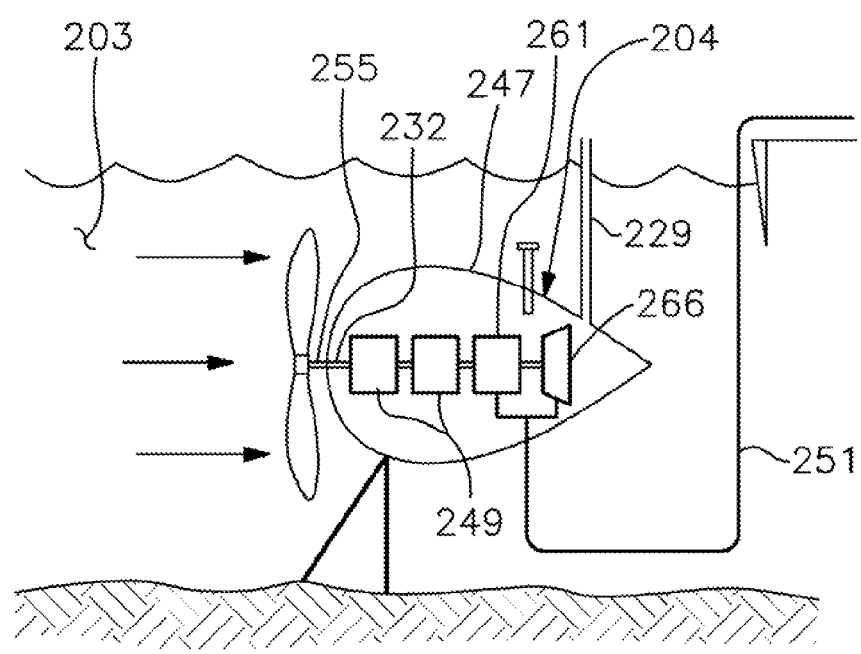

Referring now to FIG. 48, a system for power generation through movement of fluid 200, including a power generating cell 204 disposed in a fluid medium 203 for receiving kinetic energy, a longitudinally extending shaft 232, a generator housing 247, encompassing a plurality of speed increasers 249, a generator for producing electricity 261, a tubing 251 for introducing incompressible fluid into the generator housing 247, a controller 266 operably connected to at least one speed increaser 249, protected by a fluid tight seal 255, and a surface based compressor for supplying fluid pressure to generator housing 247 are illustrated according to a preferred embodiment of the present application. An attachment hose 229 passes through fluid medium 203 to connect the interior of generator housing 247 and to connect to an added fluid source such as air.

In one embodiment of the present application the fluid compressor may be manually controlled while in another embodiment of the present application, the fluid compressor may be controlled via electrical means. Additionally, overpressure valves may be of a mechanical type, electrically, electromechanically pneumatically, or hydraulically operated including by wireless commands or an electromechanical type.

Figure 49:
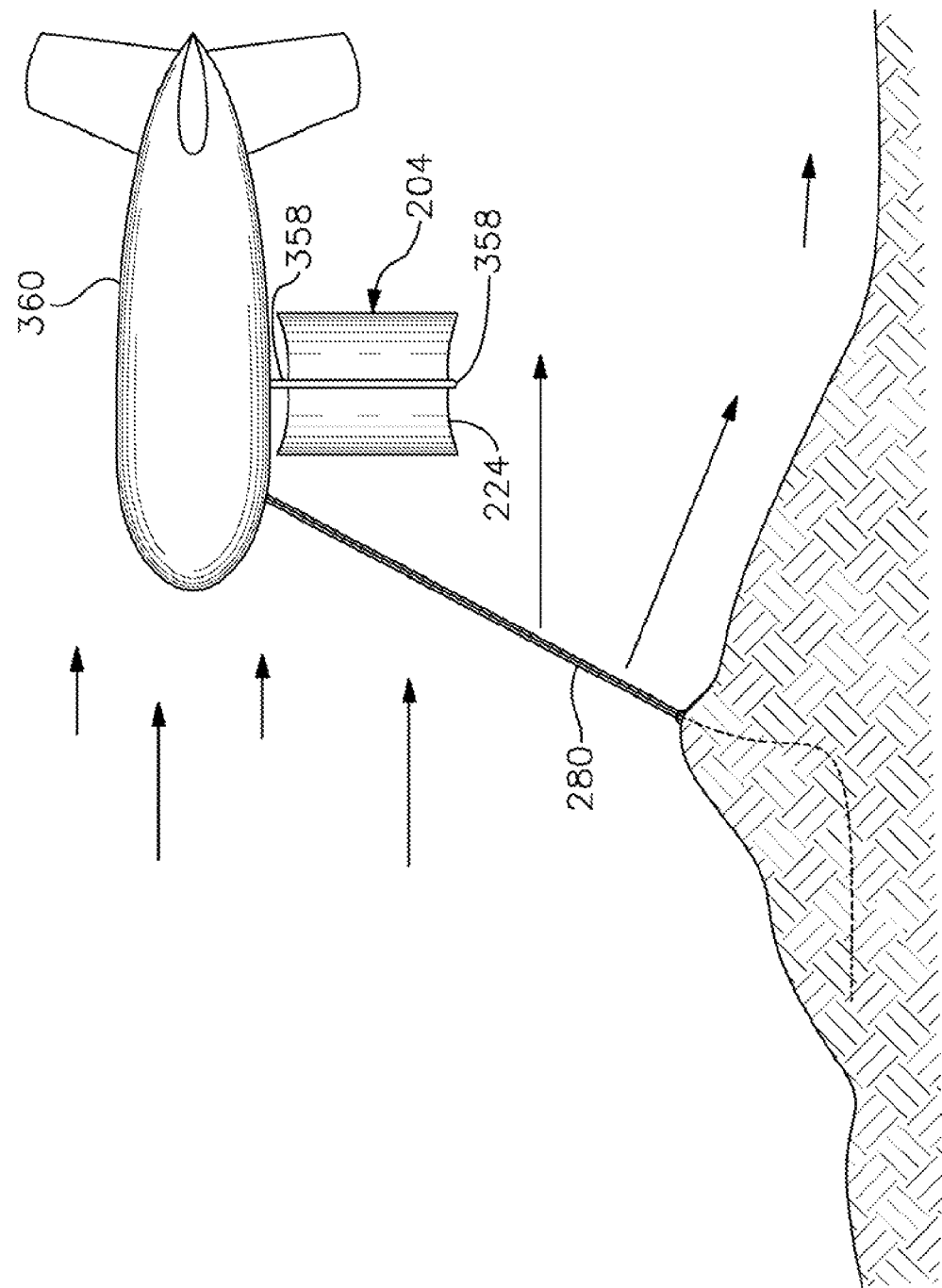
FIG. 49 is a power generatrng cell operably suspended from floating apparatus via a pinion and positioned for receiving various fluid vectors while tethered to a surface via transmission line.

Referring now to FIG. 49 a power generating cell 204 operably suspended from floating apparatus 360 via a pinion 358 and positioned for receiving various fluid vectors while tethered to a surface via transmission line 280 is illustrated according to a preferred embodiment of the present invention. Power generating cell 204 includes circumferentially ducting 224 which is fixedly attached to a planar side of floating apparatus via a pinion 358 which axially shifts to receive optimal fluid vectors. Ducting 224 may be of any of a variety of configurations including diverging and converging ducts. Ducting 224 may also be flexible and configurable in situ. In the preferred embodiment, floating apparatus 360 is a blimp that is suspended 40,000 feet above sea level.

In a preferred embodiment ducting 224, both converging and diverging, is rotatably coupled to floating apparatus 360. As fluid vectors shift, ducting 224 may correspondingly rotate to optimally receive a maximum amount of fluid vectors. Pinion 358 is capable of axially shifting along the X-Y, X-Z, and Y-Z planes of a Cartesian coordinate system. Pinion 358 may also extend and collapse to extend ducting 224 to various heights. In an alternative embodiment, an articulating joint may be connected to pinion 358 between ducting 224 and floating apparatus 360.

In operation as floating apparatus 360 translates, fluid vectors are conveyed towards power generating cell 204. As fluid vectors shift ducting 224 may in turn shift via pinion 358 while additionally converging and diverging for receiving optimal amounts of fluid. As fluid is conveyed within ducting 224, an impeller spins and in turn generates energy. Energy is then conveyed into transmission line 280 which transmits energy to a surface location. In a preferred embodiment, transmission line 280 acts as a tethering mechanism to prohibit floating apparatus 360 from drifting beyond control. In certain embodiments, floating apparatus 360 may be manually or automatically controlled. Similarly in certain embodiments, pinion 358 may be manually or automatically controlled.

Figure 50:
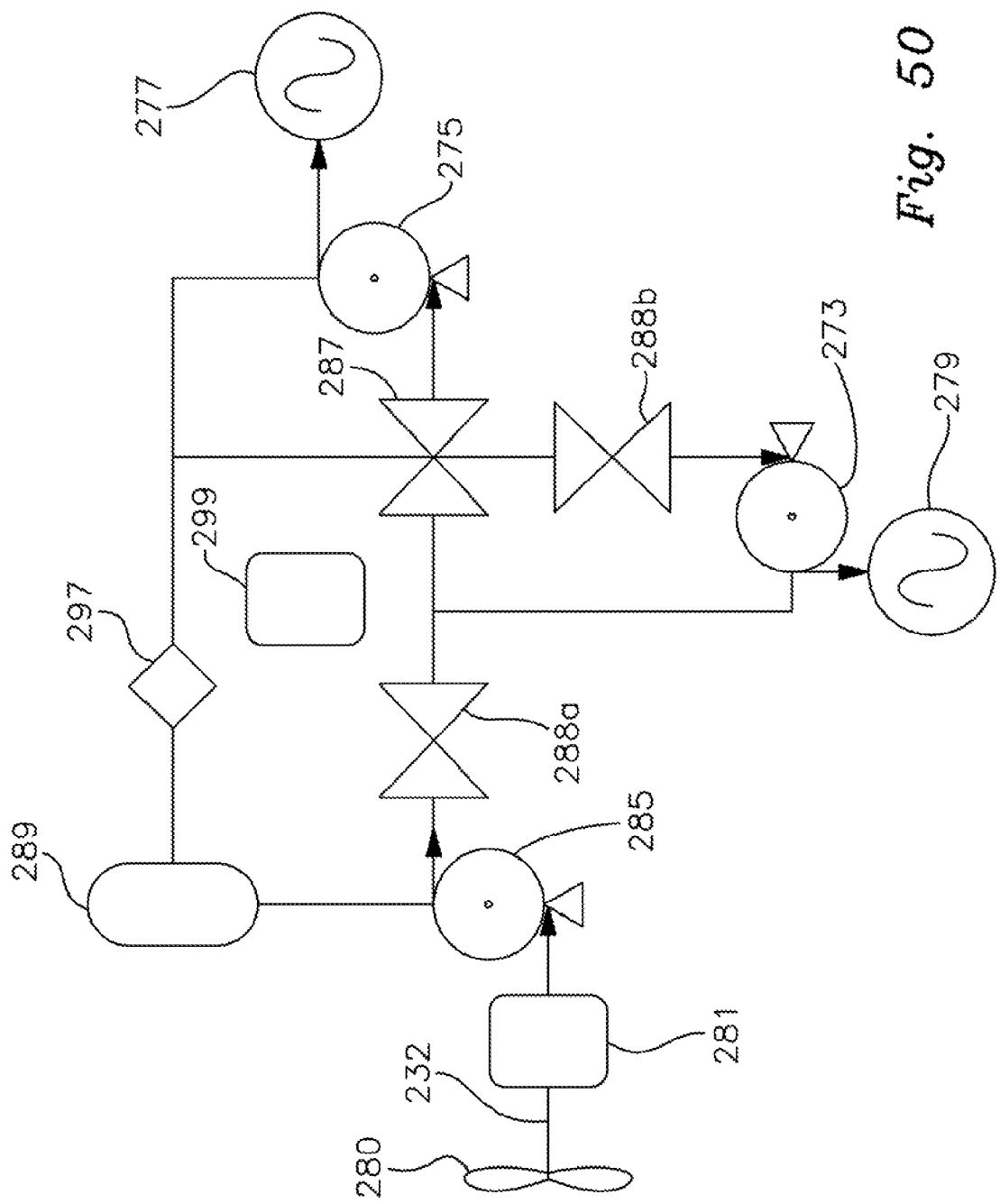
FIG. 50 is a schematic diagram of a system for power generation having hydraulic systems connected to generators.

Referring now to FIG. 50, a schematic of a system for power generation through movement of fluid including an impeller 280, a longitudinally extending shaft 232 for engaging hydraulic systems 273 and 275 which are operatively connected to primary generator 277, and secondary generator 279 according to a preferred embodiment of the present application. Impeller 280 rotates longitudinally extending shaft 232 which is in turn connected to reduction gear box 281. Reduction gear box 281 engages a pump 285 which communicates with primary generator 277 via fluid means. In the preferred embodiment, pump 285 communicates with primary generator 277, control valve 287, an accumulator 289, and a filter 297. As controller 299 senses that primary generator 277 is operating at capacity, control valve 287 directs additional communicative fluid between pump 285 and secondary generator 279. Relief valves 288a and 288b are connected between pump 285 and control valve 287 to release fluid pressure in the event that control valve 287 fails or overloads. In the preferred embodiment, pump 285 communicates with primary generator 277 and secondary generator 279 using hydraulic fluid as the communicative medium. In another preferred embodiment, one or more hydraulic systems 273 and 275 are operatively connected to one or more primary generator 277 via one or more pumps 285, one or more control valves 287, and one or more relief valves 288.

In operation, one or more pumps 285 communicate fluid with one or more variable restrictions. Variable restrictions in turn communicate with control valve 287. Control valve 287 can be of a control valve type or a relief valve type and can be disposed in numerous quantities and locations throughout system for power generation through movement of fluid. Control valve 287 directs fluid to a motor that is operatively connected to primary generator 277 and secondary generator 279. In a preferred embodiment, one or more primary generator 277 can be designated to function in low to medium volume fluid mediums while one or more secondary generator 279 can be designated to function in high and peak volume fluid mediums.

Control valve 287 can open and close and transition to various positions in between. In the preferred embodiment, control valve 287 may operate in only open and closed positions. However in an alternative embodiment, control valve 287 may operate in partially open, partially closed, and various other positions in between. For example, in the event that a controller senses an increasing or decreasing shift in the communicative medium, control valve 287 may partially open or close to restrict or release additional hydraulic fluid and in turn attain account for the shift and attain optimal generation.

In an alternative embodiment, longitudinally extending shaft 232 may engage mechanical systems that are operatively connected to primary generator 277 and secondary generator 279 for producing power. In other embodiments, longitudinally extending shaft 232 may engage pneumatic systems that are operatively connected to primary generator 277 and secondary generator 279. Additionally, in alternative embodiments, one or controllers can be either manually controlled or computer controlled.

Figure 51:
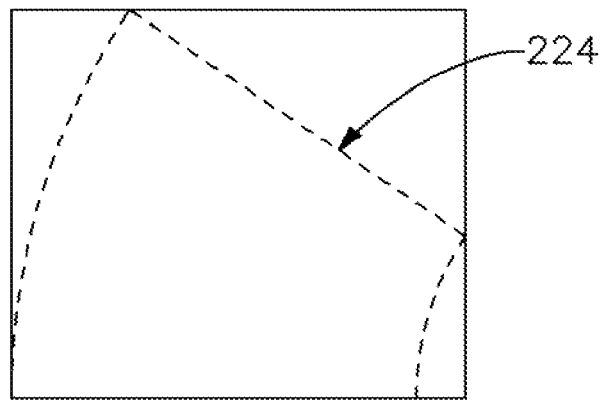
FIG. 51 is a plan view of a portion of a duct formed in a foldable material.
Figure 52:
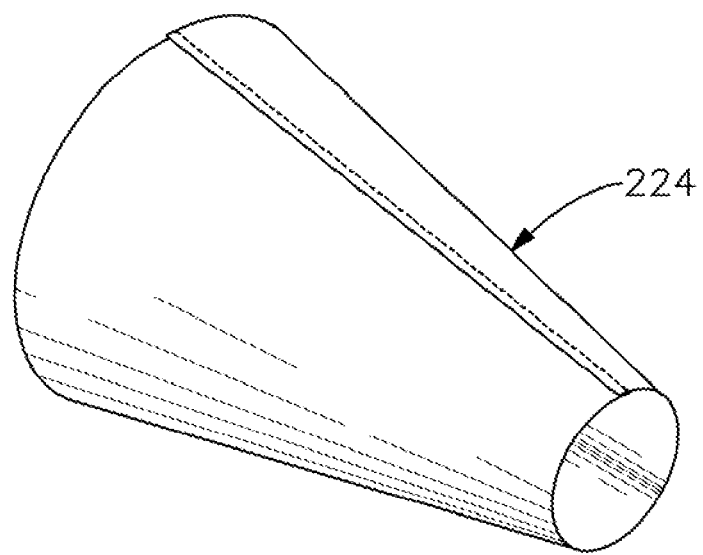
FIG. 52 is a perspective view of a rolled section of a portion of a foldable material as shown in FIG. 51 nto the shape of a duct.

Referring now to FIGS. 51 and 52, an illustration of ducting 224 formed from a foldable material such is illustrated. Accordingly, ducting 224 may be formed from foldable material such as steel belting or other durable material. The ducting 224 may be cut from a planar material in two pieces having opposite ends of the same or different dimensions. The material may then be folded along the longitudinal axis to form a duct whereby the two ends that meet and attach to each other though welding, sintering, thermosetting, cutting, prefabrication, or other attachment mechanisms including, but not limited to hooks, zippers, hook and loop material, hook and pile material, snaps, buttons, and other coupling mechanisms.

Figure 53:
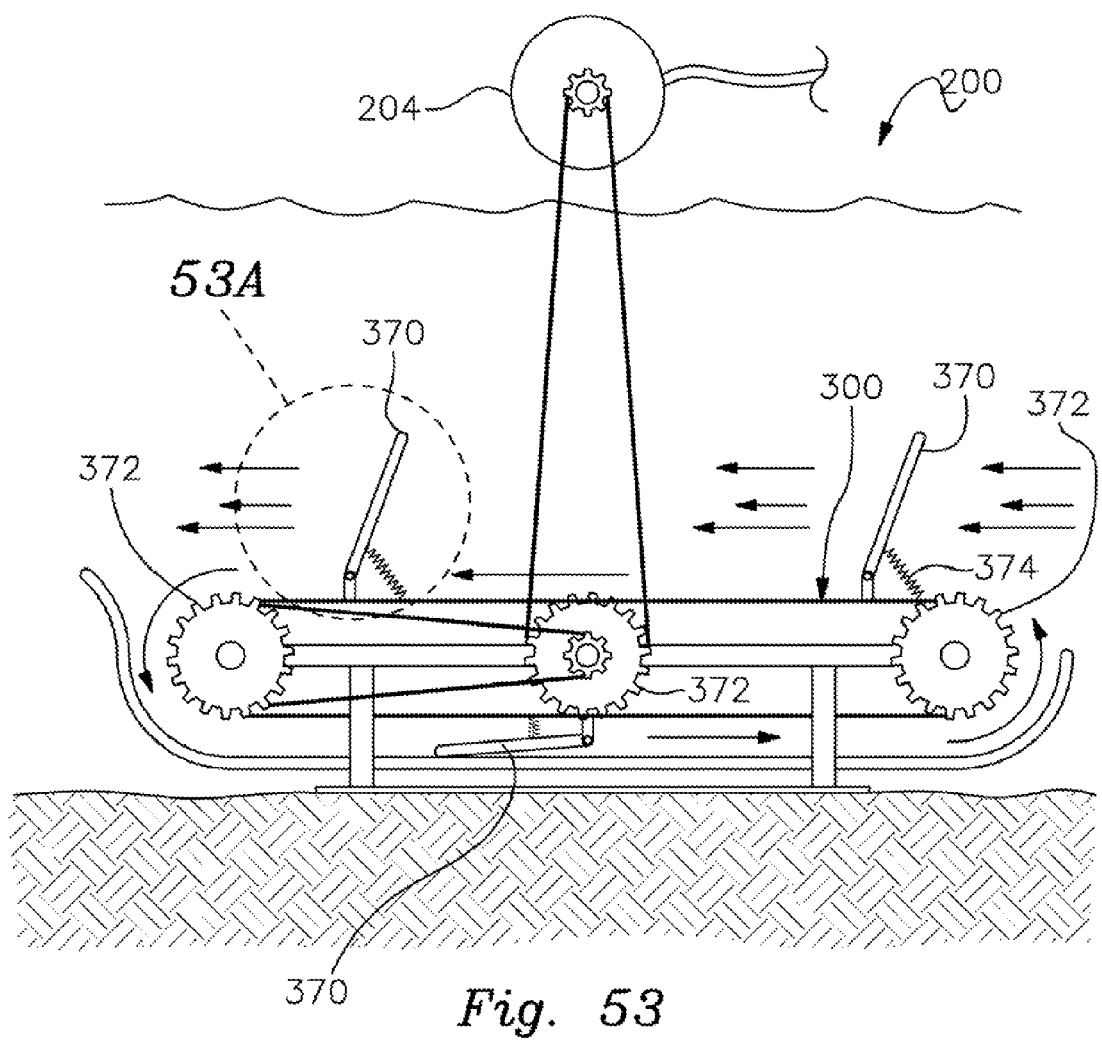
FIG. 53 is a side view of a conveying mechanism having uprights pivotally coupled to the conveying mechanism and gears tangentially attached to the conveying mechanism for transmitting energy to one or more power generating cells.

Referring now to FIG. 53, a system for power generation through movement of fluid 200 having a conveying mechanism 300, uprights 370 pivotally coupled to the conveying mechanism 300, and gears 372 tangentially attached to the conveying mechanism 300 for transmitting energy to one or more power generating cells 204 is illustrated according to a preferred embodiment of the present application.

In operation, as fluid energy is absorbed by uprights 370, conveying mechanism 300 and causes gears 372 to rotate. As uprights 370 reach a position in which fluid energy becomes optionally inefficient to absorb, uprights 370 pivot to align substantially tangent to a surface of conveying mechanism 300. A springing apparatus 374 attaches to at least one side of uprights 370 for extending uprights 370. When uprights 370 collapse substantially tangent along a surface of conveying mechanism 300, drag is reduced. When uprights 370 remain in a position substantially normal to a surface of the conveying mechanism 300 for absorbing fluid flow, fluid energy is absorbed. In certain embodiments gears 372 can be operatively associated with a transmission cable, for transmitting power and information to a generator which may be either proximally or distally located relative to conveying mechanism 300.

Conveying mechanism 300 may be attached to gears 372 in various manners. In one embodiment, conveying mechanism 300 is operably engaged to gears 372 via shaft (not shown) In another embodiment, the conveying mechanism may be fixedly attached to gears 372 via a chain, or chain-link combination. In certain embodiments, conveying mechanism 300 may be a series of chain links formed to attach to one or more gears 372.

Figure 53A:
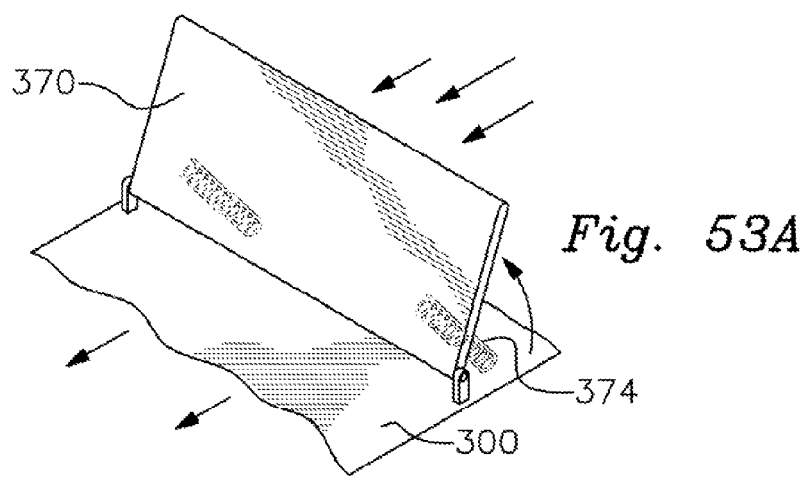
FIG. 53A is a perspective close up view of an upright shown in FIG. 53.

Referring now to FIG. 53A, a close up view of an upright 370 shown in FIG. 53 is illustrated. Accordingly, uprights 370 may extend from conveying mechanism 300 in various manners in alternative embodiments. In a preferred embodiment, uprights 370 extend from conveying mechanism 300 and translate upward using springing apparatus 374 to establish a planar surface positioned substantially normal to the direction of a fluid flow. However, in alternative embodiments, uprights 370 may also be hingedly connected to conveying mechanism 300 to translate in an optimal fluid flow direction relative to conveying mechanism 300. As uprights 370 extend from conveying mechanism 300, uprights 370 may pivot in various directions relative to the flow and to the position of conveying mechanism 300. In a preferred embodiment uprights 370 are sails made of lightweight, low cost natural or synthetic material or woven fibers.

Uprights 370 may also vary in shape. For example, in one embodiment, uprights 370 may be of a rectilinear shape. In the event that a fluid flow area is shallow, uprights 370 may extend along the width of the flow area to transfer maximum energy to a power generating cell. In the event that the flow area has a greater depth at the bottom or top of the moving fluid, i.e. a river bed, uprights 370 may account for that greater depth. For example, uprights 370 may be shaped in a substantially rectilinear shape and include a circular portion that accounts for a portion of uprights 370 extending furthest from conveying mechanism 300 in order to account for the curvature of the body in which the fluid medium is disposed. In yet another embodiment, uprights 370 may be ovularly shaped. Uprights 370 may take any shape, including having a variable cross section such as an aerodynamic wing. Uprights 370 may also be hingedly attached to conveying mechanism 300 at more than one end. Uprights 370 can be hingedly attached to conveying mechanism 300 at more than one position and may be allowed to extend and retract from the surface of the conveying mechanism 300 as need be. In an embodiment in which uprights 370 are disposed in water, air, and other fluid-like environments, uprights 370 may selectively extend and retract as necessary. For example, if conveying mechanism 300 is disposed partially in water and partially in air, uprights 370 may selectively extend in the air in order to take advantage of a wind current while aligning tangent to the surface of conveying mechanism 300 if water current is not flowing in a direction optimal for power generation. Alternatively, if the conveying mechanism 300 is disposed partially in water and partially in air, uprights 370 may selectively extend in water to take advantage of a wind current and retract if the air current is not flowing in a direction optimal for power generation. In an alternative embodiment, uprights 370 may extend both in water and air environments if the conditions are favorable for power generation. Uprights 370 may selectively extend and collapse when fluid conditions provide for efficiency in power generation.

Uprights 370 may also extend to various heights from conveying mechanism 300. In certain embodiments, uprights 370 may extend anywhere between zero and one-hundred eighty degrees. For example, in the event that a fluid approaches conveying mechanism 300 at forty-five degrees, uprights 370 may extend to forty-five degrees in order to capture optimal amounts of fluid flow. Alternatively if the fluid is approaching conveying mechanism 300 substantially parallel to normal, uprights 370 may extend to ninety degrees, in order to take advantage of maximum fluid flow. In the event that fluid is first approaching conveying mechanism 300 in one direction, such as thirty-five degrees and then the fluid re-approaches the conveying mechanism 300 at an alternative angle, such as one-hundred twenty-five degrees, similar to a fluid flow that occurs when a wave approaches a beach, uprights 370 may self adjust to capture the opposing fluid flow.

Additionally, uprights 370 may be employed to adjust the strength and direction of the fluid flow. In the event that one desires to increase or decrease the direction of the fluid flow or strength of a fluid flow, uprights 370 may be used to channel or obstruct flow. For example, if fluid flow is relatively slow, several uprights 370 may be staggered at various angles to channel fluid flow to a certain degree. In another embodiment, uprights 370 may pivot so that the upright is orthogonal to flow vector. Uprights 370 may also be fixed at one angle to divert and to channel relatively slower levels of fluid flow into levels of fluid flow that are slightly faster. Alternatively, if fluid flow is stronger than necessary uprights 370 may be used to obstruct fluid flow.

Uprights 370 may also take various forms to selectively allow for passage of fluids. For example, in one embodiment uprights 370 may selectively expand and collapse in order to create power generation through fluid movement. In the event that uprights 370 remain extended in various fluids, they may be made of a material that selectively allows for passage of one type of fluid and retention of another type of fluid. For example, if uprights 370 are needed to create power generation through water flow, uprights 370 may be made of a cloth-like material or synthetic or any of a variety of flexible materials, including extruded materials from plastics or other man-made materials that retains water and allows for passage of air. Additionally, uprights 370 may be made of a material that selectively allows for passage of certain types of air or certain types of fluid. For example, uprights 370 may be made of a material that allows for passage of water or air, but does not allow for passage of less viscous fluid.

Figure 54:
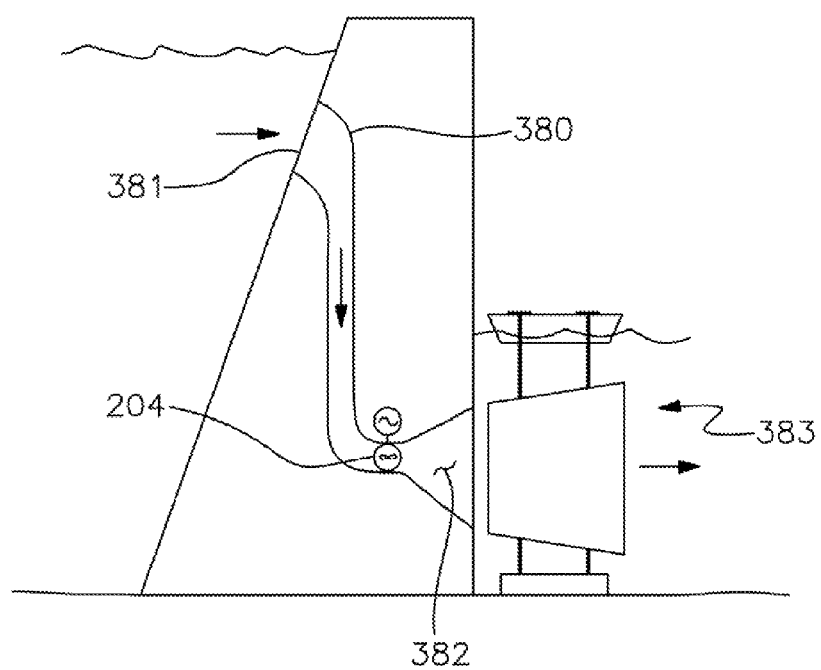
FIG. 54 is a side view of a power generating cell disposed after the exit boundary of a conventional hydroelectric facility.

Referring now to FIG. 54, a system for power generation through movement of fluid 200 including a conventional pressure head hydroelectric power generating cell 204 disposed before exit boundary 382 so that exit boundary 382 assists to attain maximum power generation. As is shown, power generating cell 204 is located before an exit boundary 382 of any variety of shapes including ovoid, circular, rectangular or other desirable shapes. Draft tube 380 includes an input mouth 381 and a larger exit boundary 382. Input mouth 381 optionally includes an input lip portion for increasing input of fluid into draft tube 380. Exit boundary 382 optionally includes an output lip portion for increasing fluid output and smoothing the transition of one moving fluid stream into another fluid stream.

The present application includes a substantially vertical draft tube 380, with a power generating cell 204 positioned along a lower edge. By positioning an additional power generating cell (not shown) following cell 204 within draft tube 380, more power can be generated by helping to eliminate eddys, turbulent flow, and recirculation zones normally allowed in open fluid zones. By positioning an additional power generating cell along various locations within a draft tube 380, more efficient flows can be generated as various eddys, recirculation zones, and other factors which help to increase a Reynolds Number can be reduced and eliminated. As increased fluid flows through power generating cell 204 it increases in speed as it approaches exit boundary 382. As exit boundary 382 widens, a flowing fluid is disseminated into another fluid body such that fluid accumulation causes fluid pressure and fluid velocity to increase as it extends from draft tube 380 into exit boundary 382. Floating duct 383 extends along exit boundary 382 and conforms to the contours of exit boundary 382 to increase head pressure within draft tube 380.

In other embodiments, a ring or transitional element may be disposed within draft tube 380 after fluid reaches power generating cell 204 which gives the fluid a more laminar flow or less turbulent flow after it is channeled into power generating cell 204. Also, extensions here shown as duct 383 may be functionally coupled to exit boundary 382. In certain embodiments extensions may be coupled along the outer circumferential edges of exit boundary 382 for increasing flow in a conventional hydropower system without an additional power generating cell. In other embodiments, extensions may be coupled along the transition point between draft tube 380 and exit boundary 382 to modify the amount of flow leaving power generating cell 204. In certain embodiments extensions may be more narrow than draft tube 380 and inserted partially within the exit boundary 382.

Figure 55:
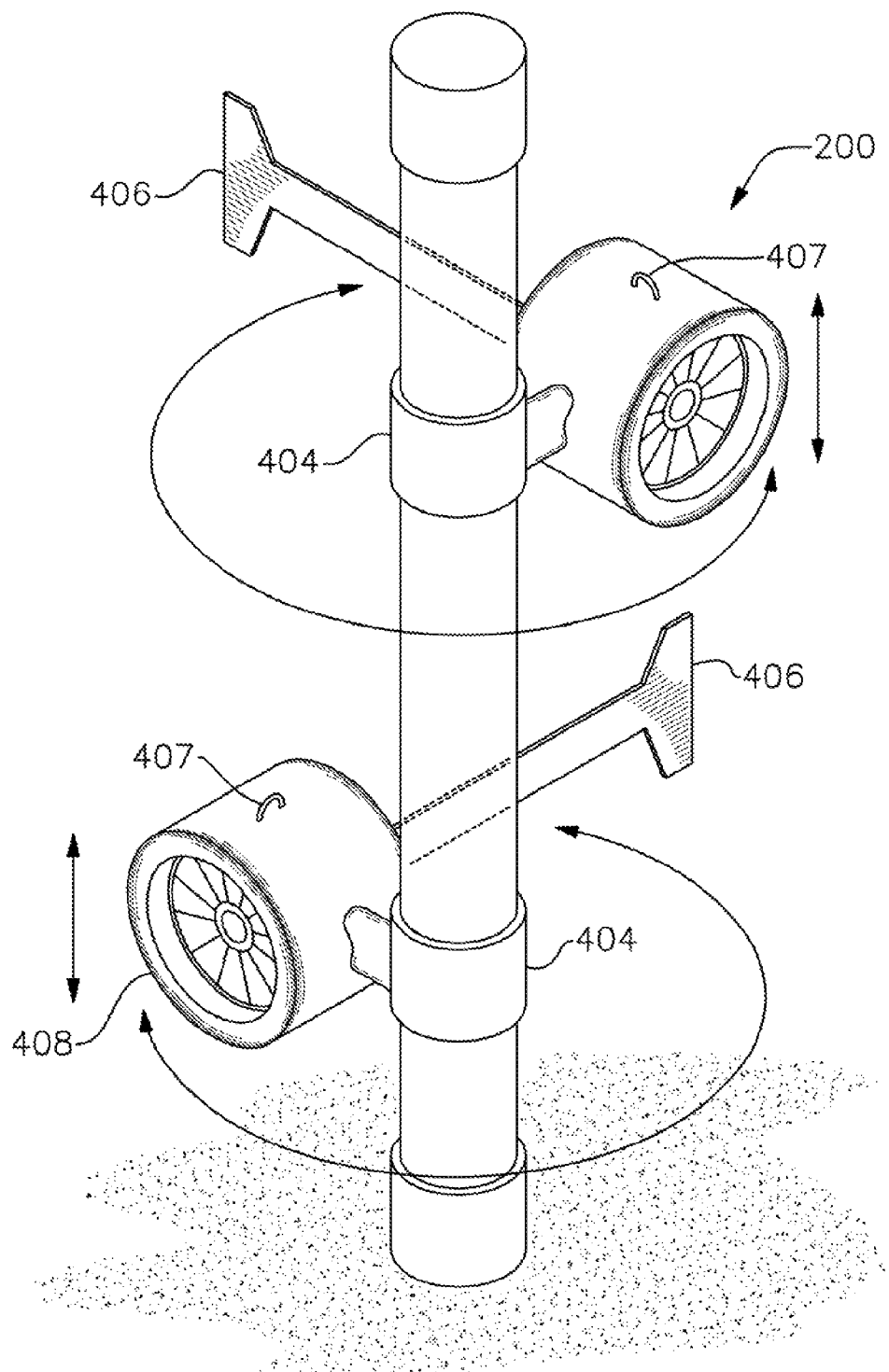
FIG. 55 is a perspective view of a power generating system rotatable mounted turbines and turbine vanes for controlling turbine direction.

Referring now to FIG. 55, a system for power generation through movement of fluid 200, including coupling mechanisms 404 and translation mechanisms 406 connected to coupling mechanisms 404 is illustrated according to a preferred embodiment of the present application. One or more controllers translates system for power generation through movement of fluid 200 using one or more translation mechanisms 406 via one or more coupling mechanisms 404. In certain embodiments of the present application, one or more controllers may be either manually operated such as by a human or can be automatically operated such as by a machine. One or more coupling mechanisms 404 may be attached to a portion of system for power generation through movement of fluid 200, using a hook, brace, or other attachment mechanism that connected its structure. Alternatively, one or more coupling mechanisms 404 may be a physical protrusion extending into or through a turbine housing 408, and in which an interior mechanism located within turbine housing 408, may be used to extend or retract a translation mechanism. For example a winch acting as a coupling mechanism may be located within system for power generation through movement of fluid 200 in order to extend and retract a tethering member.

In an embodiment of the present application, one or more translation mechanisms 406 may be attached to one or more coupling mechanisms 404 via tethering mechanisms 407. Tethering mechanisms 407 may be either permanently attached or temporarily attached to system for power generation through movement of fluid 200 along various points. For example, tethering mechanisms 407 may be fixably attached at three separate locations and separated by one hundred twenty degrees from one another so that system for power generation through movement of fluid 200 may be moved in any three dimensional direction. In another embodiment, two tethering mechanisms 406 may be attached to the same plane, while a third tethering mechanism 406 is attached to another plane. Two tethering mechanisms 407 may be used to translate system for power generation through movement of fluid 200 in the X-Y direction of a three dimensional Cartesian coordinate system while a third tethering mechanism 407 may be used to translate system for power generation through movement of fluid 200 in the Z-X direction of a three dimensional Cartesian coordinate system.

In alternative embodiments, both variants of a human controller and a machine controller may be employed. For example, in one embodiment a machine controller may be operatively associated with winches that connect to coupling mechanisms 404 to translate system for power generation through movement of fluid 200 along X-Y-Z planes of a three dimensional Cartesian coordinate system, while an override maybe employed to allow a human operator to manually adjust each winch. In another embodiment, a human controller may be allowed to translate system for power generation through movement of fluid 200, along a single plane or direction of a Cartesian coordinate system, such as in an X, a Y, or a Z direction, while another computer controller may be allowed to translate system for power generation through movement of fluid 200 along two other directions such as the X-Y, Y-Z, or X-Z direction of a Cartesian coordinate system.

In other embodiments, system for power generation through movement of fluid 200 may use components of a tethering system and another mechanism to control directional translation. For example, one or more coupling mechanisms 404, such as a hook or brace may be attached to a surface of system for power generation through movement of fluid 200, while another coupling mechanism 404 may protrude through system for power generation through movement of fluid 200. The one or more coupling mechanisms 404 which extend through system for power generation through movement of fluid 200 may be connected to a winch through a tethering mechanism. The other coupling mechanism 404 which protrudes through system for power generation through movement of fluid 200 may be connected to a linear translation apparatus such as a pole or other linearly extending body. The linear translation apparatus may allow system for power generation through movement of fluid 200 to move in a single direction such as an X-direction, Y-direction, or Z-direction while the other tethering mechanisms may allow the system for power generation through movement of fluid 200 to move in the other two directions such as the X-Y direction, X-Z direction, or the Y-Z direction. Any coupling mechanism 404 whether fully protruding or disposed along a surface, may be used to allow system for power generation through movement of fluid 200 to move in any three dimensional direction.

Additionally, a global positioning device may be employed to control the translational direction of system for power generation through movement of fluid 200. In this particular embodiment, a global positioning device may be operatively associated with one or more controllers. One or more controllers may optionally be human or machine and may act according to data transmitted from a global positioning device. A global positioning device or a device operatively associated with a global positioning device can receive data from various sources of information which include tidal structures, wind channels, sediment tables, temperatures of various fluids and the like. As data is conveyed to a global positioning device or device operatively associated with a global positioning device, the global positioning device can convey inputs into one or more controllers. One or more controllers may adjust tethering mechanisms accordingly to translate system for power generation through movement of fluid 200, to an alternate location. An example of this would be wind or water based sediment obstructing one or more turbine fans from attaining maximum flow from a moving current. After such sediment is detected, a global positioning device may be used to translate system for power generation through movement of fluid to another location or in an alternative direction.

Figure 56:
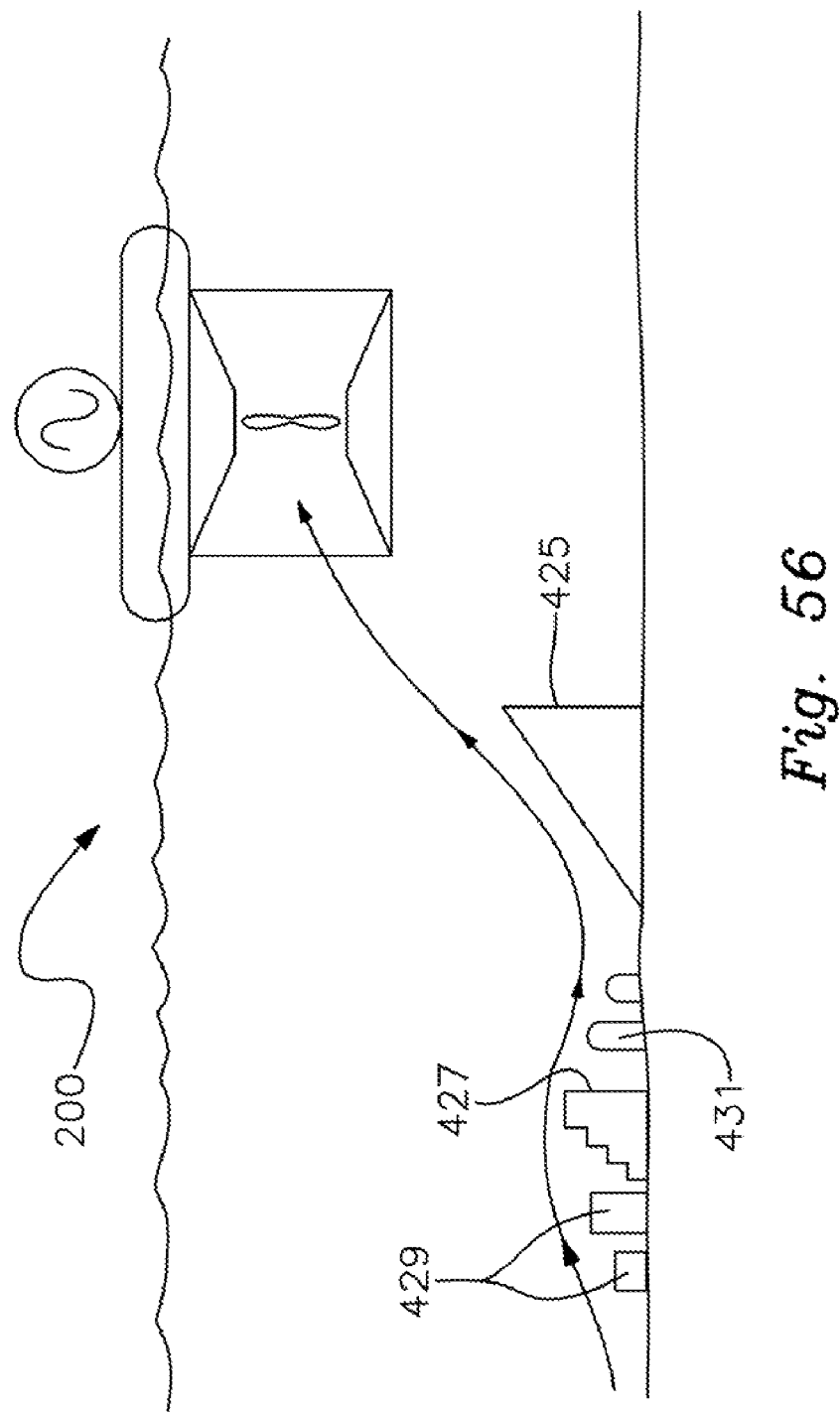
FIG. 56 is a sIde view of a series of obstructions positioned before a power generating cell.

Referring now to FIG. 56 a system for power generation through movement of fluid 200 having various artificial means to increase and decrease fluid flow is illustrated according to a preferred embodiment of the present application. Although a variety of artificial means are shown, it is understood that in application, one means or a combination of means may be employed. Accordingly, a ramp 425 is implemented for funneling fluid into the intake of a turbine. Further steps 427 are implemented to increase fluid as it is conveyed towards ramp 425. In this particular embodiment a series of staggered steps 427, blocks 429, and bumps 431 are employed in order to incrementally increase flow as it is conveyed towards the intake of a power generating cell. Steps 427 may be separated by any degree of measurement in order to establish a sufficient flow. In an embodiment of the present invention, steps 427 may be disposed along an ocean floor, riverbed, air stream or any other fluid body. In alternative embodiments steps 427, blocks 429, and bumps 431 may be offset from a rigid structure or suspended in a fluid flow in order to divert fluid in a necessary direction or flow. In some embodiments, steps 427, blocks 429, and bumps 431 may be located between one or more fluid boundary lines. For example, steps 427, blocks 429, and bumps 431 may be located at sea level and partially exposed to water and air for increasing both air and water fluid flow concentrations.

Steps 427 may also include various angles separating each of steps 427. For example, some steps 427 may include transitions that separate each step at ninety degrees as is shown in FIG. 56. Other steps may be separated by curves and various other shapes, which allow fluid flowing from one step to transition into another step without breaking course. Some steps may sharply transition into another step at an angle less than ninety degrees, while other steps may transition into another step at an angle greater than ninety degrees. Not only may steps 427 vary in shape and form, but blocks 429, and bumps 431 that are employed may similarly vary. For example, blocks 429 may be considered a standard six sided figure with each side separated by ninety degrees, while other blocks 429 may have more or less than six sides, and transition to another side at an angle greater or less than ninety degrees. Bumps 431 may be shaped to have an input which is greater than the output, or vice versa, with an input that is smaller than an output. Bumps 431 may have one or more inputs and may have one or more outputs.

In alternative embodiments of the present application, various arrangements of steps 427, bumps 431, and blocks 429 may be employed. For example steps 427, blocks 429, and/or bumps 431 may be suspended in a fluid, or alternatively steps 427, blocks 429, and/or bumps 431 may be fixed to a structure. Those steps, blocks, and/or diffusers which are fixed to a structure, may be fixed to a structure which extends into any portion of a fluid. For example, steps, blocks, and/or diffusers may be suspended by poles that dispose the steps, blocks, and/or diffusers into the middle of a variety of flowing fluids.

Figure 56A:
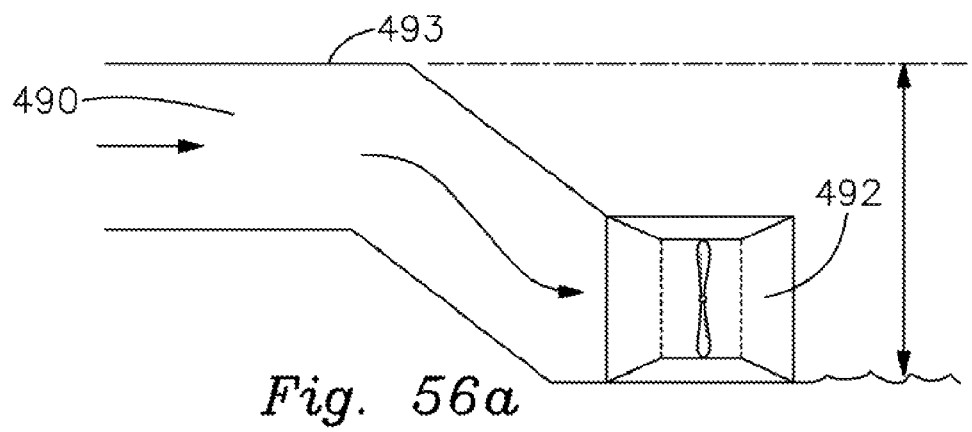
FIG. 56A is a side elevation view of a power generating cell mounted downstream from a discharge outlet.
Figure 56B:
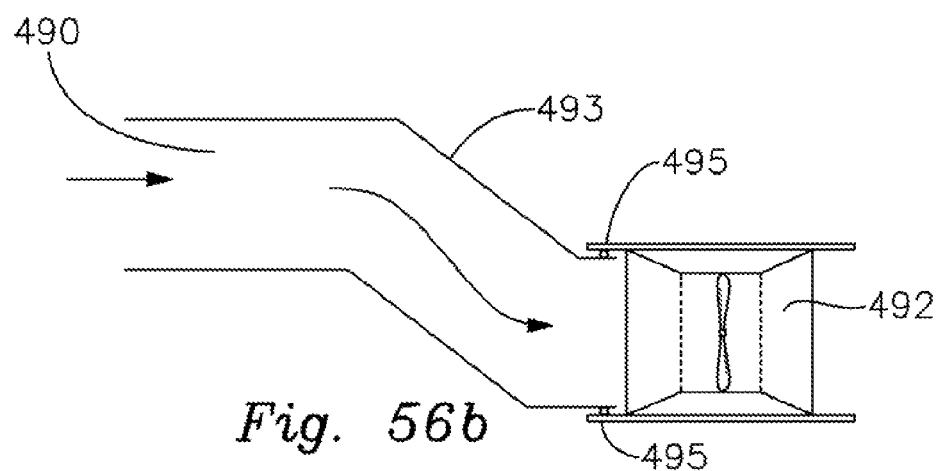
FIG. 56B is an altergative side elevation view of a power generating cell mounted downstream from a discharge outlet.

Referring now to FIGS. 56*a* and 56*b* side elevation plan views of a power generating cell 492 mounted downstream from a discharge outlet 490 is illustrated according to preferred embodiments of a present application. As water is discharged at an outlet such as a cooling system of a power plant, it travels through a chute 493 and is conveyed through power generating cell 492. Chute 493 is tiered and can include various levels that extend both above and below a fluid level. In an alternative embodiment, chute 493 may be a horizontal rectangular concrete conduit with no level change. Through having chute 493 be oriented in a multi-tiered arrangement which optionally begins above a specified fluid level, head pressure is allowed to accumulate before being conveyed into an inlet of power generating cell 492. Head pressure may also be created by cooling water pump discharge. By channeling increased head pressure through power generating cell 492, additional power is created. Chute 493 includes having a variety of cross sections which can be square, ovaloid, and ellipsoid. Chute 493 may also vary in shape throughout its length. For example, chute 493 may include input and output portions which are wider or have a greater diameter than the other portions of the length of chute 493 to establish a Venturi effect on a turbine. Additionally chute 493 may include rifling, grooves, contours, ridges, as well as indentions which cause a flowing fluid pressure drop to be increased or decreased as it is conveyed towards power generating cell 492. In certain embodiments power generating cell 492 may be used in manned or non-manned applications and may be optionally coupled to magnetic generators. Such power generating cells 492 may be employed for military, residential, and camping uses.

As is shown in FIG. 56*b*, seals 495 may be included to separate power generating cell 492 from chute 493 in certain embodiments where the turbine is not integrated inside of the conduit, but instead, installed directly on the end of the cooling water discharge pipe (conduit.) Through incorporating seals 495, power generating cell 492 can be removably coupled to chute 493 to allow for service and repair as well as preventing any leakage of the water since it is at a much higher pressure than the ambient atmosphere. Further, the inclusion of seals 495 establishes a transitional area between chute 493 and power generating cell 492. Seals 495 may be of various types of seals which include both O-rings and V-Seals. Seals 495 are preferably of a compression fit type which are disposed between power generating cell 492 and chute 493. However seals 495 may be disposed between power generating cell 492 and chute 493 using alternative sealing methods including friction fitting. In alternative embodiments, the power generating cell 492 may be deployed on the intake side when water is being introduced into the power plant or system being used.

Figure 57A:
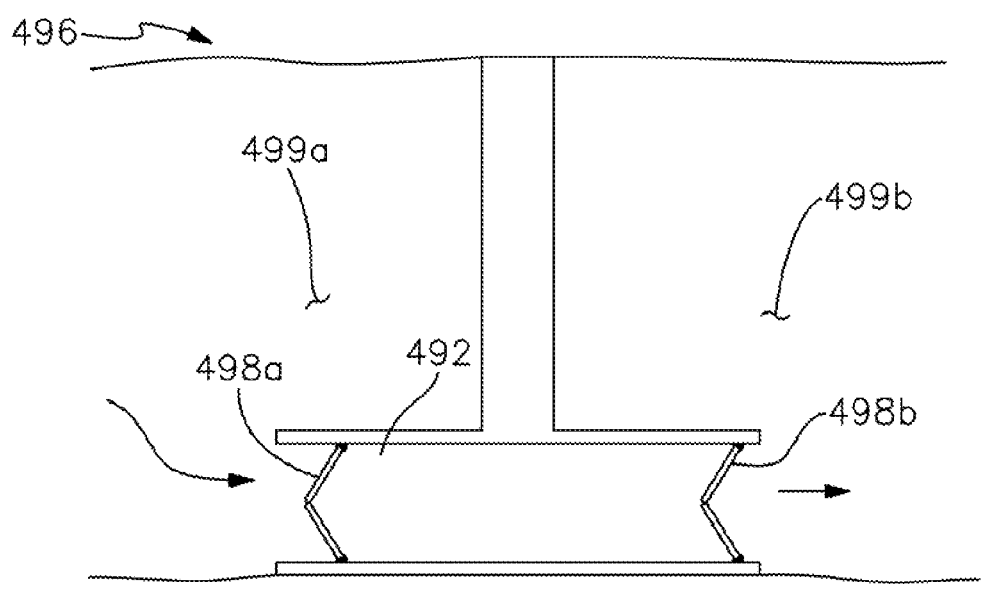
FIG. 57A is an overhead plan view of a lock and dam system according to a preferred embodiment of the invention.

Referring now to FIG. 57*a* a plan view of a lock and dam system 496 is illustrated according to a preferred embodiment of the present application. As fluid is conveyed into lock and dam system 496, lock doors 498*a* and 498*b* may selectively open and close to allow water to be conveyed between pools 499*a* and 499*b*. As water transitions between pools 499*a* and 499*b* power generating cells disposed within lock doors 498*a* and 498*b* are allowed to rotate. Power generating cells may be retrofitted into lock doors or manufactured into the original door and may preferably utilize magnetic generators that couple directed to magnets mounted in the turbine impellers for power generation.

Figure 57B:
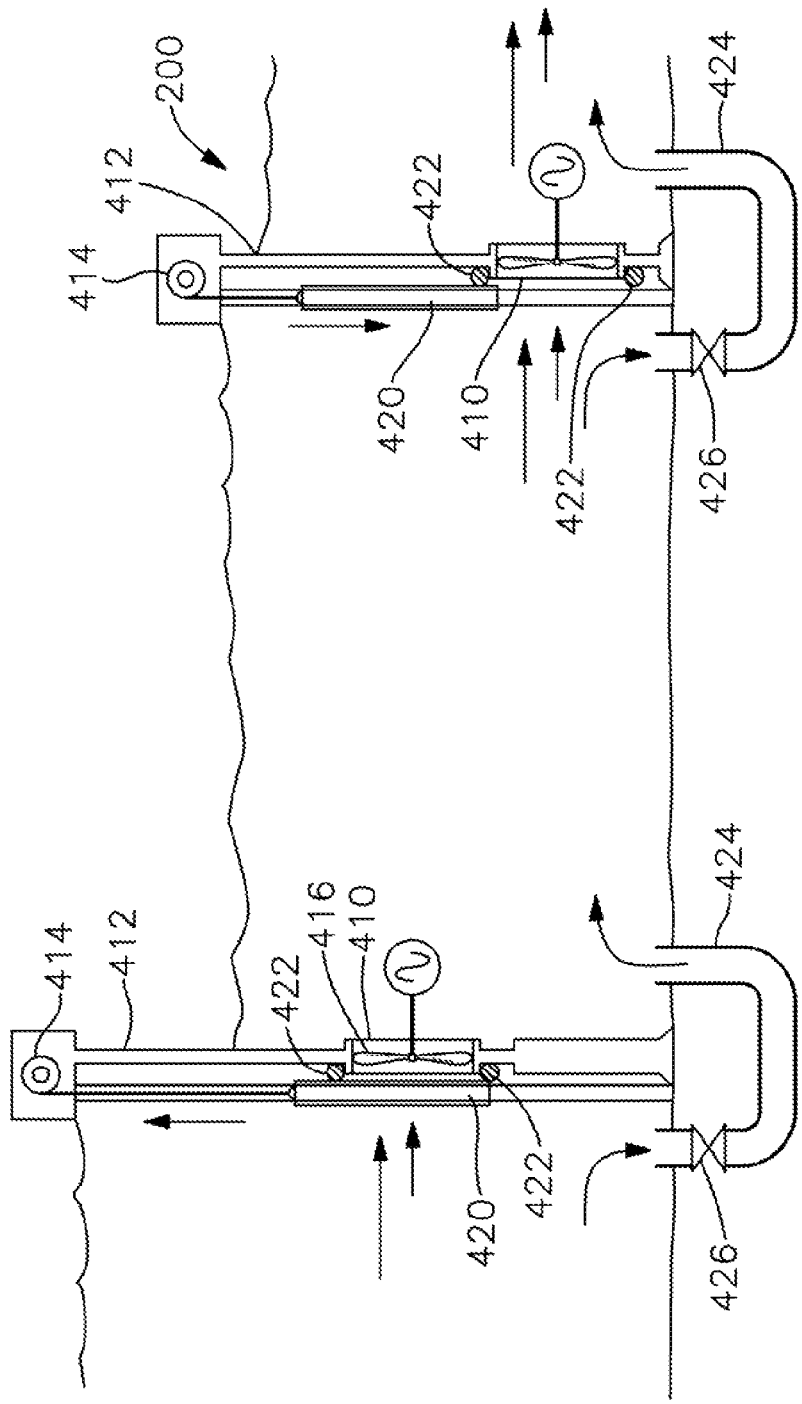
FIG. 57B is side view of a moveable turbine positioned within a lock door in a lock and dam system according to a preferred embodiment of the invention.

Referring now to FIG. 57*b* a system for power generation through movement of fluid 200 including a flow through mechanism 410 retrofit into a navigational lock and dam gates 412, the lock gates are illustrated according to a preferred embodiment of the present application. Navigational lock and dam gates 412 includes an on/off flow control valve that is controlled by a lifting mechanism 414 operatively associated with one or more turbines 416 each connected to a generator 418, a hydraulically sealing door 420, and one or more fluid pass through prevention mechanisms 422 surrounding hydraulically sealing door 420. A flow through channel 424 including an additional flow control valve 426 which allows for optional fluid accumulation and release is disposed about both navigational lock and dam gates 412. Turbines 416 may be of various types including centrifugal types and impact types. Turbines 416 may be Kaplan, Francis, Pelton, or Screw type turbines. Multiple turbines 416 may be disposed about hydraulically sealing door 420.

Lock and dam gates 412 are adjustable and may be disposed in a variety of locations both in and near a lock gate, through various means. For example, lock and dam gates 412 may be disposed within a lock wall, through implementing one or more flow through mechanisms 410 in an existing lock and dam gates 412. As it becomes necessary to accumulate fluid within a channel, lock and dam gates 412 may close and allow fluid to accumulate. As it becomes necessary to release fluid from channel, lock and dam gates 412 may shift and allow fluid to flow through the turbine, and pass into another channel and in turn generate power. In the event that a lock and dam gates 412 needs to be disposed on the exterior portion of a lock wall, various means may be employed to allow fluid to pass through the channel wall.

In an embodiment of the present application, a fluid blocking mechanism may be disposed about a lock wall and lock and dam gates 412. Hydraulically sealing door 420 may be lowered and raised along the lock and dam gates 412 to selectively allow for passage of the fluid. In the event that a fluid needs to be released at a lower level, the lock and dam gates 412 may be adjusted to the appropriate height while additional valve 426 may be released to allow for passage of fluid through relief channel 424. Relief channel 424 may optionally include an additional turbine. In an alternative embodiment of the present application, multiple fluid blocking mechanisms may be employed to selectively dispose fluid from a lock wall. For example, multiple fluid blocking mechanisms may be disposed within a lock wall, and a track may be used to move door 420 in a controlled manner. Hydraulically sealing door 420 is located in a track and moved up and down within that track. In an alternative embodiment, lock and dam gates 412 may be raised or lowered through hydraulic power, an electric motor connected to a winch or through a crane.

In an embodiment of the present application, one or more hydraulically sealing doors 420 may be disposed above a constant fluid level, below a constant fluid level, or at various fluid levels established along a lock door. Additionally, one or more hydraulically sealing doors 420 may be disposed about the exterior portion of a lock door, about the interior portion of a lock door, or partially between exterior and interior portions of the lock door. In yet an alternative embodiment of the present application a variety of magnets may be disposed around both the lock door and about various positions of lock and dam gates 412. Such magnets may include electromagnets and rare earth magnets that can selectively exert magnetism to control and determine the location of one or more hydraulically sealing doors 420. Magnetic generators may also be configured with a turbine and associated windings displaced about the turbine to create power when the turbine rotates. One or more lock and dam gates 412 may operably translate one or more hydraulically sealing doors 420 via one or more magnets. Additionally one or more magnets may be employed to translate turbine 416 to various heights of the turbine walls.

Additionally, one or more hydraulically sealing doors 420 may be controlled via other artificial lift systems such as a buoyancy control mechanisms, geared lift systems, chain drives potentially including mechanical gears, or planetary geared systems. Further, hydraulically sealing doors 420 may be incorporated into lock walls having a variety of mechanisms such as single gates, steel gates, swinging gates, sliding gates, guillotine gates, vertically rotating gates, and sector gates. In certain embodiments, variable buoyancy chambers may be included in lock and dam gates 412 to counteract the weight of turbine 416. Also, turbine 416 may be of various types and include various features, such as wicket gates on variable pitch vanes included in Kaplan turbines, Francis turbines, Pelton turbines, Screw type turbine, or bulb type turbines. System for generation of power through movement of fluid 200 may also include various additional mechanisms including DC generators, AC Generators, asynchronous systems, synchronous systems, permanent magnets generators including rare earth magnets (NdFeB magnets, Neodymium magnets, NIB magnets, Samarium-cobalt magnets, Lanthanide Magnets, as well as Transition Magnets such as NdCoB Magnets) and the like.

In yet another embodiment of the present application, one or more turbines 416 may be disposed within lock and dam gates 412. Turbines 416 may be comprised of a ferrous material and circumferentially surrounded by electrical windings mounted within housing for turbines 416 mounted about lock and dam gates 412. In operation, as turbines 416 rotate, electricity is generated through the transactions between the electrical windings mounted about lock and dam gates 412 and turbines 416.

Figure 58:
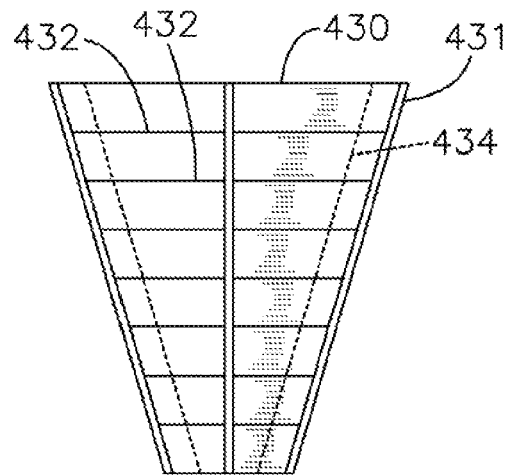
FIG. 58 is a side cross sectional view of a duct made according to a preferred embodiment of the invention.
Figure 59:
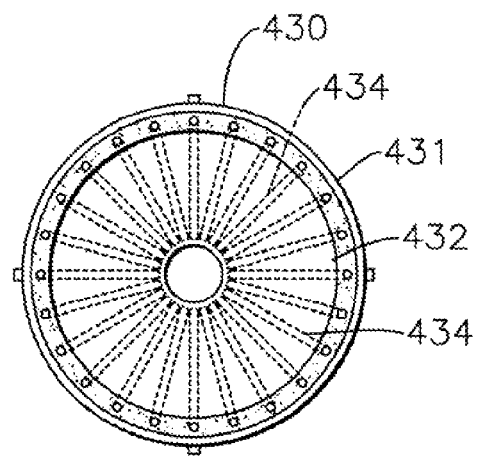
FIG. 59 is a top plan view of a duct made according to a preferred embodiment of the invention.
Figure 60:
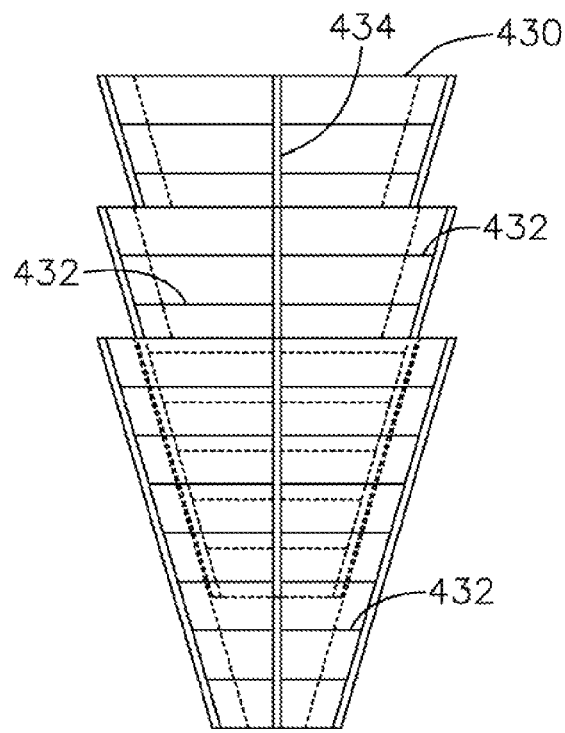
FIG. 60 is a side view of a duct made aording to a preferred embodiment of the invention.

Referring now to FIGS. 58, 59, and 60, duct 430 for a system for power generation through movement of fluid having a reinforced cross-section that annularly extends and tapers is illustrated according to a preferred embodiment of the present application. Steel loops 432 making up part of the mold extend to reinforce the cross-section of duct 430. A casting 431, which is preferably made of wood, is initially employed to space and separate steel loops 432 and to act as a mold for pouring concrete or in an alternative embodiment injected with a polymer as is done with injection molding. In an alternative embodiment casting 431 may optionally be substituted for polymer or a polymer resin that is capable of supporting concrete. Steel loops 432 making up part of the mold may be connected via rebar in a longitudinal or lateral arrangement. For example, an arrangement of steel loops 432 making up part of the mold may taper in a longitudinal direction with each successive steel loop 432 making up part of the mold being smaller than the following steep loop 432, while one or more pieces of rebar 434 extend in the longitudinal direction and are connected to each piece of rebar 434. Each piece of rebar 434 may be connected to steel loops 432 through welding or other attachment means including sintering. In an alternative embodiment, steel loops 432 making up part of the mold may consist of a single piece of steel or other reinforcing material that extends in a spirals as it extends in a longitudinal direction.

In alternative embodiments duct 430 is formed from concrete reinforced by steel loops 432 and is surrounded by metal casting. Wood casting and metal casting aids in forming concrete in a desired shape as it dries after being formed. In an alternative embodiment duct 430 may be formed from a single composition of steel reinforced concrete, surrounded by metal or wood. As is illustrated in FIG. 60, duct 430 is formed in one or more sections that may fit inside one another for easy transportation and storage.

Referring now to FIGS. 61-66 a system for power generation through movement of fluid 200 disposed about various openings is illustrated according to an embodiment of the present application. System for power generation through movement of fluid 200 includes structural support element 440, flexible fluid transmission tubing 442, rigid fluid transmission tubing 444, draft tube 446, and turbine 448 which is operably associated with flexible fluid transmission tubing 442.

Figure 61:
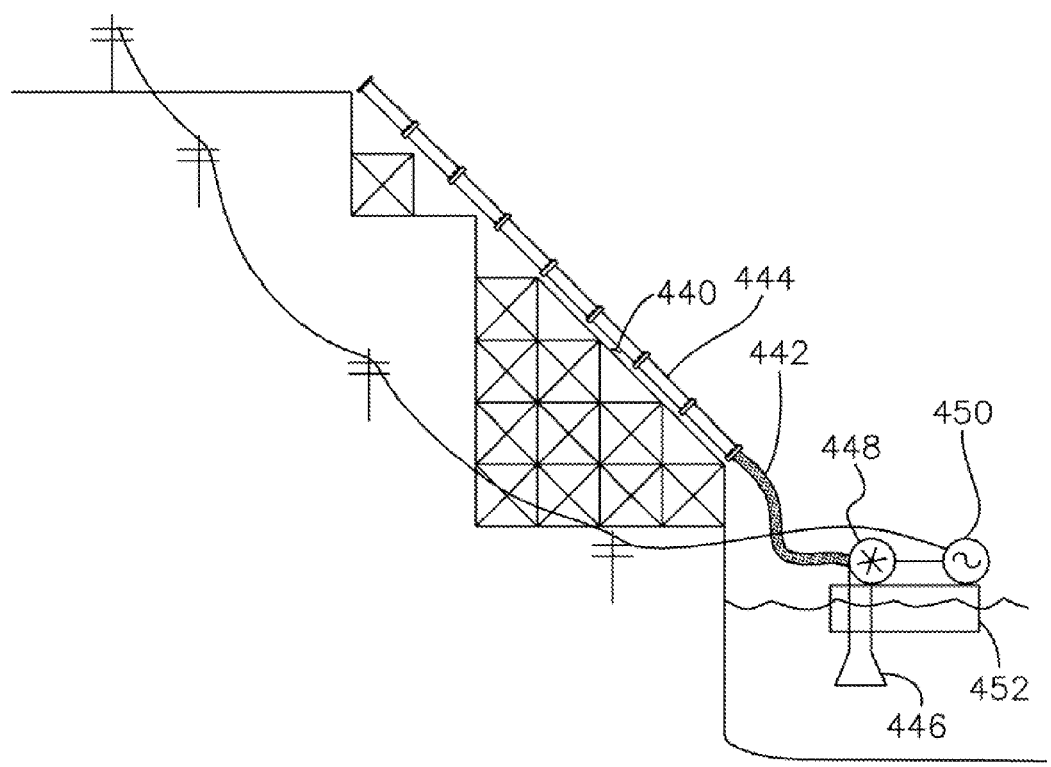
FIG. 61 s a side schematic view of a power qenerating system having tubing suspended above the contours of a slope accordinp to a preferred embodiment of the invention.

In FIG. 61, rigid fluid transmission tubing 444 is suspended slightly above contours of a slope via structural support element 440 while flexible fluid transmission tubing 442 is connected to turbine 448 so that the fluid can be used to generate power even as the floating platform 452 that the turbine 448 and associated equipment changes its vertical position due to the rising fluid. A generator 450 is operably coupled to turbine 448 for creating and transmitting electrical energy. Turbine 448 is disposed atop a floating platform 452, floating atop a fluid disposed at the bottom of a depression in the ground such as an open pit mine or a hole in the ground such as a mine shaft. As fluid is input into a mine via draft tube 446 and is conveyed through turbine 448, power is in turn generated by the generator 450 via fluid flowing into mineshaft. As an open pit mine accumulates fluid, floating platform 452 rises while allowing flexible fluid transmission tubing 442 to be incrementally raised or lowered to allow for optimal power generation. Additionally, in certain embodiments flexible fluid transmission tubing 442 is operatively connected to a controller for positioning turbine 448. Flexible fluid transmission tubing 442 may be employed for translating turbine 448 to an optimal location of fluid flow.

Figure 62:
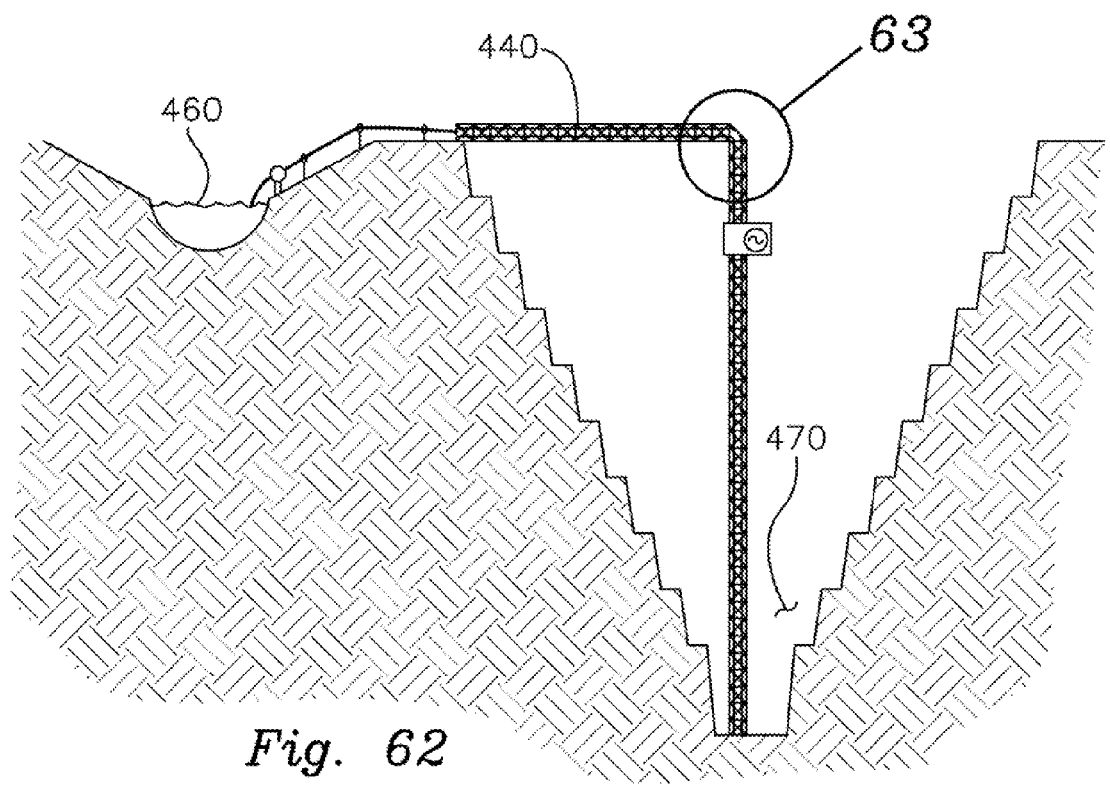
FIG. 62 is a side schematic view of a power generating system having a trussed support for tubing and delivery of fluid into a ground depression.
Figure 63:
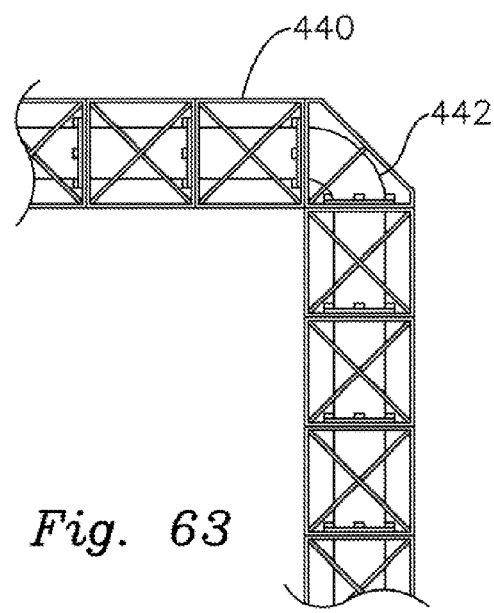
FIG. 63 is a side close up view of a truss support as shown in FIG. 62.

Referring now to FIG. 62 and FIG. 63 an integrated guiderail and structural support element, in this case a truss 440 or in another embodiment a non integrated guiderail and structural support element positioning flexible fluid transmission tubing 442 in an open pit mine 470 is illustrated. As water accumulates within open pit mine 470 by flowing (in some cases being pumped) from fluid medium 460 through a turbine coupled to flexible fluid transmission tubing 442, flexible fluid transmission tubing 442 retracts through guiderail 440. By allowing flexible fluid transmission tubing 442 to retract from the center of open pit mine 470, maximum power generation may occur. In an alternative embodiment, flexible fluid transmission 442 tubing may be rigidly affixed to guiderail 440. In certain embodiments, as fluid is conveyed into open pit mine 470 additional head pressure may accumulate. In the event that optimal power generation may be attained through maintaining head based generation flexible transmission tubing 442 may be raised with a turbine 448 maintained just below the top of a flowing fluid. In the event that optimal power generation may be attained through maintaining flow rate based generation, a turbine 448 and flexible transmission tubing 442 may be maintained above the top of the fluid level in the pit or mine shaft. In certain embodiments, guiderail 440 may be suspended above open pit mine 470 allowing fluid to be dropped into open pit mine 470. Guiderail 440 may be located at a ninety degree turn while draft tube 442 is suspended in an immovable position.

Figure 64:
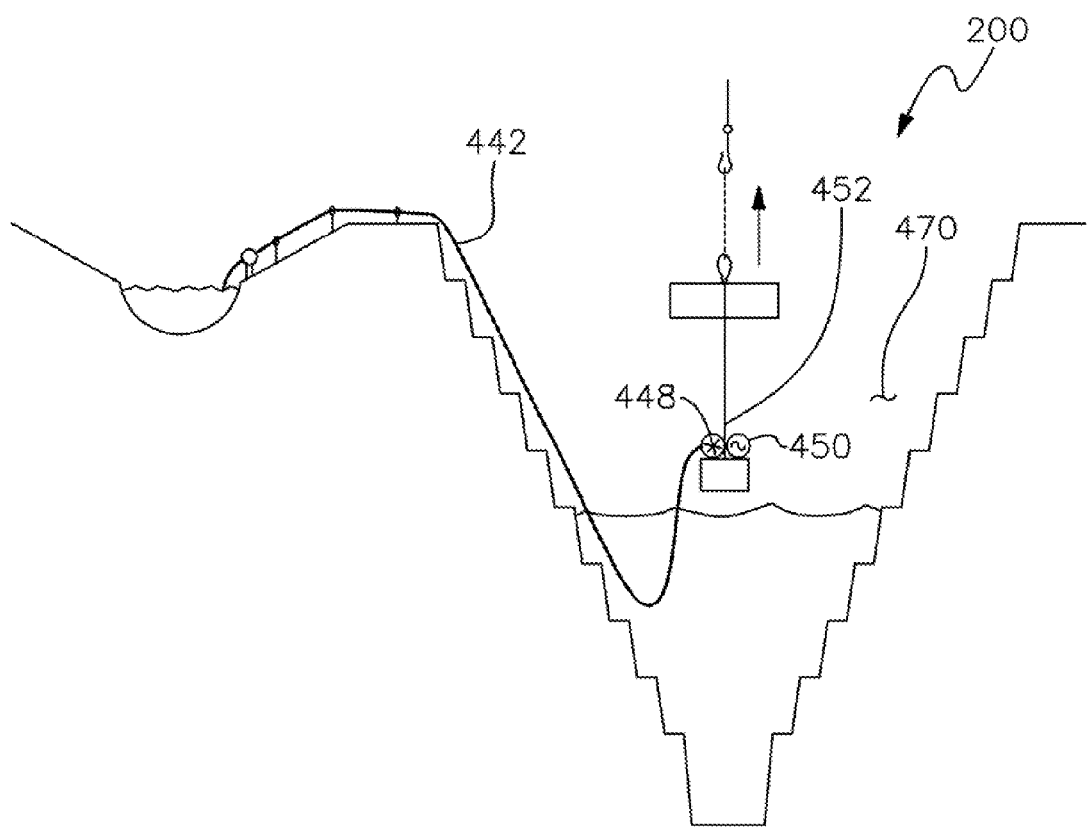
FIG. 64 is a side schematic view of a power generating system showing a suspended turbine and flexible transmission tubing according to a preferred embodiment of the invention.

Referring now to FIG. 64, an alternative embodiment of the system for power generation through movement of fluid 200 as illustrated in FIGS. 61-63 is illustrated. Accordingly, an open pit mine 470 is illustrated, having flexible transmission tubing 442 operatively connected to turbine 448. Turbine 448 is connected to a generator 450. A power transmission line is connected to a floating apparatus for conveying power from the generator 450. As fluid is transmitted into open pit mine 470, and is conveyed through turbine 448, power is generated through turbine 448, which in turn is lifted by tether 452 to avoid the rising water level. Tether 452 is preferably engaged to a crane (not shown) optionally suspending a floating apparatus upon which turbine 448 and generator 450 are mounted.

Figure 65:
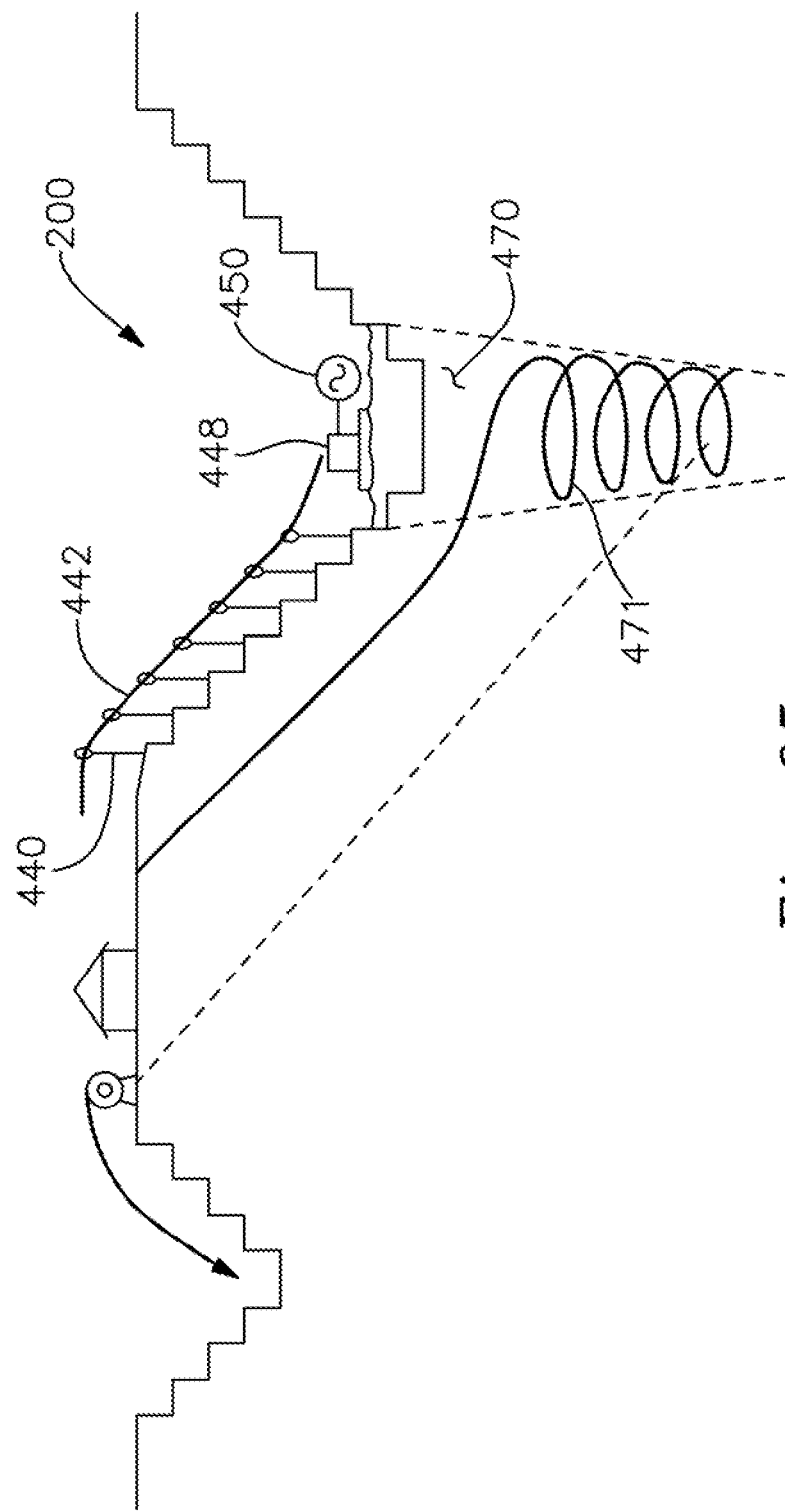
FIG. 65 is a side schematic view of a power generating system showing a floating turbine and flexible transmission tubing in a Kimberlite cone according to a preferred embodiment of the invention.

Referring now to FIG. 65, a system for power generation through movement of fluid 200 using a combined open pit mine 470 with integrated mine shafts under the ground is illustrated. Accordingly, a turbine 448 operatively coupled to a generator 450 are suspended above a liquid fluid medium such as water by being attached to a buoyant member such as a sled. A flexible transmission tubing 442 is coupled to poles, pilings or other structural support element 440. Structural support element 440 allows flexible transmission tubing 442 to convey fluid between an open pit mine 470 to another reservoir. As an example a Kimberlite cone 471, is located below open pit mine 470 with a borehole extending below the surface and guiderail 440. As water is transmitted into open pit mine 470 the weight of the water combined with preexisting Kimberlite causes Kimberlite cone 471 to collapse. As Kimberlite cone 471 collapses, additional water is input into open pit mine 470 via turbine 448 which allows for added power generation.

Figure 66:
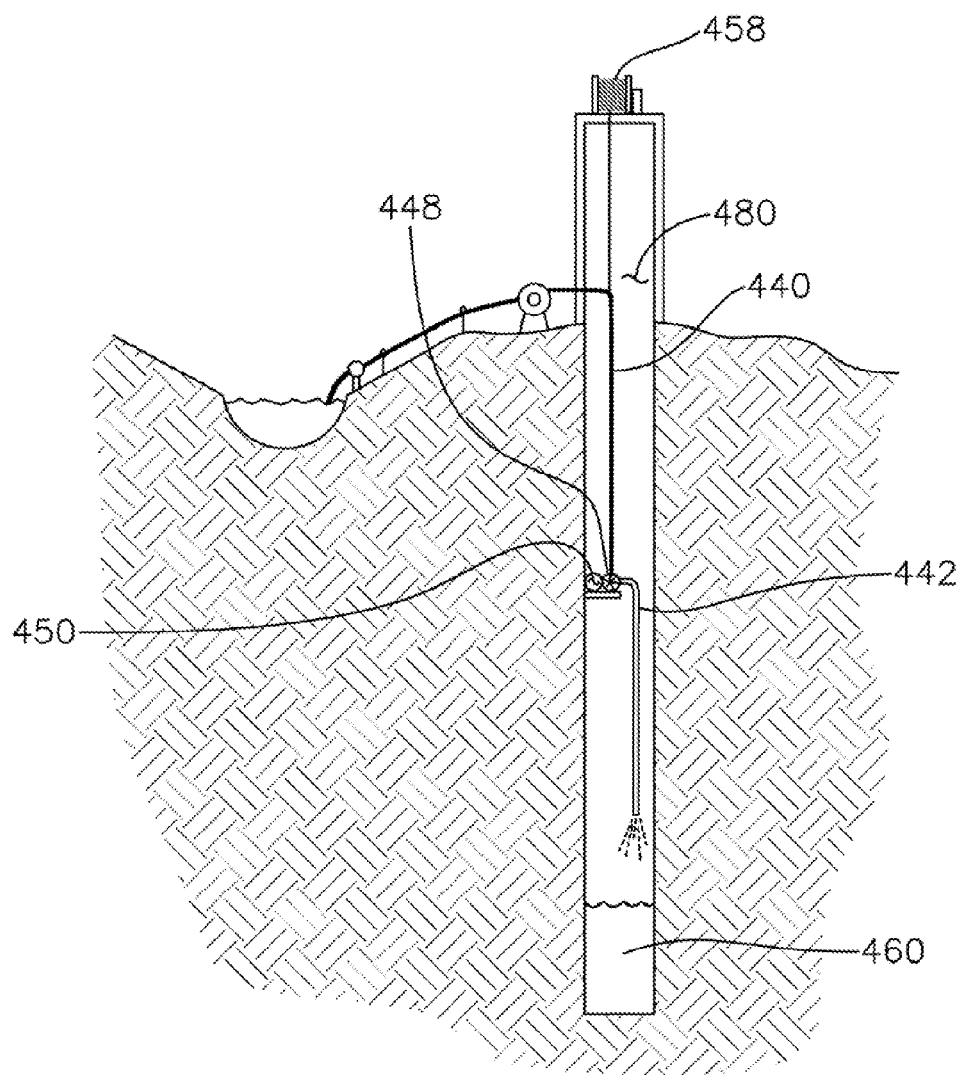
FIG. 66 is a side schematic view of a power generating system showing a platform supported generator and flexible tubing according to a preferred embodiment of the invention.

Referring now to FIG. 66, a mineshaft 480 having a flexible fluid transmission tubing 442 (sometimes referred to as a draft tube) possibly of a variable diameter connected through turbine 450 to rigid transmission tubing disposed within penstock 440 and operatively connected to a winch member 458 is illustrated according to a preferred embodiment of the present application. As water is transmitted from a fluid medium 460 into mine shaft 480 via rigid transmission tubing disposed within penstock 440, it passes through turbine 448 in turn generating power. After passing through turbine 448, fluid is conveyed into a draft tube 442 and eventually deposited into mineshaft 480. As fluid accumulates within mineshaft 480, winch member 458 raises turbine 448 and generator 450 via a cable running through the penstock 440 above the fluid line so that maximum power generation may occur.

Figure 67:
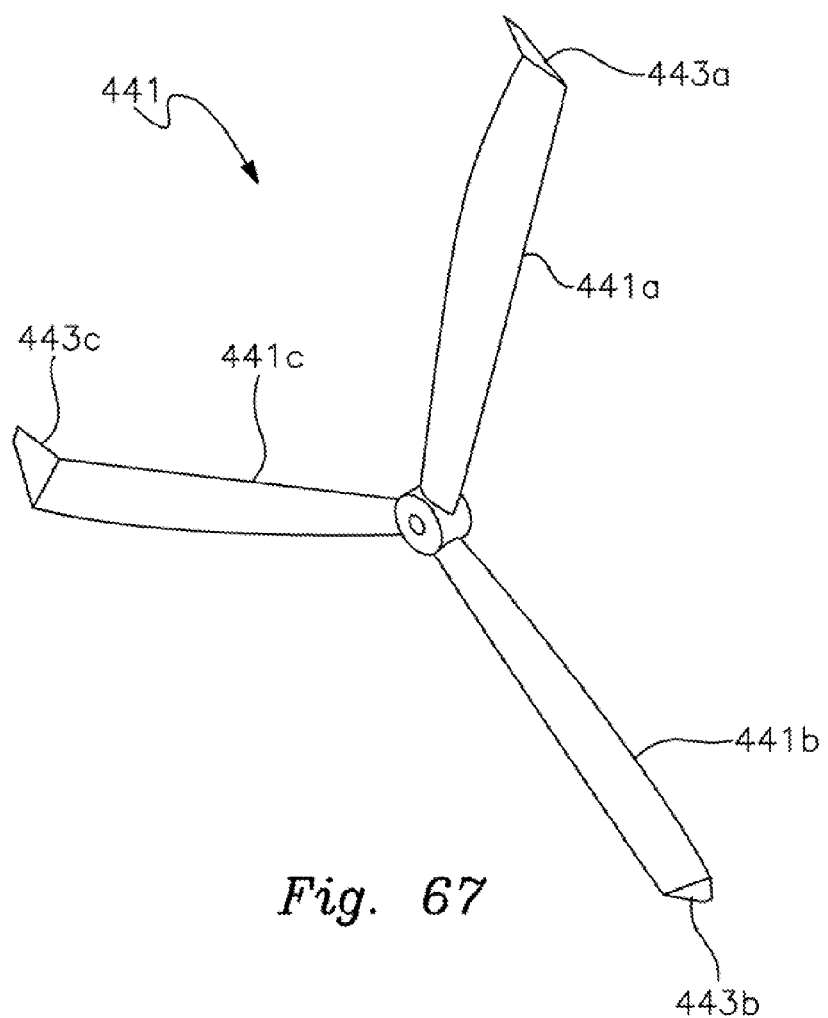
FIG. 67 is a perspective view of a turbine blade configuration according to a preferred embodiment of the invention.

Referring now to FIG. 67, a turbine impeller 441 having winglets 443a, 443b, and 443c fixedly attached at the ends of blades 441a, 441b, and 441c is depicted according to a preferred embodiment of the present application. Accordingly winglets 443a, 443b, and 443c extend substantially at an angle, of a variety of configurations somewhere between zero and one hundred eighty degrees, including even perpendicular from the center of turbine impeller 441. Winglets 443a, 443b, and 443c extend from blades 441a, 441b, and 441c in a generally perpendicular orientation to minimize impacts from vortex shedding thus resulting in higher turbine efficiencies. In an alternative embodiment of the present application winglets 443a, 443b, and 443c may tangentially extend from one or more turbine impellers and may couple to turbine impellers or any other component of system for power generation through movement of fluid. Winglets 443a, 443b, and 443c may extend laterally from turbine impellers. Winglets may extend from multiple locations and various angles of single ducts, dual ducts, converging ducts, diverging ducts, and turbine impellers.

In one embodiment of the present application, winglets 443a, 443b, and 443c may extend from one or more turbine blades 441a, 441b, and 441c in a lateral orientation and be oriented substantially normal to the direction of a moving fluid. In another embodiment, multiple winglets 443a, 443b, and 443c may extend from turbine blades 441a, 441b, and 441c while other winglets extend at alternative angles. In yet another embodiment in which multiple turbine blades 441a, 441b, and 441c are present, a single turbine impeller 441 may include one or more winglets 443a, 443b, and 443c while another turbine impeller 441 lacks winglets.

In other embodiments turbine impeller 441 may be made of at least two materials here illustrated according to a preferred embodiment of the present application. For example, turbine impeller 441 may include at least one metallic layer and at least one composite layer. Accordingly a composite layer surrounds metallic layer. In another embodiment, one or more composite layers may surround one or more metal layers.

Alternatively, in other embodiments, one or more metal layers may coextend to the same length as one or more composite layers.

In other embodiments of the present application, multiple layers including both composite layers and metal layers may make up one or more turbine impellers. For example, a soft material may make up the innermost layer of one or more turbine impeller 441, a harder material may surround the innermost layer to make up a middle layer of one or more turbine impellers 441, and yet an even harder layer may surround the middle layer to make up the outermost layer of one or more turbine blades 441a, 441b, and 441c. One or more turbine impellers 441 may be made up of layers of both hard and soft materials that can be arranged in any order or combination.

In an embodiment of the present application, one or more outer layers of one or more turbine blades 441a, 441b, and 441c may shed to allow one or more inner layers to allow one or more turbine blades 441a, 441b, and 441c to maintain functionality. For example, in the event that an outer layer is made of a material that is not rust proof, it is desirable that an encompassed inner layer would be made of a composite material that is rust proof. Therefore, if a multilayered turbine vane has an outer non-rust proof metal layer and an inner layer comprised of a rust proof layer such as fiberglass, a multilayered turbine vane may be disposed in a fluid containing sodium, such as seawater. Although the multilayered turbine vane may corrode over time, a multilayered turbine vane could still maintain some of the properties provided by the metal such as hardness all while maintaining its functionality through its fiberglass reinforcement.

Figure 68:
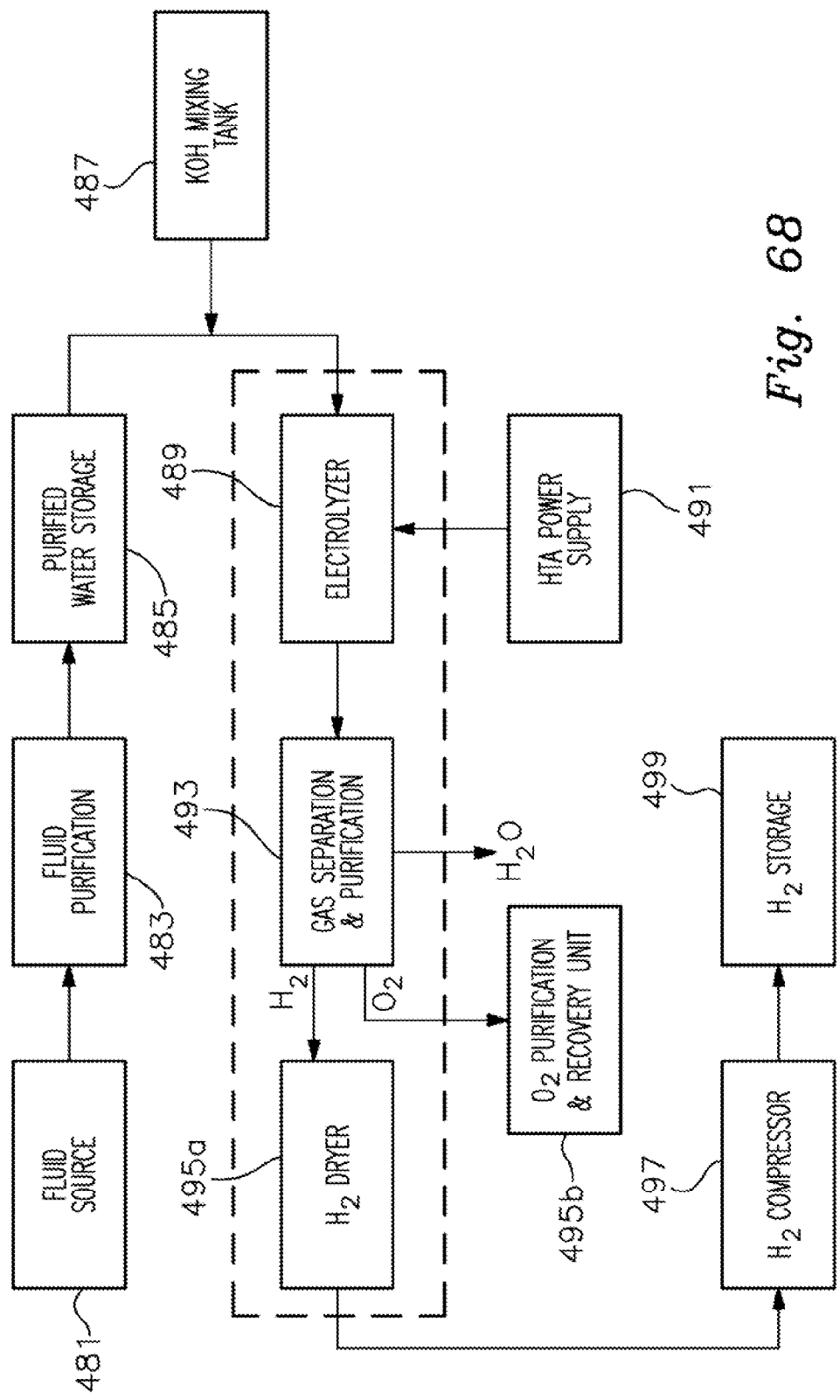
FIG. 68 is a schematic block diagram of a power generating system using a hydrogen production assembly.

Referring now to FIG. 68 a schematic illustrating fluid being conveyed through a hydrogen production assembly is illustrated. Accordingly, a fluid source 481 is illustrated showing a fluid being conveyed into a fluid purification chamber 483. As fluid is conveyed into fluid purification chamber 483, purified water is created and conveyed into a purified water storage facility 485. Water is then conveyed into an electrolyzer 489 and is supplemented by a KOH mixing tank 487. Electrolyzer 489 which separates hydrogen and oxygen molecules via electrolysis is powered by a hydropower turbine array 491. Fluid is conveyed from electrolyzer 489 into a gas separation and purification chamber 493, which separates condensate from hydrogen molecules and oxygen molecules. Hydrogen molecules are then conveyed into a drying chamber 495a, while oxygen molecules are conveyed into an oxygen purification unit 495b. After hydrogen molecules are conveyed through drying chamber 495a, they are then sent into a compression chamber 497 and eventually stored in a hydrogen storage facility 499.

In an embodiment of the present application, a hydrogen storage facility 499 may be operatively connected fueling station and one or more hydrogen filtration apparatuses. As hydrogen is offloaded from hydrogen storage facility to a fueling station, hydrogen powered vehicles, may receive hydrogen power via hydrogen storage facility 499.

A plurality of hydrokinetic power generating cells as described herein may by operatively associated with one or more computers, including computers and server farms disposed on offshore barges. Offshore barges may include free floating barges and barges which are tethered to the bottom of the ocean floor. Hydrokinetic power may be used to power and supply cool fluid to components of computers and server farms including heat exchangers and cooling pumps.

Figure 69:
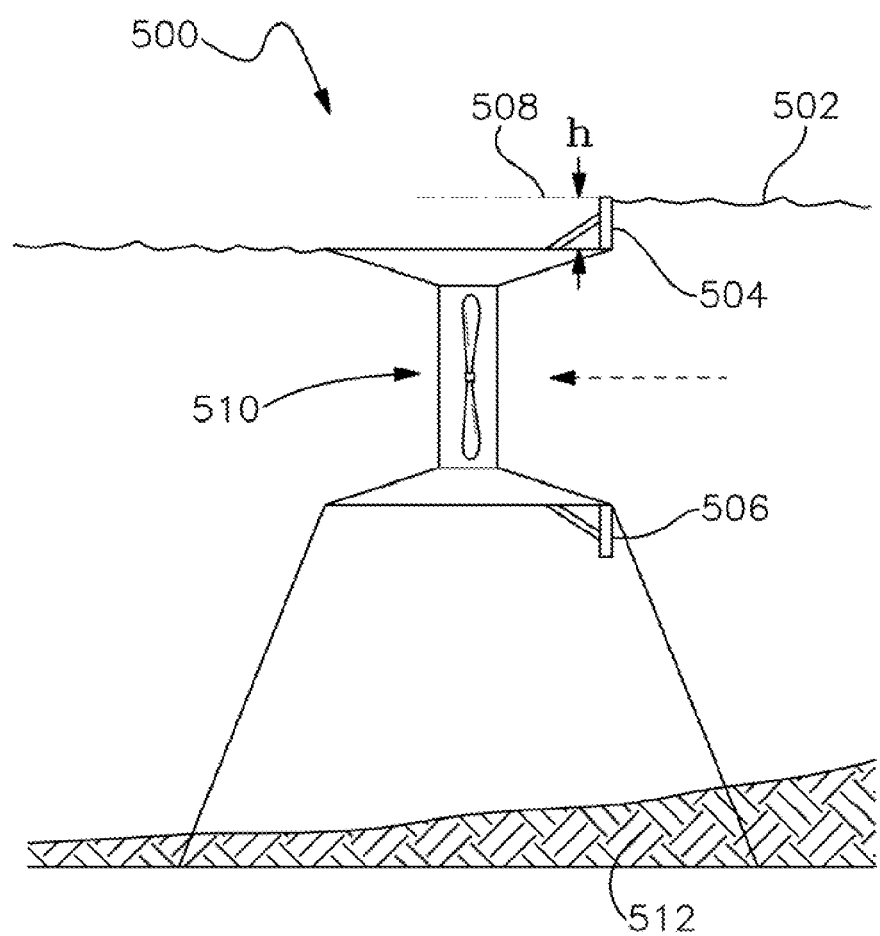
FIG. 69 is a floating turbine system for generating power according to a preferred embodiment of the invention.

Referring now to FIG. 69 a floating turbine system 500 in a river, ocean, tidal area, or irrigation canal or other man made conduit that can convey a fluid whereby current flow 502 moves through the turbine and generates power is shown. As water approaches the turbine, a certain amount of the flow may be backed up due to the presence of the turbine. This backup may create a head effect which when combined with a blocking mechanisms 504 and 506 as shown, creates head potential which may be utilized in generating additional power. Head height "h" 508 as shown may be sufficient to then use that potential in the same turbine at increased efficiency or another power generating turbine or other power generation system. Additional head creating mechanisms may be used as shown on the bottom of the turbine to further enhance the head effect.

Turbine 510 is moored to the river bed 512 (or ocean, tidal, or bottom or irrigation canal) by tethers 114 (however, it may also be moored on a monopile or between multiple pilings) and may be part of an array of turbines aligned to maximize exploitation of head potential of a number of turbine systems. This can be used in an array system or modular energy producing cell system. This can be used with temporary gravity anchors or permanent attachment or temporary attachment to the ground at the bottom of the water body.

In a preferred embodiment of the invention, this system will create head in a flowing current that can be used by a hydrokinetic energy production system to enhance and increase the production of the system without building a dam or impoundment. By creating this head, the energy produced by the hydrokinetic system is a combination of kinetic energy derived from the flow of the current and the potential energy created by the non-impounded head. This head could be inches in height or up to feet in height depending on the implementation. In its operation, the hydrokinetic turbine installation of the present invention converts the kinetic energy in a current into usable power. Traditional hydroelectric turbine/generator systems installed use dammed water sources to convert potential energy into usable power. More particularly, water flow from undammed sources that has the water flow characteristics modified, i.e. water flow pressure drop is modified to increase velocity across a hydrokinetic turbine installation to increase energy production further. The present invention can also be applied at an existing hydroelectric facility.

Taking advantage of head potential can be done in a number of ways according to the invention as more fully described below in FIGS. 70A through 75B. Aerofoils (hydrofoils) around the rotating turbine, slip streams, nested sets of ducts, or bubbling upstream or downstream components which may or may not rotate to modify pressure drop (velocity) at the rotating turbine will achieve some of the benefits of the present invention. Alternatively, one can use eductors, ejectors or counter rotating members to enhance velocity and thus increase power. In yet another embodiment, a nested set of counter rotating elements can also help increase velocity both in axial shaft and shaftless (circumferential generator) also called permanent magnet or magnetically levitated designs.

The present invention deals specifically with provisions for a stationary or rotating or counter-rotating exterior blade about a hydrokinetic turbine to increase the pressure drop across the turbine, the desired result being that the turbine is enabled to operate using higher water velocity relative to the ambient, substantially increasing power production and enabling individual elements operating near the modes of their peak efficiencies.

This system could apply in a single duct or dual ducted turbine as well as non-ducted hydrokinetic units. In accordance with a preferred embodiment of the invention, there is also disclosed a method to control pressure drop for current based hydro kinetic devices for generating power in stand alone or array based structures in ocean currents, tidal currents, river currents, canals, and aqueducts that significantly enhance power generation versus non-ducted and simple ducted (single or double) devices. Within those structures the primary objective to increase power output in a hydrokinetic current based system is by controlling pressure drop across the whole device or specific sections/areas of the device. By controlling pressure drop one can increase velocity which has the highest impact on power output.

Turning now to FIG. 70A, there is shown in side cross section a stationary or rotating exterior blade 526 circumferentially mounted on housing 520 about turbine 522. Exterior blade 526 induces a swirl or vortex that increases flow across the turbine 522, thereby increasing velocity 524 of water across turbine 522 as the water pressure drop increases. FIG. 70B shows a cross sectional longitudinal view of the system where blade 526 may also be fixed but positioned in such a way as to lower pressure on the output side and create turbulence, swirl, a vortex or other flow features further increasing velocity. As exterior blade 526 rotates, a pressure drop is achieved around turbine 522 thus increasing velocity through turbine 522. Exterior blade 526 may be rotating or counter rotating 528 depending on the flow characteristics that are desired. Exterior blade 526 can also be fixed, acting like vanes to induce a vortex which can increase velocity and thus power output.

FIG. 71A shows a side cross section of a cantilevered system 530 for guiding water flow behind turbine 536 and turbine unit housing 532. FIG. 71B shows a longitudinal front view of the same system on the front side of turbine 536. In either configuration with the cantilevered system being placed in front of or behind the turbine 536, the added duct 534 operates to increase velocity 538 through turbine 536 and achieve the benefits of the present invention. In an alternative preferred embodiment the water flow and velocity 538 is reversed with cantilevered system 530 and duct 534 guiding the water flow into turbine 536. The position of the cantilevered system 530 can be such that the vertical cross section of the end of the cantilevered system 530 is in front or behind the vertical cross section of the end of the duct/housing 532 relative to the direction of flow. In another embodiment, the vertical cross section of the end of the cantilevered system 530 can be inside the vertical cross section of the end of the duct/housing 532 relative to the direction of flow.

FIG. 72A shows a circumferential fixed flange 540 with an angle relative to the horizontal housing greater than 20 degrees about turbine 546 that creates turbulence 542 and thus pressure drop which in turn enhances velocity through turbine 546 and increases power output. FIG. 72B shows a cross sectional longitudinal view of turbine 546 turbine housing 544 and flange 540. In an alternative preferred embodiment, flange 540 may also have freedom of movement for rotation 548 either clockwise or counterclockwise about turbine 546.

FIG. 73A shows a side cross section view of a radial eductor 550 positioned about the circumference of turbine housing 552 to create and control pressure drops thus increasing velocity 559 and thereby increasing power output. FIG. 73B shows a cross sectional longitudinal view of radial eductor 550 which has an opening inlet 554 on input side of turbine 558 and an exit outlet 556 on the output side of turbine 558 and turbine housing 552.

FIG. 74A shows a side cross sectional view of turbine 568 and turbine housing 566 having an air tube system comprising an air tube 560, air inlet 564 and air outlet 569 that directs air into the water flow through the input side of the turbine 568 to affect the flow characteristics of turbine 568 and increase velocity 562. FIG. 74B shows a cross sectional longitudinal view of turbine 568, turbine housing 566 with air tube 560 and air inlet 564 to direct air into the water flow to increase velocity 562 and thus energy for extraction by turbine 568.

FIG. 75A shows in a cross sectional view a front ejector 570 about the circumference of turbine housing 572 and turbine 574 to decrease pressure across turbine 574 blade and thus increase velocity 578 and power output.

FIG. 75B show in a cross sectional view a rear ejector 576 about turbine 574 and the circumference of turbine housing 578, rear ejector 576 injecting water flow to decrease pressure across turbine 574 blade and thus increase velocity and power output.

Figure 76:
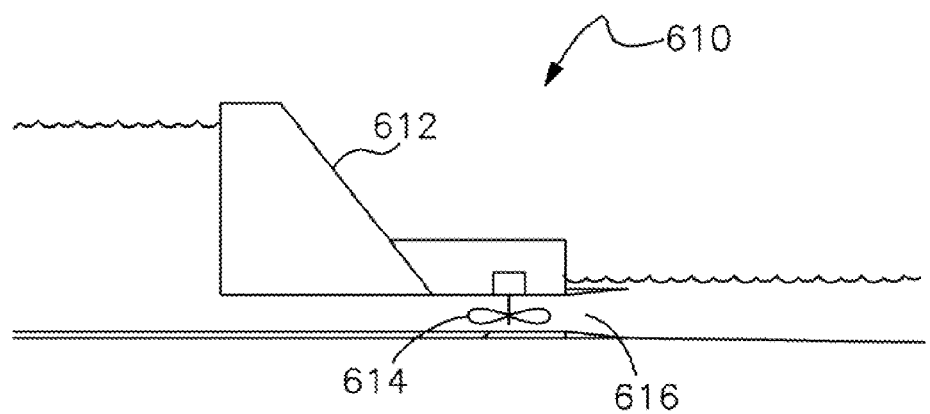
FIG. 76 shows a schematic diagram of a power enerating station on a dam using head potential to generate power through a turbine and outflow through a draft tube.

FIG. 76 shows a conventional power system 610 where head power from the upstream water blocked by a dam 612 is used to drive turbine 614 to generate power. Outflow of turbine 614 is through draft tube 616 which dissipates the flow of water from the turbine to reduce turbulence and other negative effects.

As previously mentioned, one of the current problems facing hydrokinetic power producers when locating hydrokinetic turbines downstream of existing dams is that the design of the draft tube at an existing dam (the draft tube conducts water from the outlet of the turbine to the body of water downstream of the existing dam) is specifically designed to dissipate kinetic energy. The end result of is that the kinetic energy of the water is lowered, meaning the water velocity is slowed, thus reducing potential capture of energy from a downstream hydrokinetic turbine A hydrokinetic turbine, one which operates solely on the water velocity, and not the pressure head of impounded water, from a theoretical standpoint, requires the highest possible water velocity and the largest possible turbine diameter in order to generate the greatest amount of power possible.

Installing a retrofit to the draft tube of the existing dam or designing the draft tube for optimal flow can result in a significant increase in the streamlined or turbulent flow velocity at the outlet of the draft tube, resulting in a much higher velocity at the downstream hydrokinetic turbine thereby increasing the power output. This can be accomplished in a number of ways by adding a retrofit draft tube insert or initially designing a draft tube for a new dam such that the diffusing rate that is lower but still of a diffusing design (the ratio of area's is still positive) or have a constant diameter draft tube or slightly decrease the draft tube diameter to compensate for minor frictional losses in the draft tube due to the materials of construction of the draft tube.

In a preferred embodiment, the flow may be streamlined as it lends itself to higher efficiencies of the hydrokinetic turbine, thus more efficiently converting available kinetic energy of the water into usable energy (shaft work).

Figure 77:
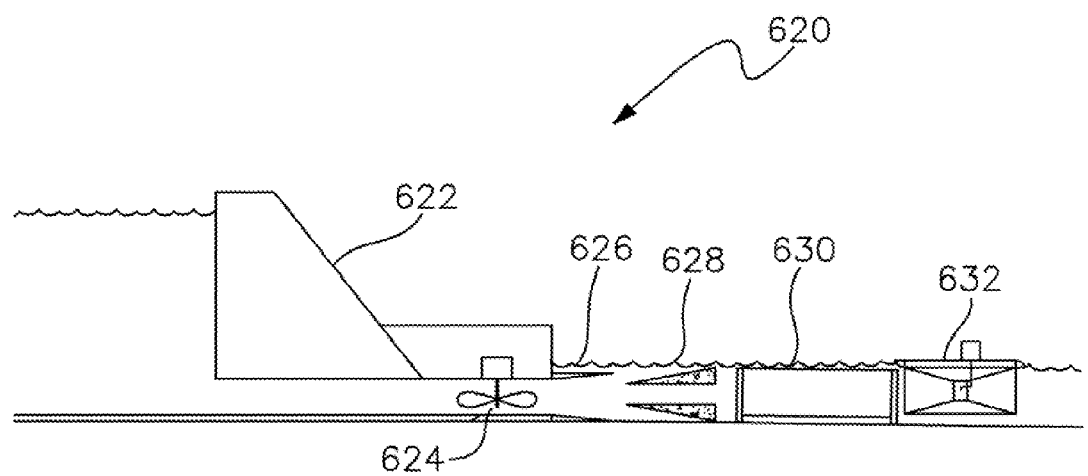
FIG. 77 shows a retrofit insert and draft tube exit wall in combination with a hydro kinetic turbine according to a preferred embodiment of the present invention.

FIG. 77 shows a combination of an insert to the draft tube and exit wall according to a preferred embodiment of the invention. Power system 620 has one or more conventional turbines 624 placed in dam 622 for generation of power from the head potential of the dam. A draft tube 626 is fitted with a reciprocal tube insert 628 for changing the flow characteristics of the tube. Preferably, but not required in all situations, is draft tube exit wall 630 placed in line with the inserted tube 628 to further channel the flow of water to the hydrokinetic turbine 632. In another embodiment not shown here, annular inserts without a turbine that have a smaller outer diameter than the inner diameter of the draft tube can be inserted into the draft tube to streamline flow and increase the output of the conventional head based turbine/generator set. In another embodiment annular inserts with a turbine and generator that have a smaller outer diameter than the inner diameter of the draft tube can be inserted into the draft tube to streamline flow and increase the output of the conventional head based turbine/generator set as well as generating additional incremental power from the hydrokinetic unit by being able to access the higher velocity water inside the draft tube downstream of the conventional head based turbine.

Reciprocal tube insert 628 can be designed in several ways including as a permanent retrofit or a temporary retrofit that could be removed or replaced. Further, the draft tube insert may be made from many materials of construction including, but not limited to, reinforced concrete; metals of various types; wood; and reinforced or non-reinforced synthetic material (for example, plastics), to name a few.

Figure 78:
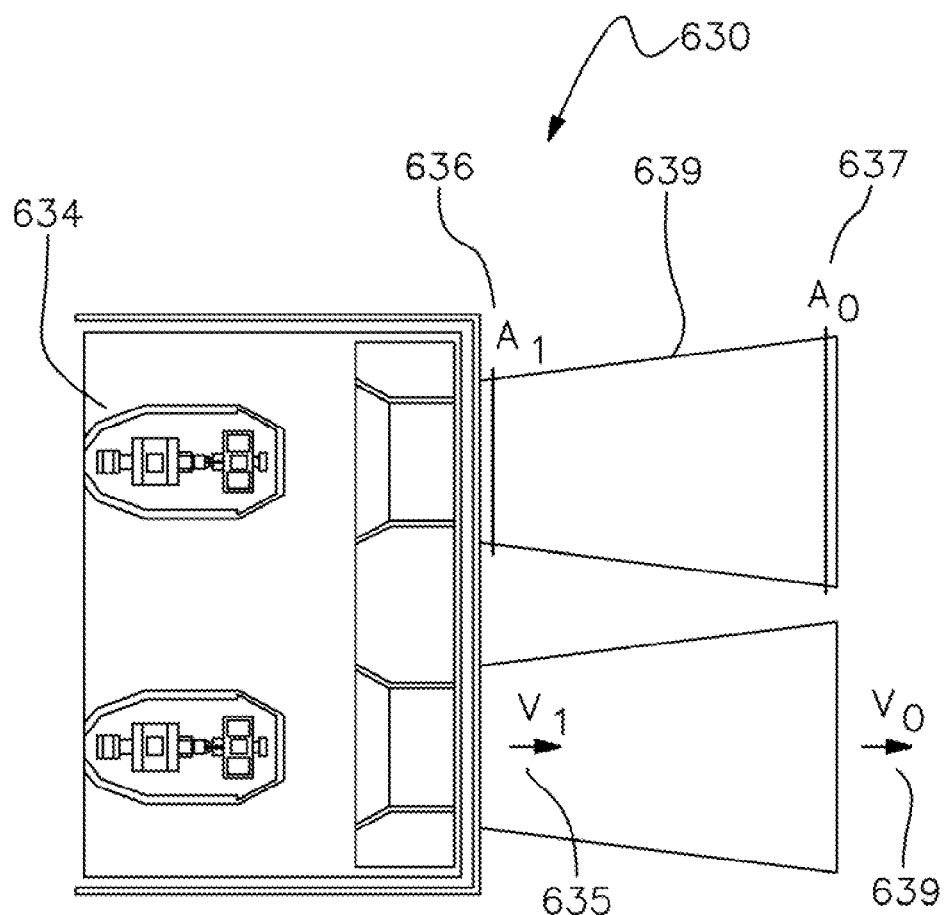
FIG. 78 shows a plan view of a conventional draft tube and turbine power assembly with attendant decrease in velocity of water exiting the turbine.

FIG. 78 shows the flow characteristics of a convention draft tube system. Turbine 634 generates power from water flow that exits through the draft tube 639. The flow rate remains constant where $A_i$ 636 is the draft tube cross sectional area closest to the turbine, and $A_o$ 637 is the cross sectional area farthest from the turbine. Notably, velocity $v_i$ 635 is substantially higher than $v_o$ 638 demonstrating that the draft tube decreases velocity of water exiting turbine 634.

Figure 79:
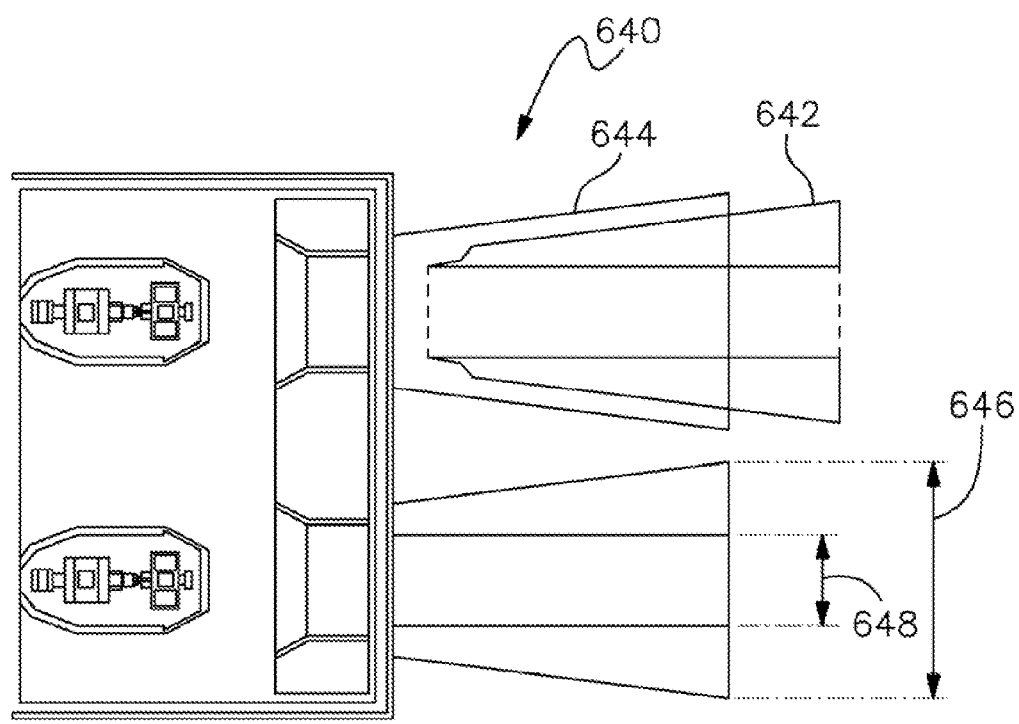
FIG. 79 shows a draft tube insert according to a preferred embodiment of the present invention and effective reduced diameter of draft tube for increased velocity.

FIG. 79 shows one embodiment of a power system 640 having conventional turbines with draft tube 644 retrofitted with tube insert 642 reducing the old diameter 646 of the draft tube to new diameter 648 which increases the velocity of the exiting water.

Figure 80:
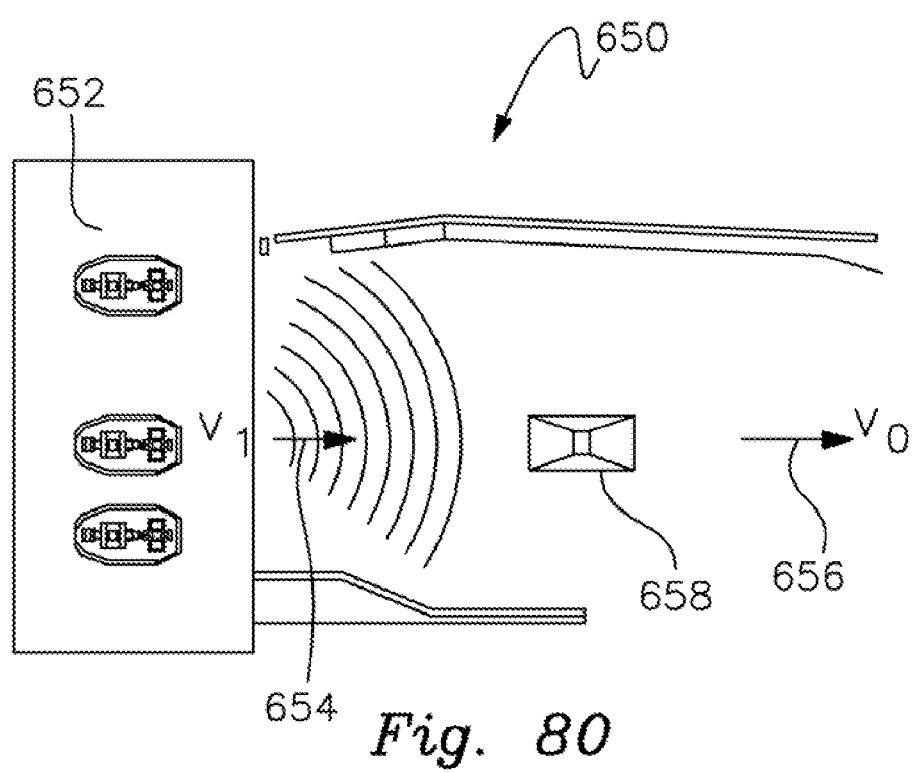
FIG. 80 shows a power system for converting river flow through turbines to electrical energy according to a preferred embodiment of the invention.

FIG. 80 shows a power system 650 for converting river flow through turbines to electrical energy. Turbines 652 are placed in a conventional manner whereby flow velocity $v_1$ 654 is higher than flow velocity $v_0$ 656. Without the addition of tailrace walls, the kinetic energy at the draft tube dissipates radially outward proportional to the following equation: $KE=\frac{1}{2} mv^2$.

Flow velocity $v_1$ 654 is significantly higher than flow velocity $v_0$ 656. Therefore, power potential for hydrokinetic turbine 658 is reduced and inefficiently low. To increase the flow characteristics for the hydrokinetic turbine, tailrace walls may be preferably placed at the output of the draft tubes to keep flow controlled in the created channel.

By inserting a wall in between each draft tube outlet, the kinetic energy of the water is forced into a more constant cross sectional channel which also has the effect of preventing or reducing the rate of the dissipation of kinetic energy from the water resulting in higher water velocities (higher kinetic energy) further downstream. Another enhancement to the insertion of walls in between the draft tube outlets is to install a floor below the draft tube outlets that extends downstream with the walls that have been installed creating a channel. By keeping the cross sectional area of the channel for the flowing water relatively constant, additional increases in the kinetic energy of the water can be obtained which increases the quantity of power generated by the hydrokinetic system.

Figure 81:
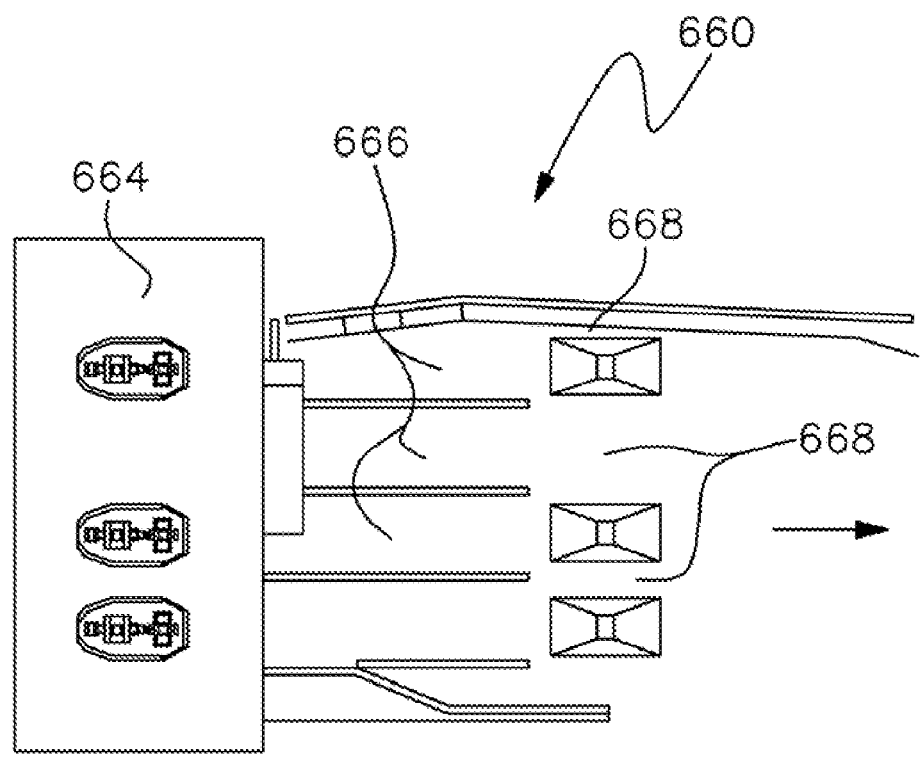
FIG. 81 shows tailrace walls for increased power potential to downstream hydro kinetic power turbines according to a preferred embodiment of the invention.

FIG. 81 shows a power system 660 with conventional turbine room 664 for generating hydroelectric power from a river. As water flows through the turbines out the draft tube outlets, it is channeled by tailrace walls 666 that direct the water and increase velocity of flow to high power potential hydrokinetic turbines 668. By doing so, the tailrace walls greatly increase the velocity of downstream flow to the hydrokinetic turbines thereby generating significantly higher amounts of power.

Figure 82:
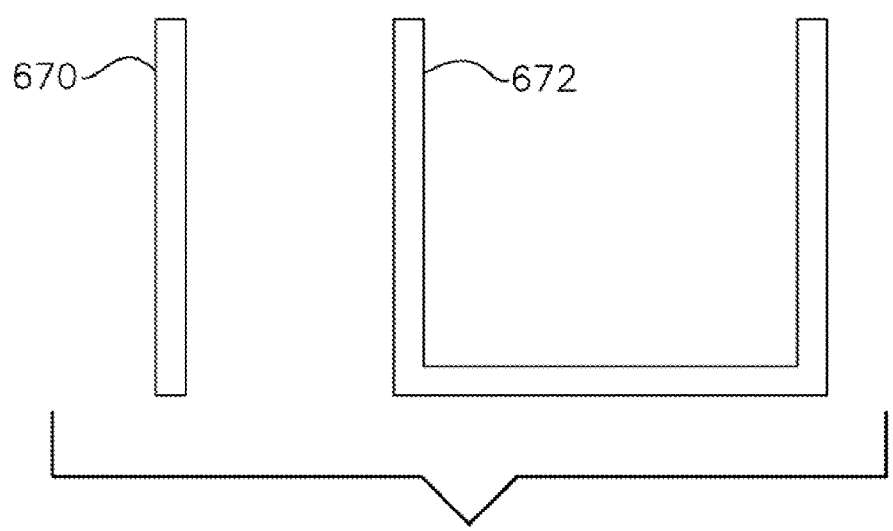
FIG. 82 shows two wall configurations for tailrace walls according to preferred embodiment of the invention.

FIG. 82 shows an embodiment of the tailrace and channel walls and or floors such as vertical wall 670 and box wall 672. The combination of walls and floors of the channel can be in many shapes including, but not limited to, vertical parallel walls only; walls and floor that create a "U" shape; walls and floor that create a "U" shape, but also converge the further downstream from the draft tube to keep the kinetic energy high; walls that form a "V"; walls that are fully submerged; and walls that are partially submerged.

The optimal system for the highest possible hydrokinetic power generation system downstream of a dam for a given dam design may be a combination of both a modified draft tube as shown previously and tailrace and channel walls and or floors as shown in FIGS. 81 and 82.

Figure 83:
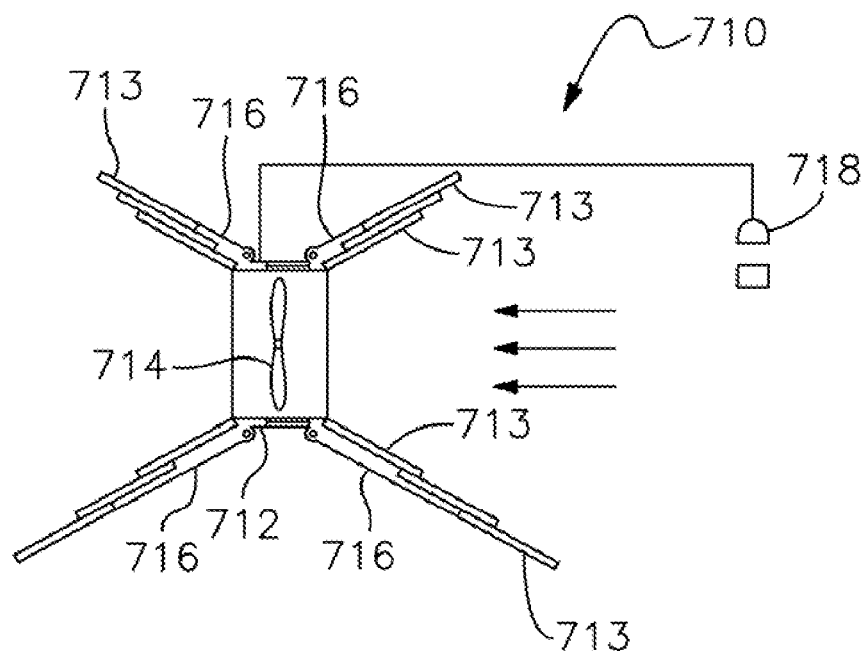
FIG. 83 shows a perspective view of a multidirectional hydrokinetic power generating turbine according to a preferred embodiment of the invention.

FIG. 83 illustrates a perspective view of a multidirectional hydrokinetic power generating turbine 710 according to a preferred embodiment of the present application. Multidirectional hydrokinetic power generating turbine 710 includes an impeller housing 712, an impeller 714 disposed within the impeller housing 712, adjustable ducts 716 pivotally connected to impeller housing 712, and a plurality of duct leafs 713 disposed about the one or more adjustable ducts 716. Duct leafs 713 articulate to cause the one or more adjustable ducts 716 to converge and diverge for selectively disposing a fluid about one or more impellers 714. Adjustable ducts 716 may be considered to be as an inflow duct or an outflow duct, depending on the direction in which the fluid is disposed.

A sensor 718 operably associates with multidirectional hydrokinetic power generating turbine 710 to vary the positioning and/or degree of extension and retraction of adjustable ducts 716. As fluid is disposed within a proximal or distal vicinity of the multidirectional hydrokinetic power generating turbine 710, sensor 718 senses a variable within that fluid and in turn conveys a signal to a controller (not shown). The controller in turn determines the appropriate orientation of adjustable ducts 716 and adjusts plurality of duct leafs 713 to correspond to the determination. Each of adjustable ducts 716 may be separately controlled. By controlling ducts separately, the shape of both inlet and outlet nozzles may be operated independent of one another. Controllers may either be automated or manual, and may be driven by a computer or a human. In the preferred embodiment the controller is a servo motor.

Sensor 718 may be of any of a variety of sensors to measure ambient conditions to control the operation of the ducts such as pressure, pressure drop, water velocity, temperature, change in rate, maximum and minimum flow speeds, and other flow characteristics. Sensor 718 may also be operatively associated with at least one impeller 714 in that when sensor 718 detects a shift in a variable of a flow or fluid, one or more impellers 714 may alter in shape or form. Impeller 714 is capable of changing shape either through mechanical means or through material composition. For example, electro-organic materials or piezoelectric materials can be controlled in such a way that inputs such as pressure, pressure drop, velocity, temperature, or any other variable can cause the material composition of impeller 714 to alter shape. Similarly, an impeller blade may be separately connected to a servo motor and may rotate to deflect or encompass a greater amount of fluid depending on shift detected by sensor 718. A change in the shape of impeller 714 or adjustable duct 716, be it temporary or permanent, may also be induced through an ion pasteurized control system, heating, cooling, reacting, or via any other detectable change in a variable that is known to one skilled in the material science and mechanical arts. Accordingly, the blades of both impeller 714 and adjustable duct 716 can have variable pitch blades which can be set using manual or automatic controls as desired. In an alternative embodiment sensor(s) 718 may be located outside the impeller housing, on the impeller, along an edge of a duct leaf 713, or at any other location, so long as sensor(s) 718 may convey a message to a controller.

In an embodiment of the present invention, the plurality of duct leafs 713 may be arranged in a circumferential manner to surround one or more adjustable ducts 716. As each duct leaf 713 is individually adjusted various arrays and fluid flows may be created. If all duct leafs 713 are the same length, as one duct leaf 713 articulates varying ranges of motion, it does not extend to the same length as another duct leaf 713. As each duct leaf 713 articulates through a range of motion, both the fluid amount and direction entering and exiting an adjustable duct 716 can be controlled. For example, in the event that a user wishes to limit the amount of flow entering adjustable duct 716, the plurality of duct leafs 713, may articulate towards one another. As the plurality of ducts articulate towards one another, adjustable duct 716 contracts and allows less fluid to enter multidirectional hydrokinetic power generating turbine 710. Alternatively, if a user wishes to increase the amount of fluid entering adjustable duct 716, the plurality of duct leafs 713 may articulate away from one another. As the plurality of duct leafs 713 articulate away from one another, adjustable duct 716 expands and becomes susceptible to receiving a larger amount of fluid. Accordingly, an unlimited amount of flow regimes may be created in this manner.

In alternative embodiments the entire direction of an adjustable duct 716 may be altered by manipulating ducts leafs 713. Accordingly, if a user desires to adjust the fluid entrance or exit to between zero and seventy five degrees, several duct leafs 713 may articulate towards the center of multidirectional hydrokinetic power generating turbine 710, while other duct leafs 713 articulate away from the center, all while maintaining a circumferential pattern. By allowing duct leafs 713 to simultaneously articulate in different directions, while disposed about adjustable duct 716, almost any fluid may be disposed in a desired flow regime. In the preferred embodiment, a fluid vector can be created by allowing fluid to enter multidirectional hydrokinetic power generating turbine 710 at any angle between fifteen to thirty degrees of motion.

Not only may duct leafs 713 be coordinated to contract and expand, but numerous vectors may be created through positioning both individual and groups of duct leafs 713. A fluid vector may be created by disposing duct leafs 713 in various arrays. By dynamically positioning duct leafs 713 in numerous positions, power generating turbine 710 can create a virtually unlimited number of both input and thrust vectors. For example, if one desires to increase the amount of flow rate input into multidirectional hydrokinetic turbine 710 moving in a substantially perpendicular direction, duct leafs 713 may be coordinated to change direction and align substantially adjacent to the direction of the flow. Alternatively, if too much flow is entering or exiting multidirectional hydrokinetic turbine duct leafs 713 may be coordinated to change direction to align in a direction which limits the amount of fluid entry.

Furthermore duct leafs 713 may be positioned in a manner that expels fluids in a certain direction to create thrust vectors. Once a fluid has entered multidirectional hydrokinetic turbine 710, its expulsion pattern may be controlled by positioning both individual and groups of duct leafs 713. For example, if one wishes to divert flow in a certain direction, an input duct can be positioned to input fluid, while the outflow duct can be positioned to dispel fluid in a direction of one's choosing. Further, as the fluid is being dispelled, duct leafs 713, may coordinate with one another and move in a pattern that dispels fluid as needed.

Figure 84:
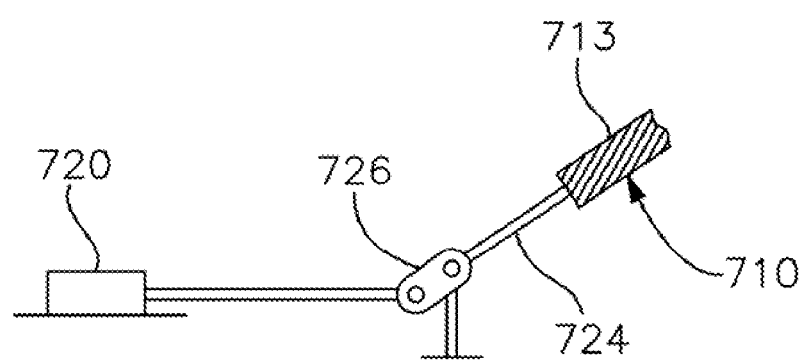
FIG. 84. shows a cross sectional view of a portion of a multidirectional hydrokinetic power generating turbine displayed in FIG. 1, while coupled to an automated controller via a control arm, and a pivoting mechanism according to a preferred embodiment of the invention.

Referring now to FIG. 84, a cross sectional view of a portion of a duct leaf 713 coupled to an automated controller 720 via a control arm 724, and a pivoting mechanism 726 is illustrated according to an embodiment of the present application. Controller 720 calculates the preferred positioning of one or more adjustable ducts 716 to attain optimal efficiency of multidirectional hydrokinetic power generating turbine 710. Controller 720 in turn adjusts the degree of articulation of duct leaf 713 via control arm 724 and pivoting mechanism 726. Control arm 724, may be coupled to only a portion of a duct leaf 713 via an attachment point. Once controller 720 determines the correct articulation that should be conveyed to duct leaf 713, controller 720 articulates pivoting mechanism 726. Pivoting mechanism 726 in turn pivots which causes articulation of control arm 724. Duct leaf 713 in turn articulates due to its attachment to control arm 724.

Figure 85:
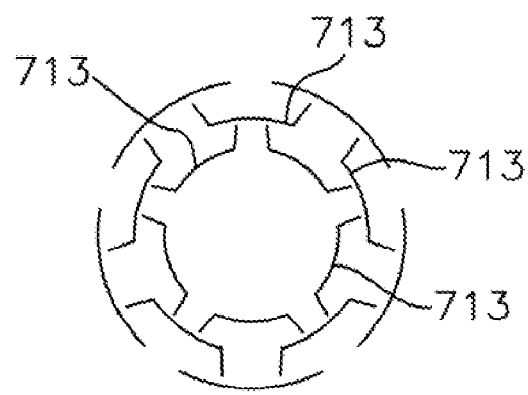
FIG. 85 shows a cross sectional cutout ortion of several leafed arrays of adjustable ducts according to a preferred embodiment of the invention.

Referring now to FIG. 85, a cross sectional cutout portion of several arrays of duct leafs 713 are depicted according to an embodiment of the present invention. The arrays of duct leafs 713 may optionally interlock with one another. In this particular embodiment, the leafed ducts are multi-tiered, staggered, and are capable of interlocking with one another to adjust the amount of flow imposed upon an impeller. Duct leafs 713 may be controlled via an automatic or manual controller that connects through a control arm 724 via an attachment point 717. Additionally, duct leafs 713 can be dynamically adjustable while a fluid is disposed in their vicinity.

Figure 86:
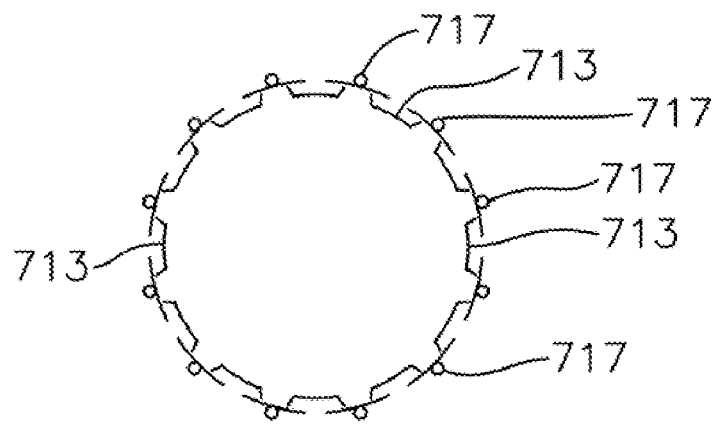
FIG. 86 shows a cross sectional cutout portion of an alternative of several leafed arrays of adjustable ducts according to a preferred embodiment of the invention.
Figure 87:
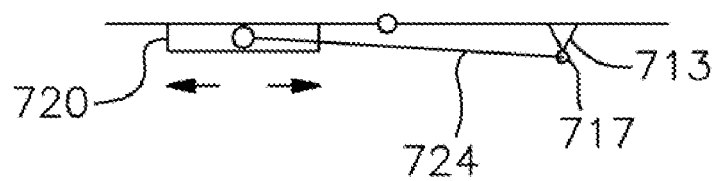
FIG. 87 shows a cross sectional of a duct leaf having attachment point to a control mechanism according to a preferred embodiment of the invention.

Referring now to FIGS. 86 and 87, cross sectional cutout portion of an array of duct leafs 713 is depicted having attachment points 717. FIG. 86 illustrates, attachment points 717 are positioned about a center of each duct leaf 713 so that adjustable duct 716 may interlock with an adjacent duct leaf 713. FIG. 87 illustrates an automated controller servo-actuator 720, a duct leaf 713, a controlling arm 724, and an attachment point 717. In an alternative embodiment attachment points 717 may be positioned about any point of duct leafs 713 in order to control the direction in which each duct leaf 713 may interlock with another duct leaf 713. For example, in an alternative embodiment one duct leaf 713 may have an attachment point 717 positioned at the far left, while another duct leaf 713 has an attachment point 717 positioned at the far right. Similarly, each duct leaf 713 may vary in the direction in which it interlocks with another duct leaf 713. For example duct leafs 713, may be capable of interlocking in multi-rotational fashion, i.e. clockwise or counterclockwise as illustrated in FIG. 86. Alternatively, duct leaf 713 may be capable of interlocking in a constrained rotation, i.e. only clockwise or only counterclockwise. It is important to understand that in each embodiment of the present application, each duct leaf 713 need not be the same as another duct leaf 713. For example, one duct leaf 713 may have an attachment point 717 at the center, while another duct leaf 713 has an attachment point 717 along a far left edge.

In certain embodiments, advantages in manufacturing are evidenced through disposing impeller 714 within a duct 716, while keeping constant transition angles into converging and diverging runners. By keeping a variable gap of approximately one inch between the diameter of impeller 714 and the diameter of duct 716 increased flow through ducting 716 is evidenced. The presence of increased flow leads to increased energy production. Accordingly, by dividing the outer diameter of the impeller by the inner diameter of the duct which maintains an approximate one inch separation, an increased power efficiency is shown. Accordingly increased power efficiency is shown when the ratio between the diameter of impeller 714 and the diameter of duct 716 ranges between 0.4 and 0.999, when the duct is between two and sixty inches. Similar ratio efficiency values between diameter of impeller 714 and diameter of duct 716 based on variable diameters of impeller 714 are shown as follows:

| Impeller 714 Diameter (inches) | Ratio (Impeller 714/Duct 716) |
| --- | --- |
| 2 in. to <60 in. | 0.4 to 0.999 |
| 60 in. to 360 in. | 0.4 to 0.996 |
| 361 in to 550 in. | 0.4 to 0.985 |
| >550 in. to 750 in. | 0.4 to 0.988 |
| >750 in. to 1000 in. | 0.4 to 0.99 |
| >1000 in. to 1250 in. | 0.4 to 0.99 |
| >1250 in. to 1500 in. | 0.4 to 0.992 |
| >1500 in. to 1750 in. | 0.4 to 0.993 |
| >1750 in. to 2000 in. | 0.4 to 0.994 |
| >2000 in. to 2250 in. | 0.4 to 0.995 |
| >2250 in. to 2500 in. | 0.4 to 0.9952 |
| >2500 in. to 2750 in. | 0.4 to 0.9956 |
| >2750 in. to 3000 in. | 0.4 to 0.9960 |
| >3000 in. to 3250 in. | 0.4 to 0.9963 |
| >3250 in. to 3500 in. | 0.4 to 0.9966 |
| >3500 in. to 3750 in. | 0.4 to 0.9968 |

Similarly, when a constant ratio of 0.98 is maintained, increased flow continues to be shown as while the diameter of ducting 716 and impeller 714 vary as follows:

| Diameter of Impeller 714 (inches) | Diameter of Duct 716 (inches) |
| --- | --- |
| 12 | 12.2449 |
| 24 | 24.4898 |
| 36 | 36.73469 |
| 48 | 48.97959 |
| 60 | 61.22449 |
| 72 | 73.46939 |
| 84 | 85.71429 |
| 96 | 97.95918 |
| 108 | 110.2041 |
| 120 | 122.449 |
| 132 | 134.6939 |
| 144 | 146.9388 |
| 156 | 159.1837 |
| 168 | 171.4286 |
| 180 | 183.6735 |
| 192 | 195.9184 |
| 204 | 208.1633 |
| 216 | 220.4082 |
| 228 | 232.6531 |
| 240 | 244.898 |

Figure 88:
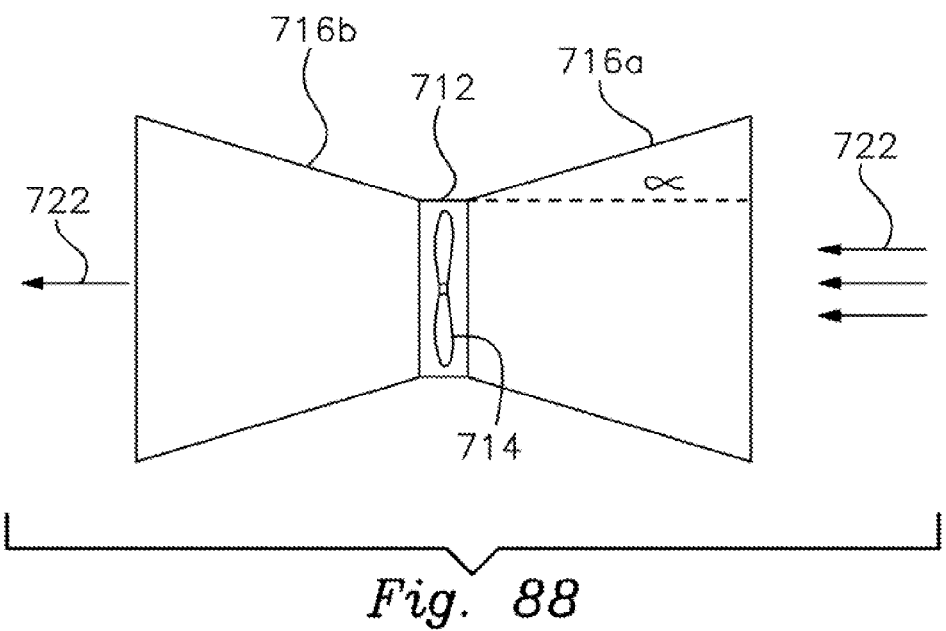
FIG. 88 shows a side view turbine having inlet and outlet ducts according to a preferred embodiment of the invention.
Figure 89A:
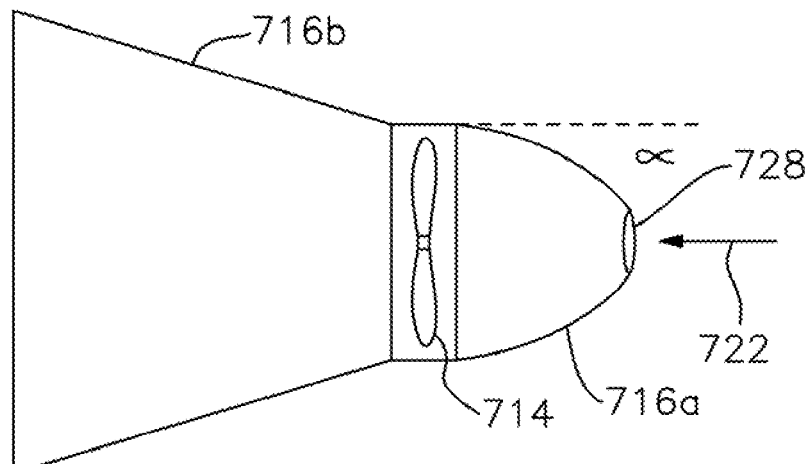
FIG. 89A shows a side view of a turbine having ducts articulated inwardly and outwardly according to a preferred embodiment of the invention.
Figure 89B:
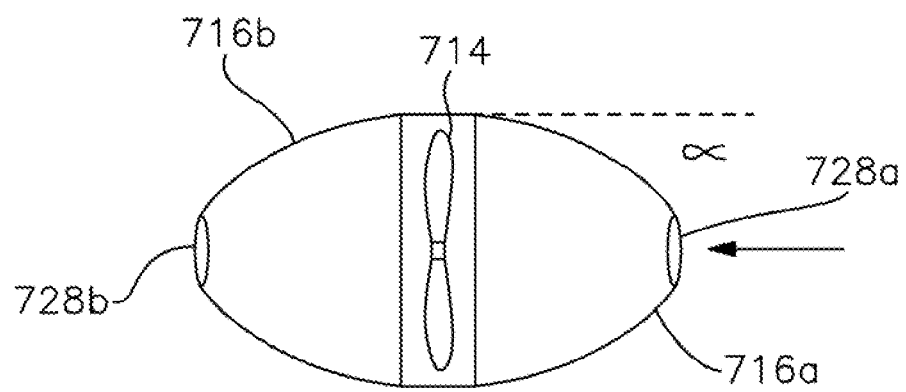
FIG. 89B shows a side view of a turbine having ducts articulated inwardly according to a preferred embodiment of the invention.

Referring now to FIGS. 88, 89A, and 89B, alternative configurations of multidirectional hydrokinetic power generating turbine 710 as illustrated in FIG. 83 are depicted. FIG. 88 depicts an embodiment in which ducts 716a and 716b diverge from impeller 714 as measured by angle alpha. Duct 716a serves as an inlet duct, while duct 716b serves as an outlet duct, as determined by disposal fluid 722 across multidirectional hydrokinetic power generating turbine 710. Impeller 714 is disposed within impeller housing 712. Though this particular embodiment illustrates a single impeller 714, in alternative embodiments one or more than one impellers 714 may be employed. Additionally in alternative embodiments when additional impellers 714 are employed, each impeller may rotate in different directions. For example one impeller 714 may rotate in a clockwise fashion, while another rotates in a counterclockwise fashion.

In operation as fluid flow 722 enters duct 716a, fluid 722 converges as it approaches impeller 714 and impeller housing 712. The convergence of fluid flow 722 causes additional pressure to be exerted on impeller 714 and in turn transfers additional energy to impeller 714 and causing impeller 714 to rotate at a greater rate than if fluid flow 722 did not converge. As fluid flow 722 is dispelled past impeller 714 through duct 716b, fluid flow 722 diverges along the expansion of duct 716b and begins flows at a slower rate.

FIG. 89A illustrates duct 716a articulated inwards and partially collapsed at angle alpha to establish a nozzle 728 while duct 716b articulated outwards and partially expanded. In operation as fluid 722 is exerted towards the nozzle, adjustable duct 716a the convergence of duct 716 causes a pressure buildup along at the nozzle 728. As fluid 722 surpasses nozzle, additional pressure is transmitted towards impeller 714 in order to create a greater amount of rotation than would otherwise amount if adjustable duct 716a was oriented parallel to fluid flow 722.

FIG. 89B illustrates ducts 716a and 716b pivoted inwards and partially collapsed at angle alpha to establish nozzles 728a and 728b. In operation, as fluid flow 722 approaches nozzle 728a, additional pressure is conveyed towards nozzle 728b. Due to adjustable duct 716b being articulated inwards and partially collapsed to establish nozzle 728b, a greater pressure is maintained within multidirectional hydrokinetic power generating turbine 710 creating an even greater amount of flow to be forced towards impeller 714 than would otherwise occur as illustrated by FIG. 89A. Ducts 716a and 716b may be defined by any of a variety of functions including a frusto-conical shape, parabolic curve, square to circular cone and other configurations. The interior of the cone may also be contoured with grooves or other depressions or extensions, fins etc. to facilitate flow. In some cases, rifling on the inside of the cone may be used to enhance flow.

FIGS. 88, 89A, and 89B illustrate only several of configurations that multidirectional hydrokinetic power generating turbine 710 and its adjustable ducts 716 may take. In alternative embodiments, flow ducts 716a and 716b may be fully or partially diverged or converged. Further in alternative configurations, multiple adjustable flow ducts 716 may be located both before and after impeller 714. In yet other configurations, a multidirectional hydrokinetic power generating turbine may have one, two, or any other number of adjustable flow ducts 716 before, after, in front, or behind impeller 714. Alternatively in other embodiments, impeller-housing 712 may encompass more than one impeller 714. Further, each impeller 714 need not be the same size other impellers 714. In yet other embodiments, impellers 714 may be mounted outside of impeller housing 712. Angle alpha can represent the curvature of a plane of fluid formed by lines, because engineered curvatures can increase the overall efficiency and power generation of the unit.

Figure 90A:
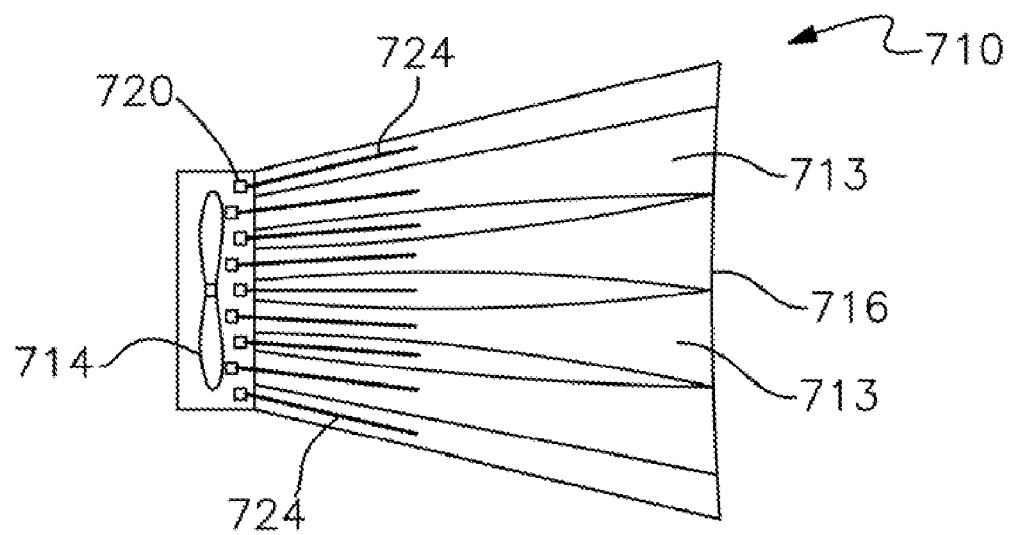
FIG. 90A shows a side view of a multidirectional turbine having adjustable ducts in a retracted position according to a preferred embodiment of the invention.
Figure 90B:
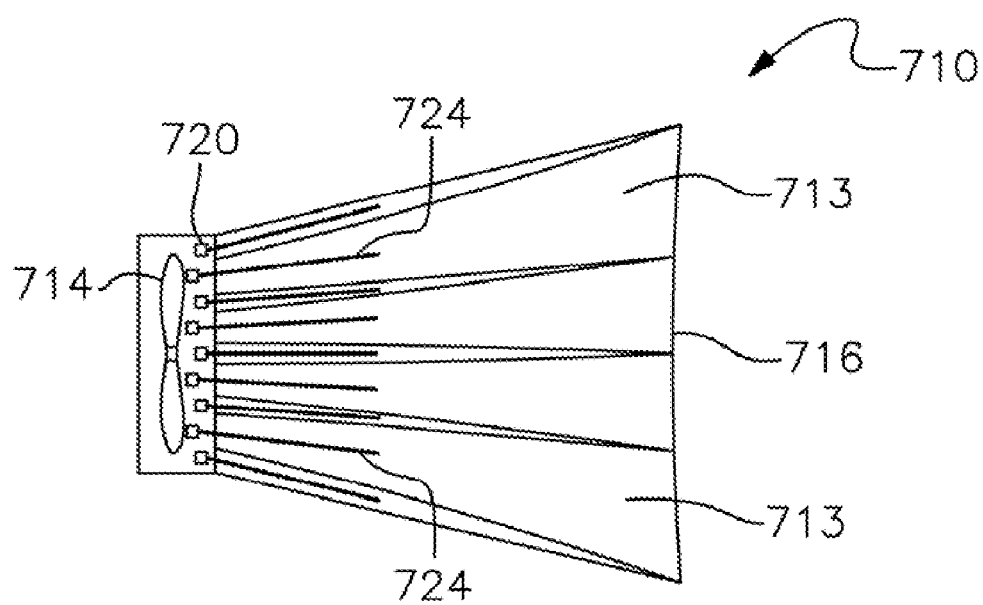
FIG. 90B shows a side view of a multidirectional turbine having adjustable ducts in an expanded position according to a preferred embodiment of the invention.

Referring now to FIGS. 90A and 90B, side views of multidirectional hydrokinetic power generating turbine 710 are depicted to show expanded and retracted positions of adjustable flow ducts 716. Controlling arms 724 attach controllers 720 to adjustable flow ducts 716. Controllers 720 move adjustable flow ducts 716 through controlling arms 724 which are attached to duct leafs 713. Duct leafs 713 articulate adjustable ducts 716 to establish various nozzling positions and in turn control the disposal and amount of a fluid imposed upon impeller 714. Depending on disposal of fluid imposed upon impeller 714, controllers 720 may articulate adjustable flow ducts 716 via duct leafs 713 to establish various flows that converge and diverge. In alternative embodiments multidirectional hydrokinetic power generating turbine 710 need not be composed entirely of adjustable flow ducts 716 or duct leafs 713. In some embodiments several adjustable flow ducts 716 may be fixed while other flow ducts 716 may be adjustable. In yet other embodiments several duct leafs 713 may be fixed while other duct leafs 713 are adjustable. In operation, adjustable flow ducts 716 may be angled upward, downward, or side to side to meet the optimal flow direction present at any one time.

Referring now to FIGS. 91A, 91B, and 91C perspective, frontal, and rear views of alternative embodiments of impeller 714 are illustrated respectively. Impeller 714 may include both rotors 730 and stators 732. Stators 732 may be either be "swirl" inducing or "non-swirl" inducing. Stators 732 provide added control of pressure drop recovery after rotors 730 which allows for higher efficiency and power output. Stators 732 induce a "swirl" in the flow field which also enhances the power production above and beyond "non-swirl" stators 732 and can be as high as thirty percent to fifty percent more than a non-swirl stator. Alternative preferred embodiments include stators 732 (non-swirl and swirl) in a multidirectional hydrokinetic power generating turbine where stators 732 are used for other purposes than just the mechanical support of the shaft. Impeller 714 may be bottom mounted, piling mounted or suspended from the surface or positively buoyant and anchored/moored to the bottom, or in converging/diverging nozzles, in single or dual ducts or without a duct. The blades of both rotors 730 and stators 732 may include variable pitch blades which can be set using manual or automatic controls as desired.

In the present embodiment, rotors 730 may be considered to be oriented in a counterclockwise fashion while stators 732 may be considered to be oriented in a clockwise fashion. However, in alternative embodiments, rotors 730 and stators 732 may be positioned in an alternative fashion. For example rotors 730 may oriented in a clockwise fashion while stators 732 may be oriented in a counterclockwise fashion.

Multi directional hydro kinetic turbines and impeller housing may be designed such that the turbine rotor and impeller housing can be raised and lowered to change the vertical position of the dual ducted multidirectional hydro kinetic turbines, without necessity for removal from an active fluid or removal from service. The benefit of this is that if a high speed flow changes to a vertical orientation the multidirectional hydrokinetic turbines can reposition to absorb a maximum amount of energy. Multidirectional hydrokinetic turbines may be bottom mounted, piling mounted or suspended from a surface or positively buoyant and anchored/moored to a surface, while having converging/diverging nozzles and including single or dual adjustable ducts or alternatively include an impeller without an impeller housing in a fluid flow.

System for generation of power through movement of fluid may also include various additional mechanisms including DC Generators, AC Generators, asynchronous systems, synchronous systems, permanent magnets including rare earth magnets and the like.

The components of system for power generation through movement of fluid and its various components may be made from a wide variety of materials. System for generation of power through movement of fluid may also include various additional mechanisms including DC Generators, AC Generators, asynchronous systems, synchronous systems, permanent magnets including rare earth magnets and the like. These materials making up system for power generation through movement of fluid may include metallic or non-metallic, magnetic or non-magnetic, elastomeric or non-elastomeric, malleable or non-malleable materials. Non-limiting examples of suitable materials include metals, plastics, polymers, wood, alloys, composites and the like. The metals may be selected from one or more metals, such as steel, stainless steel, aluminum, titanium, nickel, magnesium, or any other structural metal. Examples of plastics or polymers may include, but are not limited to, nylon, polyethylene (PE), polypropylene (PP), polyester (PE), polytetraflouroethylene (PTFE), acrylonitrile butadiene styrene (ABS), polyvinylchloride (PVC), polycarbonate, extruded organic thermosets such as polychloroprene and combinations thereof, among other plastics. The system for power generation through movement of fluid and its various components may be molded, sintered, machined and/or combinations thereof to form the required pieces for assembly.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of various embodiments, it will be apparent to those of skill in the art that other variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A system for power generation through movement of fluid comprising:
   a power generating cell comprising:
      a generally cylindrical housing;
      a ring for rotating disposed in said housing;
      one or more impellers fixedly coupled to said ring; and
      a generator operably coupled to said ring for receiving energy from the one or more impellers;
   wherein fluid is disposed about one or more impellers for creating energy.

2. The system for power generation through movement of fluid of claim 1, further comprising;
   a chain member operably coupling the power generating cell to the generator for keeping the chain member and the power generating cell in constant communication.

3. The system for power generation through movement of fluid of claim 2, the generator further comprising a rotatably attached first sprocket member for engaging the chain member to transmit energy to the generator.

4. The system for power generation through movement of fluid of claim 1, further comprising a first sprocket member and a second sprocket member;
   wherein the first sprocket member is operably coupled to the generator; and
   wherein the second sprocket member is disposed between the power generating cell and the power generating cell such that the second sprocket member and the first sprocket member communicate energy between the power generating cell and the generator.

5. The system for power generation through movement of fluid of claim 4, further comprising a chain member coupled to the first sprocket member, the second sprocket member, and the power generating cell for transferring fluid energy between the generator and the power generating cell.

6. The system for power generation through movement of fluid of claim 5 further comprising a tensioner operably disposed between a first gearing mechanism and a second gearing mechanism drawing tension in the chain member.

7. The system for power generation through movement of fluid of claim 1, further comprising a cross brace disposed between the rounded outer wall for supporting the power generating cell in rotation.

8. The system for power generation through movement of fluid of claim 1, wherein the ring further comprises one or more grooves for coupling a chain member.

9. A system for power generation through movement of fluid comprising:
    a power generating cell comprising:
        a rounded outer wall;
        a ring for rotating along the outer wall;
        one or more impellers fixedly coupled to the ring; and
    a generator for receiving energy from the one or more impellers having a first sprocket member in communication with the power generating cell via a second sprocket member;
    wherein fluid is disposed about the power generating cell to cause the one or more impellers to rotate which is transmitted to the generator via the first sprocket member and the second sprocket member.

10. The system for power generation through movement of fluid of claim 9 further comprising a chain member coupled to the first sprocket member and the second sprocket member for transmitting energy between the power generating cell and the generator.

11. The system for power generation through movement of fluid of claim 10 wherein said sprockets have a gear ratio from 2:1 to 60:1.

12. The system for power generation through movement of fluid of claim 10 further comprising a tensioning member extending from the second sprocket member for maintaining tension in the chain member.

13. The system for power generation through movement of fluid of claim 9, wherein the one or more impellers are disposed about a longitudinal midpoint of the rounded outer wall.

14. The system for power generation through movement of fluid of claim 9, wherein the tensioning member counter rotates relative to the second sprocket member for keeping constant tension on the chain member.

15. The system for power generation through movement of fluid of claim 9, the power generating cell further comprising a set of cross braces extending about an end for stabilizing the power generating cell.

16. The system for power generation through movement of fluid of claim 15, the power generating cell further comprising a shaft member extending from the one or more impellers for stabilizing rotation relative to a longitudinal axis.

17. A system for power generation through movement of fluid comprising:
    a power generating cell comprising:
        a rounded outer wall;
        a rotatable ring disposed about the outer wall and including grooves for receiving a chain member;
        one or more impellers fixedly coupled to the ring; and
    a generator for receiving energy from the one or more impellers having a first sprocket member in communication with the power generating cell via a second sprocket member; and
    a member coupling the first sprocket member, the second sprocket member, and the grooves for transmitting energy between the generator and the power generating cell;
    wherein fluid is disposed about one or more impellers for creating energy.

18. The system for power generation through movement of fluid of claim 17, wherein the first sprocket member is a first pulley member, the second sprocket member is a second pulley member, and the member is a belt.

19. The system for power generation through movement of claim 17, the power generating cell further comprising an inlet and an outlet duct.

20. The system for power generation through movement of fluid of claim 19, wherein the inlet and the outlet ducts are arranged in converging and diverging orientations.

* * * * *